(12) United States Patent
Otsu et al.

(10) Patent No.: US 8,976,466 B2
(45) Date of Patent: Mar. 10, 2015

(54) IMAGING OPTICAL SYSTEM AND IMAGING APPARATUS USING THE SAME

(75) Inventors: Takuya Otsu, Tachikawa (JP); Kenichiro Abe, Hino (JP); Yoshihiro Uchida, Akishima (JP)

(73) Assignee: Olympus Corporation, Tokyo (JP)

( * ) Notice: Subject to any disclaimer, the term of this patent is extended or adjusted under 35 U.S.C. 154(b) by 133 days.

(21) Appl. No.: 13/356,896

(22) Filed: Jan. 24, 2012

(65) Prior Publication Data

US 2012/0229920 A1    Sep. 13, 2012

(30) Foreign Application Priority Data

Mar. 11, 2011 (JP) ................................. 2011-054565
Mar. 11, 2011 (JP) ................................. 2011-054567
Mar. 29, 2011 (JP) ................................. 2011-071476

(51) Int. Cl.
*G02B 9/60* (2006.01)
*G02B 13/00* (2006.01)
*G02B 15/16* (2006.01)

(52) U.S. Cl.
CPC .............. *G02B 13/0045* (2013.01); *G02B 9/60* (2013.01); *G02B 15/161* (2013.01)
USPC .......................................... 359/764; 359/714

(58) Field of Classification Search
CPC .............................. G02B 9/60; G02B 13/0045
USPC ........................................... 359/714, 763, 764
See application file for complete search history.

(56) References Cited

U.S. PATENT DOCUMENTS

| | | | |
|---|---|---|---|
| 4,787,721 A | 11/1988 | Fukushima et al. | |
| 8,035,723 B2 | 10/2011 | Sano et al. | |
| 8,411,374 B2* | 4/2013 | Ohtsu | 359/714 |
| 8,520,124 B2* | 8/2013 | Ozaki | 348/335 |
| 2009/0122423 A1 | 5/2009 | Park et al. | |
| 2010/0053776 A1 | 3/2010 | Tanaka et al. | |
| 2010/0134904 A1 | 6/2010 | Tsai | |
| 2010/0214467 A1* | 8/2010 | Ohtsu | 359/764 |
| 2010/0253829 A1* | 10/2010 | Shinohara | 348/340 |
| 2010/0254029 A1 | 10/2010 | Shinohara | |
| 2011/0013069 A1 | 1/2011 | Chen | |

(Continued)

FOREIGN PATENT DOCUMENTS

CN    101995641 A    3/2011
JP    Sho 61-050110 A    3/1986

(Continued)

*Primary Examiner* — Zachary Wilkes
(74) *Attorney, Agent, or Firm* — Brosemer, Kolefas & Associates, LLC

(57) ABSTRACT

An imaging optical system smaller than conventional systems yet with well-corrected aberrations, comprises five lenses L1-L5 having refractive powers, in order from the object side: positive, negative, positive, positive, and negative, with an aperture at an endmost object-side position. In one embodiment, L1 is biconvex, L2's object-side surface is convex, L5's object-side surface is convex, and 1.0≤f3/f1≤4.9, f1 and f3 being the focal lengths of L1 and L3, respectively. In a variant thereof, L2 is a meniscus lens and L5's object-side surface is concave. In another embodiment, L1 is glass, and −4.0<(r6+r7)/(r6−r7)<−0.51, r6 and r7 being paraxial curvature radii of L3's object-and image-side surfaces, respectively. In another embodiment, L1 is glass, and −1.5<f2 /f<−0.73, f2 being the focal length of L2 and f the focal length of the whole optical system. In yet another embodiment, L1 is glass, and −11.2<r3/f1<−0.9, r3 being the paraxial curvature radius of L1's image-side surface.

17 Claims, 33 Drawing Sheets

(56) References Cited

U.S. PATENT DOCUMENTS

| | | |
|---|---|---|
| 2011/0043930 A1 | 2/2011 | Kwon |
| 2011/0134305 A1 | 6/2011 | Sano et al. |
| 2011/0273611 A1 | 11/2011 | Matsusaka et al. |
| 2012/0075721 A1 | 3/2012 | Konishi et al. |
| 2012/0224091 A1 | 9/2012 | Ohtsu |
| 2012/0293682 A1 | 11/2012 | Ohtsu |
| 2013/0293756 A1 | 11/2013 | Ohtsu |

FOREIGN PATENT DOCUMENTS

| | | | |
|---|---|---|---|
| JP | Sho 61-138225 A | 6/1986 | |
| JP | Sho 61-188510 A | 8/1986 | |
| JP | Sho 62-183419 A | 8/1987 | |
| JP | Hei 02-167516 A | 6/1990 | |
| JP | Hei 03-249719 A | 11/1991 | |
| JP | Hei 07-120671 A | 5/1995 | |
| JP | Hei 09-222559 A | 8/1997 | |
| JP | Hei 10-123418 A | 5/1998 | |
| JP | 2007-108534 A | 4/2007 | |
| JP | 2007-264180 A | 10/2007 | |
| JP | 2010-048996 A | 3/2010 | |
| JP | 2010-079296 A | 4/2010 | |
| JP | 2010-197665 A | 9/2010 | |
| JP | 2010-237407 A | 10/2010 | |
| JP | 2010-262269 A | 11/2010 | |
| JP | 2010-262270 A | 11/2010 | |
| JP | 2011-095513 A | 5/2011 | |
| JP | 2011-209554 A | 10/2011 | |
| KR | 2010-0043667 A | 4/2010 | |
| KR | 962999 B | 6/2010 | |
| WO | 2010/024198 A1 | 3/2010 | |
| WO | 2010/143459 A1 | 12/2010 | |
| WO | WO2011/021271 * | 2/2011 | G02B 13/18 |
| WO | 2011/027690 A1 | 3/2011 | |

\* cited by examiner

FIG. 29

| Conditional Expression No. | Quantity | Example No. | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| 1 | f3/f1 | 2.58 | 2.95 | 2.93 | 1.85 | 3.21 | | | | 2.71 | | | | | |
| 101, 136, 146 | $\frac{r6-r7}{r6-r7}$ | -1.65 | -1.45 | -1.50 | -1.02 | -2.00 | 0.14 | -2.70 | 0.42 | -2.62 | 0.15 | -0.55 | -0.57 | -1.91 | -0.70 |
| 102 | $\frac{\Phi L5edmax}{\Phi st}$ | 2.74 | 2.60 | 2.64 | 3.26 | 2.42 | | | | | | | | | |
| 103 | r9/d9 | -3.51 | -4.98 | -5.39 | -3.12 | -3.51 | | | | | | | | | |
| 104, 141 | f3/f1 | -4.47 | -4.36 | -4.44 | -3.33 | -6.36 | | | | | -2.98 | -2.64 | -2.37 | -5.36 | -2.47 |
| 105 | r7/f | 3.60 | 5.65 | 5.10 | 102.52 | 2.77 | | | | | | | | | |
| 106, 135, 145 | r6/f | 0.88 | 1.04 | 1.02 | 0.88 | 0.93 | 3.42 | 0.50 | 6.74 | 3.42 | 1.78 | 1.38 | 0.99 | 0.64 | 0.74 |
| 107, 134, 144 | f3/f4 | 3.04 | 3.04 | 3.08 | 2.24 | 3.81 | 2.38 | 1.93 | 3.31 | 2.38 | 1.59 | 2.55 | 1.89 | 2.13 | 1.44 |
| 108, 137, 147 | $\frac{r10+r11}{r10-r11}$ | 1.37 | 1.42 | 1.49 | 1.72 | 1.46 | 0.46 | 0.80 | 0.27 | 1.36 | 0.84 | 0.87 | 0.82 | 1.43 | 1.00 |
| 109 | f1/f | 0.83 | 0.80 | 0.80 | 0.89 | 0.79 | | | | | | | | | |
| 110 | f5/f | -0.67 | -0.72 | -0.73 | -0.73 | -0.67 | | | | | | | | | |
| 131 | nd3 | | | | | | 1.75 | 1.75 | 1.81 | 1.75 | | | | | |
| 132 | f2/f | | | | | | -0.81 | -0.74 | -0.80 | -0.98 | | | | | |
| 133 | 1/v3 − 1/v4 | | | | | | 0.004 | 0.004 | 0.007 | 0.004 | | | | | |
| 142 | nd1 | | | | | | | | | | 1.71 | 1.69 | 1.75 | 1.75 | 1.81 |
| 143 | r2/f1 | | | | | | | | | | 0.899 | 0.896 | 1.028 | 0.851 | 1.142 |

IMAGING OPTICAL SYSTEM AND IMAGING APPARATUS USING THE SAME

CROSS-REFERENCE TO RELATED APPLICATIONS

The present application is based upon and claims the benefit of priority from prior Japanese Patent Application No. 2011-054565, filed Mar. 11, 2011; Japanese Patent Application No. 2011-054567, filed Mar. 11, 2011; and Japanese Patent Application No. 2011-071476, filed Mar. 29, 2011; the entire contents of which are incorporated herein by reference.

BACKGROUND OF THE INVENTION

1. Field of the Invention

The present invention relates to an imaging optical system and an imaging apparatus using the same.

2. Description of the Related Art

In recent years, along with a tendency to reduce the thickness of cellular phones, a camera module in which an optical system's length in the direction of an optical axis is minimized at its limit, is demanded. Further, along with the increases in size and the pixel number of recent imagers, a lens having high resolution power is demanded. To cope with these demands, fixed focal-length optical systems having five aspheric lenses have been proposed. See Japanese Patent Application Publications Nos. 2007-264180 and 2010-48996.

The optical systems described in the aforementioned Japanese Patent Application Publications have high optical performances and the F-number (Fno) of each is rather small. However, these optical systems have a long whole length and a large maximum effective lens diameter. Therefore, when a designer tries to modify such a system to reduce its F-number and size, the effects of several aberrations, such as coma aberration, spherical aberration, field curvature and chromatic aberration, become large. Consequently, realizing compact optical systems with well-corrected aberrations has been difficult.

SUMMARY OF THE INVENTION

Embodiments in accordance with the principles of the present invention are provided in view of the above described problems. An object of one or more exemplary embodiments is to provide an imaging optical system and an imaging apparatus using the same, where the length of the whole optical system is short, lens diameter is kept small, and aberrations (e.g., coma aberration, spherical aberration, field curvature and chromatic aberration) are well corrected, in spite of the system's relatively small F-number.

In solving the above-described problems and attaining the aforementioned object, an exemplary embodiment of an imaging optical system of the present invention comprises, in order from an object side: a first lens having a positive refractive power; a second lens having a negative refractive power; a third lens having a positive refractive power; a fourth lens having a positive refractive power; and a fifth lens having a negative refractive power, wherein an aperture stop is provided at an endmost position on the object side in the imaging optical system, the first lens is a biconvex lens, the surface of the second lens facing the object side is convex, the surface of the fifth lens facing the object side is convex, and the following conditional expression is satisfied:

$$1.0 < f3/f1 < 4.9 \quad (1),$$

where f3 is a focal length of the third lens, and f1 is a focal length of the first lens.

A further exemplary embodiment of an imaging optical system of the present invention comprises, in order from the object side: a first lens having a positive refractive power; a second lens having a negative refractive power; a third lens having a positive refractive power; a fourth lens having a positive refractive power; and a fifth lens having a negative refractive power, wherein an aperture is provided at an endmost position on the object side, the first lens is a biconvex lens, the second lens is a meniscus lens having a convex surface facing the object side, the object side surface of the fifth lens is a concave surface, and conditional expression (1) is satisfied.

Compared to conventional optical systems, such exemplary embodiments of imaging optical systems have smaller F-numbers and sizes, yet with well-corrected aberrations, especially spherical, coma, and chromatic aberrations.

A further exemplary embodiment of an imaging optical system of the present invention comprises, in order from an object side: a first lens having a positive refractive power; a second lens having a negative refractive power; and a third lens having a positive refractive power; a fourth lens having a positive refractive power; and a fifth lens having a negative refractive power, wherein an aperture stop is provided at an endmost position on the object side in the imaging optical system, and the following conditional expression (101) is satisfied:

$$-4.0 < (r6+r7)/(r6-r7) < -0.51 \quad (101),$$

where r6 is a paraxial curvature radius of the object side surface of the third lens, and r7 is a paraxial curvature radius of the image side surface of the third lens.

In a preferred embodiment of the present invention, it is preferable that the following conditional expression (102) be satisfied:

$$1.21 < \Phi L5\mathrm{edmax}/\Phi st < 6.52 \quad (102),$$

where $\Phi L5\mathrm{edmax}$ is an effective diameter of the fifth lens and $\Phi st$ is a diameter of the aperture.

In a preferred embodiment of the present invention, it is preferable that the following conditional expression (103) be satisfied:

$$-10.8 < r9/d9 < -1.6 \quad (103),$$

where r9 is a paraxial curvature radius of the image side surface of the fourth lens and d9 is an axial distance in the air between the fourth lens and the fifth lens.

In a preferable embodiment of the present invention, it is preferable that the third lens be a meniscus lens having a convex surface facing the object side.

In a preferable embodiment of the present invention, it is preferable that the following conditional expression (104) be satisfied:

$$-12.7 < r3/f1 < -1.6 \quad (104),$$

where r3 is a paraxial curvature radius of the image side surface of the first lens, and f1 is a focal length of the first lens.

In a preferable embodiment of the present invention, it is preferable that the following conditional expression (105) be satisfied:

$$1.3 < r7/f \quad (105),$$

where r7 is a paraxial curvature radius of the image side surface of the third lens, and f is a focal length of the whole imaging optical system.

In a preferable embodiment of the present invention, it is preferable that the following conditional expression (106) be satisfied:

$$0.4 < r6/f < 2.1 \quad (106),$$

where r6 is a paraxial curvature radius of the object side surface of the third lens, and f is a focal length of the whole imaging optical system.

In a preferable embodiment of the present invention, it is preferable that the following conditional expression (107) be satisfied:

$$1.1 < f3/f4 < 7.6 \quad (107),$$

where f3 is a focal length of the third lens, and f4 is a focal length of the fourth lens.

In a preferable embodiment of the present invention, it is preferable that the following expression (108) be satisfied:

$$1.0 < (r10+r11)/(r10-r11) < 3.4 \quad (108),$$

where r10 is a paraxial curvature radius of the object side surface of the fifth lens, and r11 is a paraxial curvature radius of the image side surface of the fifth lens.

In a preferable embodiment of the present invention, it is preferable that the following conditional expression (109) be satisfied:

$$0.4 < f1/f < 1.8 \quad (109),$$

where f1 is a focal length of the first lens, and f is a focal length of the whole imaging optical system.

In a preferable embodiment of the present invention, it is preferable that the following expression (110) be satisfied:

$$-1.5 < f5/f < -0.3 \quad (110),$$

where f5 is a focal length of the fifth lens, and f is a focal length of the whole imaging optical system.

In a preferred embodiment of the present invention, the first lens is preferably a biconvex lens.

In a preferred embodiment of the present invention, the second lens is preferably a meniscus lens having a convex surface facing the object side.

In a preferred embodiment of the present invention, the fourth lens is preferably a meniscus lens having a concave surface facing the object side, and the shape of the object side surface from a center part of the lens to a peripheral part thereof is preferably concave.

Compared to conventional optical systems, such exemplary embodiments of imaging optical systems have smaller F-numbers and sizes, yet with well-corrected aberrations, especially coma aberration.

A further exemplary embodiment of an imaging optical system of the present invention comprises, in order from an object side: a first lens having a positive refractive power; a second lens having a negative refractive power; a third lens having a positive refractive power; a fourth lens having a positive refractive power; and a fifth lens having a negative refractive power, wherein an aperture stop is provided at an endmost position on the object side in the imaging optical system, the third lens is a glass lens and the following conditional expressions are satisfied:

$$1.7 < nd3, \quad (131)$$

$$-1.5 < f2/f < -0.73 \quad (132),$$

where nd3 is a refractive index of the third lens for d-line, f2 is a focal length of the second lens, and f is a focal length of the whole imaging optical system.

Another exemplary embodiment of an imaging optical system of the present invention comprises, in order from an object side: a first lens having a positive refractive power; a second lens having a negative refractive power; a third lens having positive refractive power; a fourth lens having a negative refractive power; and a fifth lens having a negative refractive power, wherein an aperture stop is provided at an endmost position on the object side in the imaging optical system, and the following conditional expression is satisfied:

$$-1.5 < f2/f < -0.73 \quad (132),$$

where f2 is a focal length of the second lens, and f is a focal length of the whole imaging optical system.

In a preferred exemplary embodiment of the present invention, it is preferable that a refractive index of the fourth lens monotonically changes such that the refractive index of a center portion of the lens is higher than that of a peripheral portion, and the following conditional expression is satisfied:

$$0.001 < 1/v3 - 1/v4 < 0.01 \quad (133),$$

where v3 is an Abbe number of the third lens, and v4 is an Abbe number of the fourth lens.

In a preferred exemplary embodiment of the present invention, it is preferable that the following conditional expression be satisfied:

$$0.95 < f3/f4 < 6.8 \quad (134),$$

where f3 is a focal length of the third lens, and f4 is a focal length of the fourth lens.

In a preferred embodiment of the present application, it is preferable that the object side surface of the third lens be a convex surface facing the object side.

In a preferred exemplary embodiment of the present application, it is preferable that the following conditional expression (135) be satisfied:

$$0.25 < r6/f < 14 \quad (135),$$

where r6 is a paraxial curvature radius of the object side surface of the third lens, f is a focal length of the whole imaging optical system.

In a preferred exemplary embodiment of the present application, it is preferable that the following conditional expression (136) be satisfied:

$$-5.4 < (r6+r7)/(r6-r7) < 1 \quad (136),$$

where r6 is a paraxial curvature radius of the object side surface of the third lens, and r7 is a paraxial curvature radius of the image side surface of the third lens.

In a preferred embodiment of the present invention, it is preferable that the fourth lens be a meniscus lens having a concave surface facing the object side.

In a preferred embodiment of the present invention, it is preferable that the following conditional expression (137) be satisfied:

$$0.14 < (r10+r11)/(r10-r11) < 2.7 \quad (137),$$

where r10 is a paraxial curvature radius of the object side surface of the fifth lens, and r11 is a paraxial curvature radius of the image side surface of the fifth lens.

In a preferred embodiment of the present invention, the first lens, the second lens, the fourth lens, and the fifth lens are preferably formed from resin.

Compared to conventional optical systems, such exemplary embodiments of imaging optical systems have smaller F-numbers and sizes, yet with well-corrected aberrations, especially field distortion and chromatic aberration.

A further exemplary embodiment of an imaging optical system of the present invention comprises, in order from an object side: a first lens having a positive refractive power; a second lens having a negative refractive power; and a third lens having a positive refractive power; a fourth lens having a positive refractive power; and a fifth lens having a negative refractive power, wherein an aperture stop is provided at an endmost position on the object side in the imaging optical system, the first lens is a glass lens, and the following conditional expression is satisfied:

$$-11.2 < r3/f1 < -0.9 \tag{141}$$

where r3 is a curvature radius of the image side surface of the first lens, and f1 is a focal length of the first lens.

Another imaging optical system of the present invention comprising in order from an object side: a first lens having a positive refractive power; a second lens having a negative refractive power; a third lens having positive refractive power; a fourth lens having a negative refractive power; and a fifth lens having a negative refractive power, wherein an aperture stop is provided at an endmost position on the object side in the imaging optical system, and the following conditional expression is satisfied:

$$-11.2 < r3/f1 < -0.9 \tag{141}$$

where r3 is a paraxial curvature radius of the image side surface of the first lens, and f1 is a focal length of the first lens.

In a preferable embodiment of the present invention, it is preferable that the following conditional expression (142) be satisfied:

$$1.54 < nd1 \tag{142}$$

where nd1 is a refractive index of the first lens for d-line.

In a preferable embodiment of the present invention, it is preferable that the following conditional expression (143) be satisfied:

$$0.7 < r2/f1 < 1.2 \tag{143}$$

where r2 is a paraxial curvature radius of the object side surface of the first lens, and f1 is a focal length of the first lens.

In a preferable embodiment of the present invention, it is preferable that the following conditional expression (144) be satisfied:

$$0.2 < f3/f4 < 5 \tag{144}$$

where f3 is a focal length of the third lens, and f4 is a focal length of the fourth lens.

In a preferable embodiment of the present invention, it is preferable that the surface of the third lens facing the object side be a convex surface.

In a preferable embodiment of the present invention, it is preferable that the following conditional expression be satisfied:

$$0.2 < r6/f < 4.2 \tag{145}$$

where r6 is a paraxial curvature radius of the object side surface of the third lens, and f is a focal length of the whole imaging optical system.

In a preferable embodiment of the present invention, it is preferable that the following conditional expression (146) be satisfied:

$$-6.4 < (r6+r7)/(r6-r7) < 1 \tag{146}$$

where r6 is a paraxial curvature radius of the object side surface of the third lens, and r7 is a paraxial curvature radius of the image side surface of the third lens.

In a preferred embodiment of the present invention, it is preferable that the second lens be a meniscus lens having a convex surface facing the object side.

In a preferred embodiment of the present invention, it is preferable that the fourth lens be a meniscus lens having a concave surface facing the object side.

In a preferable embodiment of the present invention, it is preferable that the following conditional expression (147) be satisfied:

$$-0.6 < (r10+r11)/(r10-r11) < 2.5 \tag{147}$$

where r10 is a paraxial curvature radius of the object side surface of the fifth lens, and r11 is a paraxial curvature radius of the image side surface of the fifth lens.

In a preferred embodiment of the present invention, the second lens, the third lens, the fourth lens, and the fifth lens are preferably formed from resin.

Compared to conventional optical systems, such exemplary embodiments of imaging optical systems in accordance with the present invention have smaller F-numbers and sizes, yet with well-corrected aberrations, especially coma and spherical aberrations.

In exemplary embodiments of the present invention, an imaging apparatus comprises an imaging optical system, such as described above, and an imager.

In a preferred embodiment of the present invention, the imaging optical system and the imager are preferably integrated.

In a preferred embodiment of the present invention, the imaging optical system and an auto-focusing mechanism are preferably integrated.

BRIEF DESCRIPTION OF THE DRAWINGS

FIG. 29 is a table which shows exemplary values of various characteristic quantities for each of the above fourteen examples.

FIG. 36(*a*) is a front view of the cellular phone 400, FIG. 36(*b*) is a side view of the same, FIG. 36(*c*) is a cross-sectional view of an imaging optical system 405.

DETAILED DESCRIPTION

Figure 1:
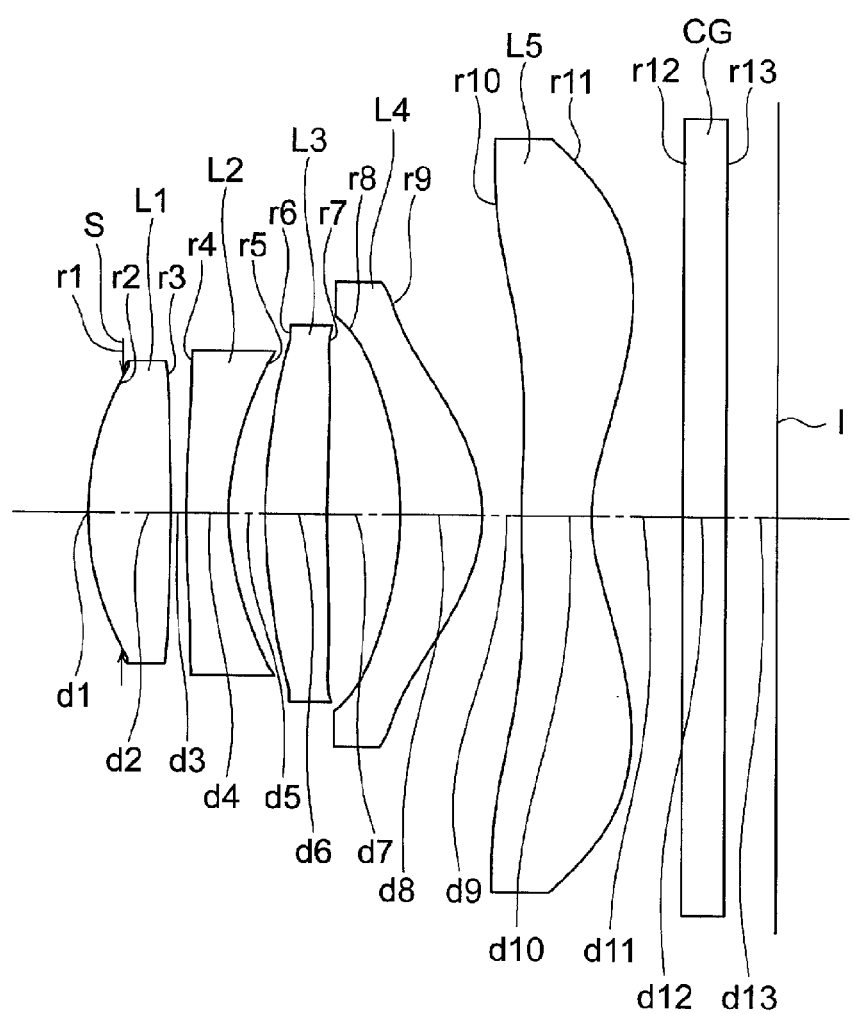
FIG. 1 is a cross-sectional view along an optical axis showing an optical configuration when an object of infinite distance is in focus according to a first example of the present invention.

Several exemplary embodiments of imaging optical systems will now be described in detail.

An exemplary embodiment of an imaging optical system of the present invention comprises, in order from the object side: a first lens having a positive refractive power; a second lens having a negative refractive power; a third lens having a positive refractive power; a fourth lens having a positive refractive power; and a fifth lens having a negative refractive power, wherein an aperture stop is provided at an endmost position on the object side in the imaging optical system, the first lens is a biconvex lens, the object side surface of the second lens is a convex surface facing the object side, the object side surface of the fifth lens is a convex surface facing the object side, and the following conditional expression is satisfied:

$$1.0 < f3/f1 < 4.9 \qquad (1),$$

where f3 is a focal length of the third lens, and f1 is a focal length of the first lens.

A further exemplary embodiment of an imaging optical system of the present invention comprises, in order from the object side: a first lens having a positive refractive power; a second lens having a negative refractive power; a third lens having a positive refractive power; a fourth lens having a positive refractive power; and a fifth lens having a negative refractive power, wherein an aperture is provided at an endmost position on the object side, the first lens is a biconvex lens, the second lens is a meniscus lens having a convex surface facing the object side, the object side surface of the fifth lens is a concave surface, and conditional expression (1) is satisfied.

The sign of the refractive power of each lens is based on the paraxial curvature radii of its surfaces. As mentioned, in the optical system of the present embodiment the arrangement of refractive powers of the lenses is, in order from the object side: positive, negative, positive, positive, and negative. By adopting such an arrangement of refractive powers, the principal point of the imaging optical system can be shifted toward the object side. Consequently, the whole or overall length of the optical system can be shortened compared to the focal length of the whole optical system.

Moreover, by adopting such a configuration with five lenses in which the fourth lens has a positive refractive power, the diversion of extra-axial rays can be suppressed by the fourth lens. Therefore, the diameter of the fifth lens can be diminished without sacrificing a telecentric property, or telecentricity, of the optical system.

Also, by distributing refractive powers in accordance with the present embodiment, spherical aberration and coma aberration can be well corrected.

Conditional expression (1) indicates a favorable condition for correcting spherical, coma and chromatic aberrations. When f3/f1 is below the lower limit, the refractive power of the third lens becomes too strong to balance coma aberration and field curvature, so it becomes difficult to well correct the extra-axial performance of the optical system. When f3/f1 exceeds the upper limit, the refractive power of the first lens becomes too strong to correct chromatic aberration and spherical aberration, so it becomes difficult to well correct the axial and extra-axial performance of the system.

It is preferable that the following conditional expression (1') be satisfied instead of the conditional expression (1):

$$1.2 < f3/f1 < 4.5 \tag{1'}.$$

It is further preferable that the following conditional expression (1") be satisfied instead of the conditional expression (1):

$$1.3 < f3/f1 < 4.1 \tag{1"}.$$

An imaging optical system of an exemplary embodiment of the present invention comprises, in order from the object side: a first lens having a positive refractive power; a second lens having a negative refractive power; a third lens having a positive refractive power; a fourth lens having a positive refractive power; and a fifth lens having a negative refractive power, wherein an aperture stop is provided in the imaging optical system at an endmost position on the object side, and the following conditional expression (101) is satisfied:

$$-4.0 < (r6+r7)/(r6-r7) < -0.51 \tag{101},$$

where r6 is a paraxial curvature radius of the object side surface of the third lens and r7 is a paraxial curvature radius of the image side surface of the third lens.

As mentioned, in the optical system of the present embodiment, the arrangement of refractive powers of the lenses is, in order from the object side: positive, negative, positive, positive, and negative. By adopting such an arrangement of refractive powers, the principal point of the imaging optical system can be shifted toward the object side. Consequently, the whole or overall length of the optical system can be shortened compared with a focal length of the whole optical system.

Moreover, by adopting such a configuration with five lenses in which the fourth lens has a positive refractive power, the diversion of extra-axial rays can be suppressed by the fourth lens. Therefore, the diameter of the fifth lens can be diminished without sacrificing the telecentric property or telecentricity of the optical system.

In the optical system of the present embodiment, by providing an aperture stop at an endmost position on the object side, the exit pupil can be kept away from the image plane. This feature allows decreasing the effective diameters of the lenses without sacrificing the telecentricity of the optical system.

Further, as mentioned above, the imaging optical system of the present embodiment satisfies the conditional expression (101). The conditional expression (101) is a favorable conditional expression for well correcting coma aberration while shortening the overall length of the optical system. By satisfying the conditional expression (101), it becomes possible to realize an optical system with a shortened overall length and decreased F-number, yet in which coma aberration is well corrected.

In case the object side surface of the third lens is convex, when the lower limit of the conditional expression (101) is not reached, because a curvature radius of the image side surface of the third lens becomes small, the positive refractive power of the third lens becomes too large. Consequently, the principal point shifts towards the image side and shortening of the overall length of the optical system becomes difficult. Moreover, when the upper limit of the conditional expression (101) is exceeded, the negative refractive power of the image side surface of the third lens becomes small. Consequently, because the incident angles of extra-axial rays on the image side surface of the third lens become large, good correction of coma aberration becomes difficult.

It is preferable that the following conditional expression (101') be satisfied instead of the conditional expression (101):

$$-2.6 < (r6+r7)/(r6-r7) < -0.8 \tag{101'}.$$

It is further preferable that the following conditional expression (101") be satisfied instead of the conditional expression (101):

$$-2.2 < (r6+r7)/(r6-r7) < -1 \tag{101"}.$$

In the exemplary imaging optical system of the present invention, it is preferable that the following conditional expression (102) be satisfied:

$$1.21 < \Phi L5edmax/\Phi st < 6.52 \tag{102},$$

where $\Phi L5edmax$ is an effective diameter of the fifth lens and $\Phi st$ is a diameter of the aperture.

The conditional expression (102), which relates to the effective diameter of the fifth lens and the diameter of the aperture, is a favorable conditional expression for miniaturization of the optical system and correcting field curvature. By satisfying the conditional expression (102), miniaturization of the optical system and good correction of field curvature become possible.

When the upper limit of the conditional expression (102) is exceeded, the effective diameter of the fifth lens becomes large in comparison to the diameter of the aperture. In this case, while it is easy to maintain the optical system's telecentricity, miniaturization of the optical system becomes difficult. When the lower limit of the conditional expression (102) is not reached, the effective diameter of the fifth lens becomes small in comparison to the diameter of the aperture. In this case, because the distance between an axial ray and an extra-axial ray becomes small in the fifth lens, the correction of coma aberration, distortion, and especially field curvature, becomes difficult.

It is preferable that the following conditional expression (102') be satisfied instead of the conditional expression (102):

$$1.86 < \Phi L5ed\text{max}/\Phi st < 4.24 \tag{102'}$$

It is further more preferable that the following conditional expression (102") be satisfied instead of the conditional expression (102):

$$2.20 < \Phi L5ed\text{max}/\Phi st < 3.59 \tag{102"}$$

The conditional expression (102) can be expressed by using the diameter of the fifth lens, instead of the effective diameter of the fifth lens. In this case, it is preferable that the imaging optical system of the embodiment satisfy the following conditional expression (102-1):

$$1.41 < \Phi L5\text{max}/\Phi st < 6.72 \tag{102-1}$$

where ΦL5max is the diameter of the fifth lens and Φst is the diameter of the aperture.

The effect of the conditional expression (102-1) is the same as that of the conditional expression (102).

It is preferable that the following conditional expression (102-1') be satisfied instead of the conditional expression (102-1):

$$2.06 < \Phi L5\text{max}/\Phi st < 4.44 \tag{102-1'}$$

It is further more preferable that the following conditional expression (102-1") be satisfied instead of the conditional expression (102-1):

$$2.40 < \Phi L5\text{max}/\Phi st < 3.79 \tag{102-1"}$$

In the imaging optical system of the present embodiment, it is preferable that the following conditional expression (103) be satisfied $$-10.8 < r9/d9 < -1.6 \tag{103}$$

where r9 is a paraxial curvature radius of the image side surface of the fourth lens, and d9 is an axial distance in air between the fourth and fifth lenses.

The conditional expression (103), which is related to the paraxial curvature radius of the image side surface of the fourth lens and the axial distance in air between the fourth lens and the fifth lens, indicates favorable conditions for well corrected aberrations. By satisfying the conditional expression (103), generation of coma aberration can be suppressed, and astigmatism, field curvature and distortion can be well corrected.

When the upper limit of the conditional expression (103) is exceeded, the distance in air between the fourth lens and the fifth lens shortens. By considering that the air gap between the fourth and fifth lenses is an air-lens, because the shortening of the distance decreases the refractive power of the air-lens, good correction of field curvature and distortion becomes difficult. When the lower limit of the conditional expression (103) is not reached, a paraxial curvature of the image side surface of the fourth lens shortens. In this case, because the angles of incident rays on the image side surface of the fourth lens become large, coma aberration is generated and adequate correction of astigmatism becomes difficult.

It is preferable that the following conditional expression (103') be satisfied instead of the conditional expression (103):

$$-7.0 < r9/d9 < -2.4 \tag{103'}$$

It is further more preferable that the following conditional expression (103") be satisfied instead of conditional expression (103):

$$-5.9 < r9/d9 < -2.8 \tag{103"}$$

In the imaging optical system of the present embodiment, it is preferable that the third lens be a meniscus lens having a convex surface facing the object side. An optical system with large diameter lenses typically has a large axial chromatic aberration. By making the third lens a meniscus lens having a convex surface facing the object side, correction of this axial chromatic aberration can be done well, even if the diameters of the lenses are large.

In the imaging optical system of the present embodiment, it is preferable that the following conditional expression be satisfied:

$$-12.7 < r3/f1 < -1.6 \tag{104}$$

where r3 is a paraxial curvature radius of the image side surface of the first lens and f1 is a focal length of the first lens.

The conditional expression (104) is a favorable conditional expression for correcting spherical and coma aberrations. By satisfying the conditional expression (104), spherical aberration and coma aberration can be well corrected.

When the upper limit of the conditional expression (104) is exceeded, a paraxial curvature radius of the image side surface of the first lens becomes too small. In this case, because the incident angles of extra-axial rays on the image side surface become sharp, the correction of coma aberration becomes difficult. When the lower limit of the conditional expression (104) is not reached, a paraxial curvature radius of the image side surface of the first lens becomes too large to correct spherical aberration well.

It is preferable that the following conditional expression (104') be satisfied instead of the conditional expression (104):

$$-8.3 < r3/f1 < -2.6 \tag{104'}$$

It is further more preferable that the following conditional expression (104") be satisfied instead of the conditional expression (104):

$$-7.0 < r3/f1 < -3.0 \tag{104"}$$

In the imaging optical system of the present embodiment, it is preferable that the following conditional expression (105) be satisfied:

$$1.3 < r7/f \tag{105}$$

where r7 is a paraxial curvature radius of the image side surface of the third lens and f is the focal length of the whole optical system.

The conditional expression (105) is a favorable conditional expression to correct various aberrations, especially coma aberration, while shortening the length of the optical system. By satisfying the conditional expression (105), coma aberration can be well corrected.

When the upper limit of the conditional expression (105) is exceeded, a paraxial curvature of the image side surface of the third lens becomes large. When a designer tries to reduce the distance between the second lens and the third lens in order to shorten the overall length of the optical system, the distance in a peripheral area between the second and third lenses becomes too small because the image side surface of the second lens is concave. Because of this, the choices for the imaging side surface of the second lens and the object side surface of the third lens are restricted and the correction of aberration, especially coma aberration, becomes difficult. When the lower limit of the conditional expression (105) is not reached, a paraxial curvature of the image side surface of the third lens becomes small. In this case, because the incident angles of rays on the object side of the third lens become sharp, coma aberration generated in the third lens becomes large.

It is preferable that the following conditional expression (105') be satisfied instead of the conditional expression (105):

$$2.1 < r7/f < 133.3 \quad (105').$$

It is further more preferable that the following conditional expression (105") be satisfied instead of the conditional expression (105):

$$2.5 < r7/f < 112.8 \quad (105").$$

In the imaging optical system of the present embodiment, it is preferable that the following conditional expression (106) be satisfied:

$$0.4 < r6/f < 2.1 \quad (106),$$

where r6 is a paraxial curvature radius of the object side surface of the third lens and f is a focal length of the whole optical system.

The conditional expression (106) is a favorable conditional expression for well correcting various aberrations, especially coma aberration, while shortening the length of the optical system. By satisfying the conditional expression (106), various aberrations, especially coma aberration, can be well corrected while shortening the length of the optical system.

When the upper limit of the conditional expression (106) is exceeded, the paraxial curvature radius of the object side surface of the third lens becomes large. In case the object side surface of the second lens is a concave surface, the distance between the second and third lenses becomes small. Consequently, when a designer tries to decrease the distance between the second lens and the third lens to shorten the whole length of the optical system, because the shape of the image side surface of the second lens and that of the object side surface of the third lens are restricted, the correction of aberrations, especially coma aberration, becomes difficult. When the lower limit of the condition expression (106) is not reached, the paraxial curvature radius of the object side surface of the third lens becomes small. In this case, because the incident angle of rays on the object side surface of the third lens is sharp, coma aberration generated in the third lens enlarges.

It is preferable that the following conditional expression (106') be satisfied instead of the conditional expression (106):

$$0.7 < r6/f < 1.4 \quad (106').$$

It is further more preferable that the following conditional expression (106") be satisfied instead of the conditional expression (106):

$$0.8 < r6/f < 1.1 \quad (106").$$

In the imaging optical system of the present embodiment, it is preferable that the following conditional expression (107) be satisfied:

$$1.1 < f3/f4 < 7.6 \quad (107),$$

where f3 is a focal length of the third lens, and f4 is a focal length of the fourth lens.

The conditional expression (107) is a favorable conditional expression for properly distributing the refractive powers of the third and fourth lenses. By satisfying the conditional expression (107), the refractive power of the third lens and that of the fourth lens can be distributed properly. Consequently, aberrations of extra-axial rays can be well corrected, and deterioration of decentering sensitivity caused by the shortening of the whole length of the optical system can be eased.

When the upper limit of the conditional expression (107) is exceeded, the refractive power of the fourth lens becomes too strong compared to that of the third lens. Consequently, because too much refractive power resides in the fourth lens, the sensitivity to production errors of the fourth lens increases. When the lower limit of the conditional expression (107) is not reached, because the refractive power of the third lens becomes strong, the exit angles of extra-axial rays from the third lens become small. Consequently, the heights of rays cannot be high enough in the fourth lens. This makes the difference between the heights of extra-axial rays in the third lens and those in the fourth lens become small, making the correction of coma aberration and of a high degree of field curvature difficult.

It is preferable that the following conditional expression (107') be satisfied instead of the conditional expression (107):

$$1.7 < f3/f4 < 5.0 \quad (107').$$

It is further more preferable that the following conditional expression (107") be satisfied instead of the conditional expression (107):

$$2.0 < f3/f4 < 4.2 \quad (107").$$

In the imaging optical system of the present embodiment, it is preferable that the following conditional expression (108) be satisfied:

$$1.0 < (r10 + r11)/(r10 - r11) < 3.4 \quad (108),$$

where r10 is a paraxial curvature radius of the object side surface of the fifth lens and r11 is a paraxial curvature radius of the image side surface of the fifth lens.

The conditional expression (108) is a favorable conditional expression for maintaining the telecentricity of the optical system and for well correcting coma aberration. By satisfying the conditional expression (108), it becomes possible to keep a long enough distance between the fifth lens and the image plane in a peripheral area so as to preserve the telecentricity of the optical system. Furthermore, decreasing the effective diameter of the fifth lens and good correction of coma aberration are also possible.

When the upper limit of the conditional expression (108) is exceeded, because the position of a principal point of the fifth lens shifts toward the object side, the length of a back-focus shortens. Consequently, while maintaining the telecentricity of the optical system, decreasing the effective diameter of the fifth lens becomes difficult. When the lower limit of the conditional expression (108) is not reached, a paraxial curvature radius of the image side surface of the fifth lens becomes small. In this case, because the incident angles of extra-axial rays on the image side surface of the fifth lens become sharp, the correction of coma aberration becomes difficult.

It is preferable that the following conditional expression (108') be satisfied instead of the conditional expression (108):

$$1.1 < (r10 + r11)/(r10 - r11) < 2.2 \quad (108').$$

It is further more preferable that the following conditional expression (108") be satisfied instead of the conditional expression (108):

$$1.3 < (r10 + r11)/(r10 - r11) < 1.9 \quad (108").$$

In the imaging optical system of the present embodiment, it is preferable that the following conditional expression (109) be satisfied:

$$0.4 < f1/f < 1.8 \quad (109),$$

where f1 is a focal length of the first lens, and f is a focal length of the whole optical system.

The conditional expression (109) is a favorable condition for good correction of aberrations. By satisfying the conditional expression (109), while shortening the whole length of the optical system, various aberrations can be well corrected.

When the upper limit of the conditional expression is exceeded, the refractive power of the first lens becomes weak and shortening the overall length of the optical system becomes difficult. When the lower limit of the conditional expression (109) is not reached, because the refractive power of the first lens becomes strong, various aberrations increase and their correction becomes difficult. Further, sensitivity to production errors is increased.

It is preferable that the following conditional expression (109') be satisfied instead of the conditional expression (109):

$$0.6 < f1/f < 1.2 \tag{109'}.$$

It is further more preferable that the following conditional expression (109") be satisfied instead of the conditional expression (109):

$$0.7 < f1/f < 1.0 \tag{109"}.$$

In the imaging optical system of the present embodiment, it is preferable that the following conditional expression (110) be satisfied:

$$-1.5 < f5/f < -0.3 \tag{110},$$

where f5 is a focal length of the fifth lens and f is a focal length of the whole optical system.

The conditional expression (110) is a favorable condition for shortening the whole length of the optical system and correcting various aberrations, especially chromatic aberration of magnification. By satisfying the conditional expression (110), while shortening the whole length of the optical system, chromatic aberration of magnification can be well corrected.

When the upper limit of the conditional expression (110) is exceeded, the negative refractive power of the fifth lens weakens. In this case, because it becomes difficult to shift a principal point toward the object side of the optical system, shortening of the overall length of the optical system becomes difficult. When the lower limit of the conditional expression (110) is not reached, the negative refractive power of the fifth lens strengthens and the correction of aberrations generated in the first through fourth lenses (L1-L4), especially chromatic aberrations of magnification, becomes difficult.

It is preferable that the following conditional expression (110') be satisfied instead of the conditional expression (110):

$$-0.9 < f5/f < -0.5 \tag{110'}.$$

It is further more preferable that the following conditional expression (110") be satisfied instead of the conditional expression (110):

$$-0.8 < f5/f < -0.6 \tag{110"}.$$

In the imaging optical system of the present embodiment, it is preferable that the first lens be a biconvex lens. By making the shape of the first lens biconvex, the generation of coma aberration decreases and the shortening of the whole length of the optical system becomes possible.

In the imaging optical system of the present invention, it is preferable that the second lens be a meniscus lens having a convex surface facing the object side. By making the shape of the second lens a meniscus having a convex surface facing the object side, chromatic aberration and extra-axial aberrations such as coma aberration and field curvature can be well corrected.

In the imaging optical system of the present embodiment, it is preferable that the fourth lens be a meniscus lens having a concave surface facing the object side, and that the shape of the object side surface from a center part of the lens to a peripheral part thereof be concave. By making the shape of the fourth lens a meniscus shape having a concave shape facing the object side, generation of coma aberration can be suppressed.

Examples of imaging optical systems will now be described with reference to the accompanying drawings. The present invention is not limited to the examples described below. An aperture (in the examples aperture stop S) is located at an endmost position on the object side of the imaging optical system. In the exemplary embodiments shown, the aperture is located away from the image side surface of the first lens towards the object side. More specifically, the aperture S is located at, or further towards the object side than the fringe position (or perimeter) of the effective object side surface of the first lens L1. Such a location is considered the endmost position on the object side.

An imaging optical system according to a first example will now be described with reference to FIGS. 1 and 2.

FIG. 1 is a cross-sectional view along an optical axis showing an optical configuration when an object at infinite distance is in focus according to the first example of the present invention. As shown in FIG. 1, the imaging optical system of the first example comprises, in order from the object side, an aperture stop S, a first lens L1 having a positive refractive power, a second lens L2 having a negative refractive power, a third lens L3 having a positive refractive power, a fourth L4 lens having a positive refractive power and a fifth lens L5 having a negative refractive power. In the following cross-sectional views for all examples, CG stands for a cover glass and I stands for an image plane of an imager.

The first lens L1 is a biconvex positive lens. The second lens L2 is a negative meniscus lens having a convex surface facing the object side. The third lens L3 is a positive meniscus lens having a convex surface facing the object side. The fourth lens L4 is a positive meniscus lens having a convex surface facing the image side. The fifth lens L5 is a negative meniscus lens having a convex surface facing the object side.

An aspheric surface is applied to the both sides of all lenses, from the first lens L1 to the fifth lens L5.

Figure 2:
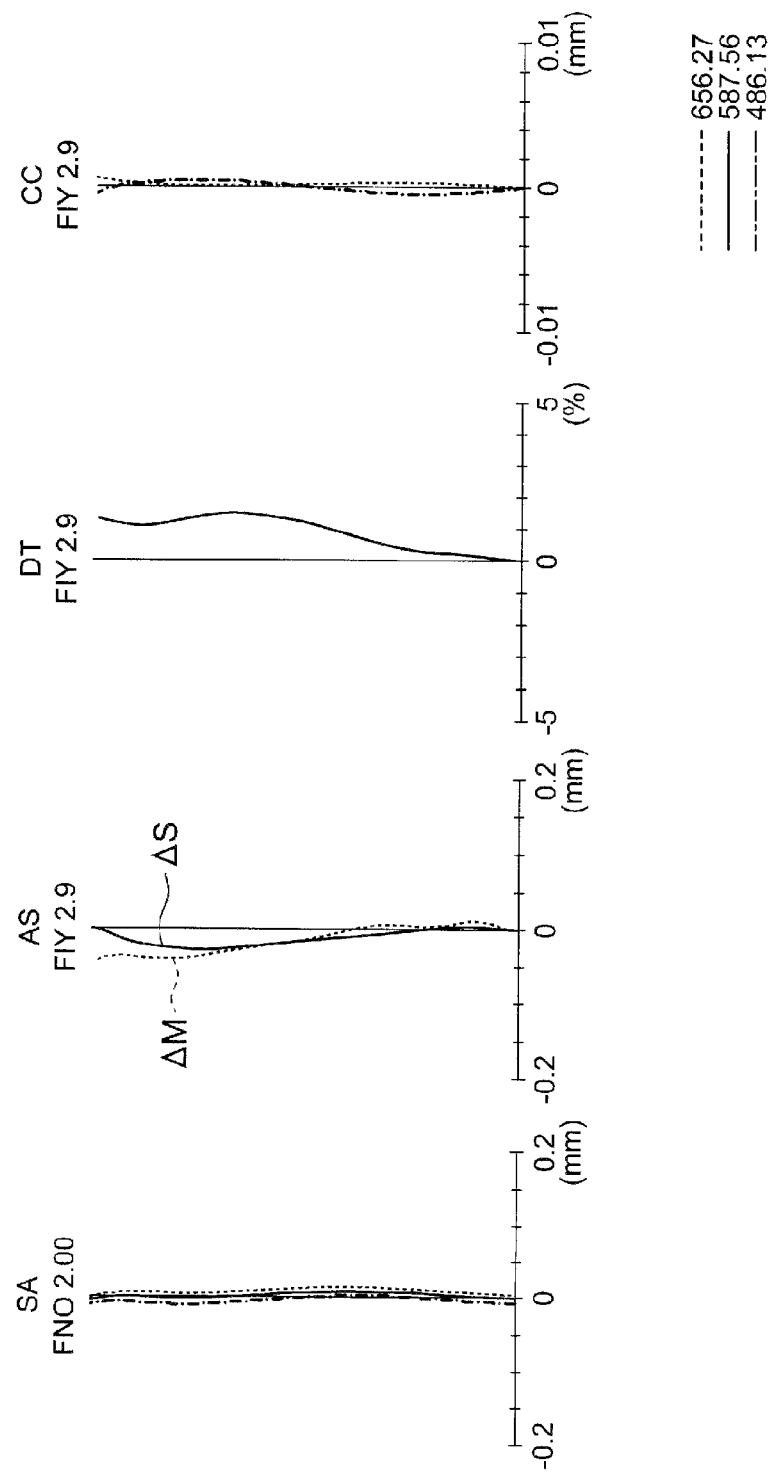
FIG. 2 is a diagram showing a spherical aberration (SA), an astigmatism (AS), a distortion (DT), and a chromatic aberration of magnification (CC), when an object at infinite distance is in focus according to the first example.

FIG. 2 is a diagram showing spherical aberration (SA), astigmatism (AS), distortion (DT), and chromatic aberration of magnification (CC), when an object at infinite distance is in focus according to the first example. FNO is the F-number and FIY is the image height of the optical system. Symbols used in this aberration diagram are also commonly used in the following examples. The SA, AS, DT and CC plots shown in FIG. 2 are based on an implementation of the first example in accordance with numerical data provided below.

Next, an imaging optical system according to a second example will be described with reference to FIGS. 3 and 4.

Figure 3:
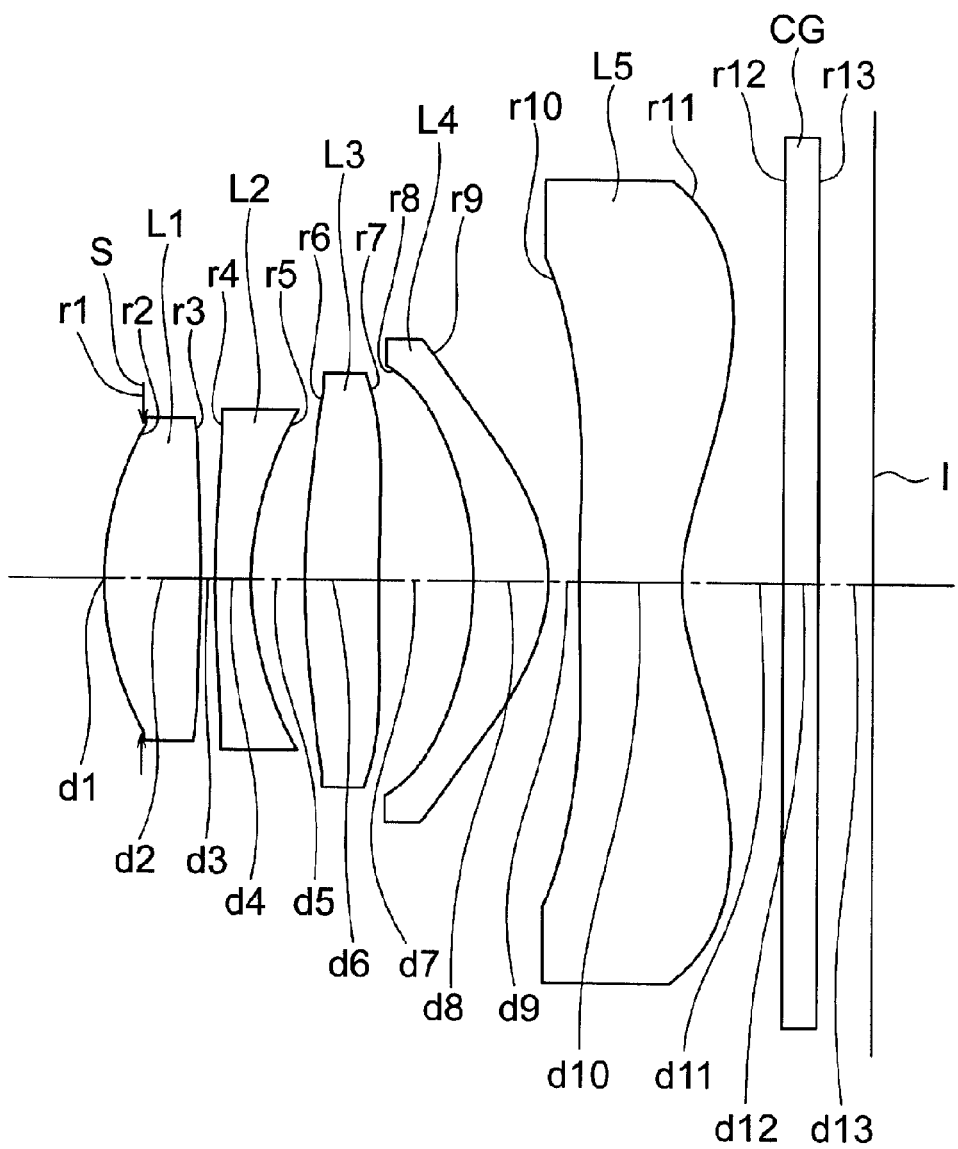
FIG. 3 is a cross-sectional view along an optical axis showing an optical configuration when an object of infinite distance is in focus according to a second example of the present invention.

FIG. 3 is a cross-sectional view along an optical axis showing an optical configuration when an object of infinite distance is in focus according to the second example of the present invention. As shown in FIG. 3, the imaging optical system of the second example comprises, in order from the object side, an aperture stop S, a first lens L1 having a positive refractive power, a second lens L2 having a negative refractive power, a third lens L3 having a positive refractive power, a fourth L4 lens having a positive refractive power and a fifth lens L5 having a negative refractive power.

The first lens L1 is a biconvex positive lens. The second lens L2 is a negative meniscus lens having a convex surface facing the object side. The third lens L3 is a positive meniscus lens having a convex surface facing the object side. The fourth lens L4 is a positive meniscus lens having a convex surface facing the image side. The fifth lens L5 is a negative meniscus lens having a convex surface facing the object side.

An aspheric surface is applied to the both sides of all lenses, from the first lens L1 to the fifth lens L5.

Figure 4:
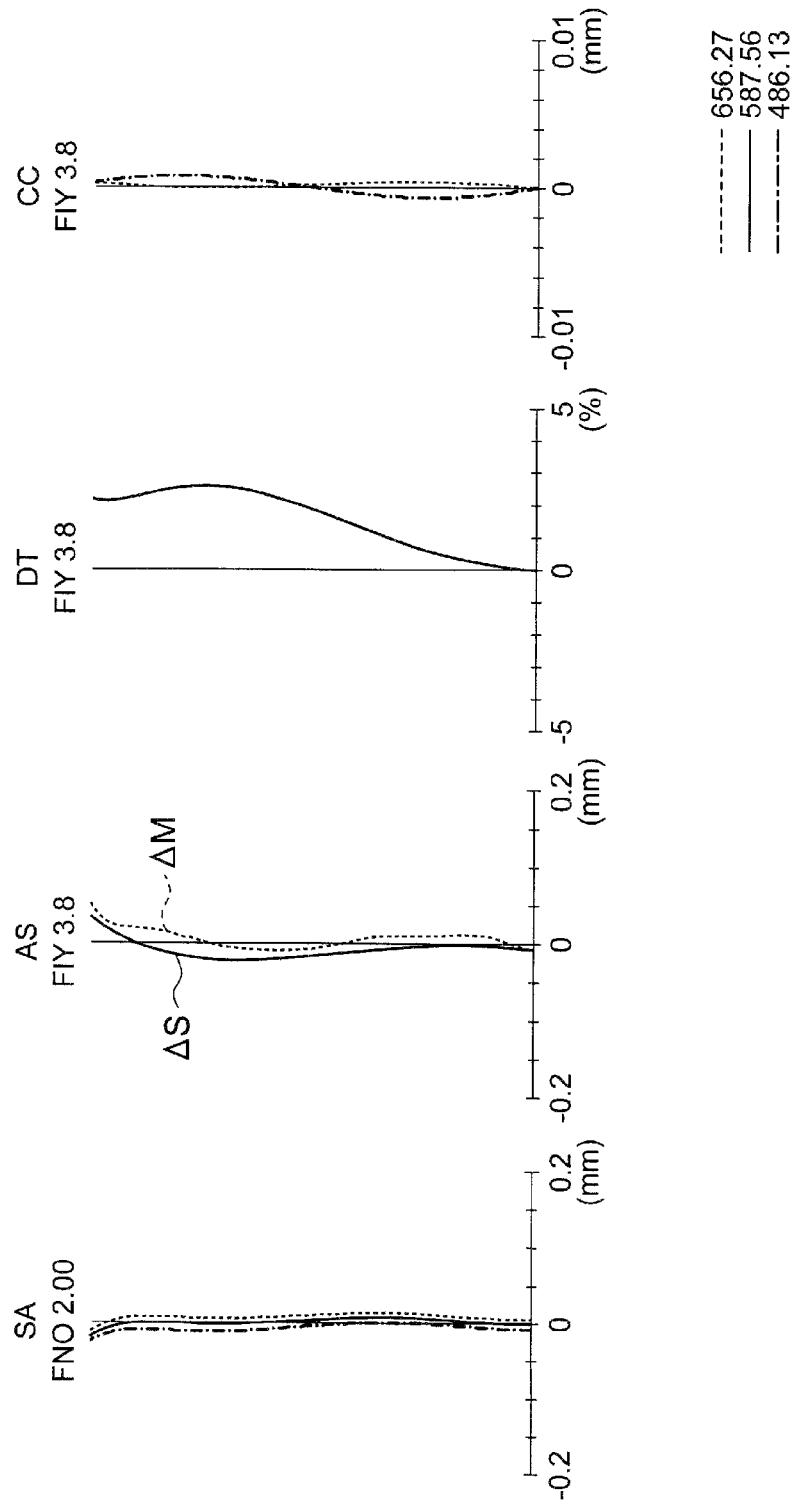
FIG. 4 is a diagram showing a spherical aberration (SA), an astigmatism (AS), a distortion (DT), and a chromatic aberration of magnification (CC), when an object of infinite distance is in focus according to the second example.

FIG. 4 is a diagram showing spherical aberration (SA), astigmatism (AS), distortion (DT), and chromatic aberration of magnification (CC), when an object at infinite distance is in focus according to the second example. The SA, AS, DT and CC plots shown in FIG. 4 are based on an implementation of the second example in accordance with numerical data provided below.

Next, an imaging optical system according to a third example will be described with reference to FIGS. 5 and 6.

Figure 5:
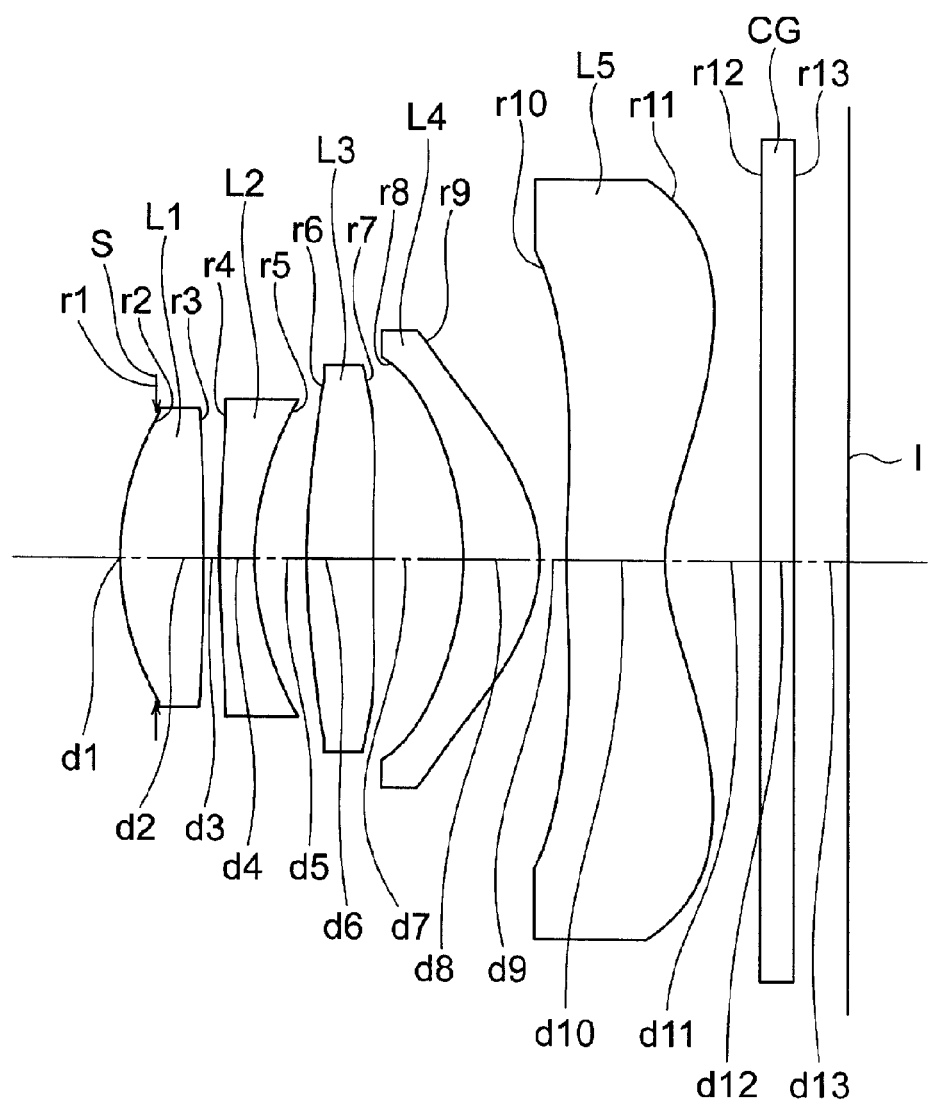
FIG. 5 is a cross-sectional view along an optical axis showing an optical configuration when an object of infinite distance is in focus according to a third example of the present invention.

FIG. 5 is a cross-sectional view along an optical axis showing an optical configuration when an object of infinite distance is in focus according to the third example of the present invention. As shown in FIG. 5, the imaging optical system of the third example comprises, in order from the object side, an aperture stop S, a first lens L1 having a positive refractive power, a second lens L2 having a negative refractive power, a third lens L3 having a positive refractive power, a fourth L4 lens having a positive refractive power and a fifth lens L5 having a negative refractive power.

The first lens L1 is a biconvex positive lens. The second lens L2 is a negative meniscus lens having a convex surface facing the object side. The third lens L3 is a positive meniscus lens having a convex surface facing the object side. The fourth lens L4 is a positive meniscus lens having a convex surface facing the image side. The fifth lens L5 is a negative meniscus lens having a convex surface facing the object side.

Figure 6:
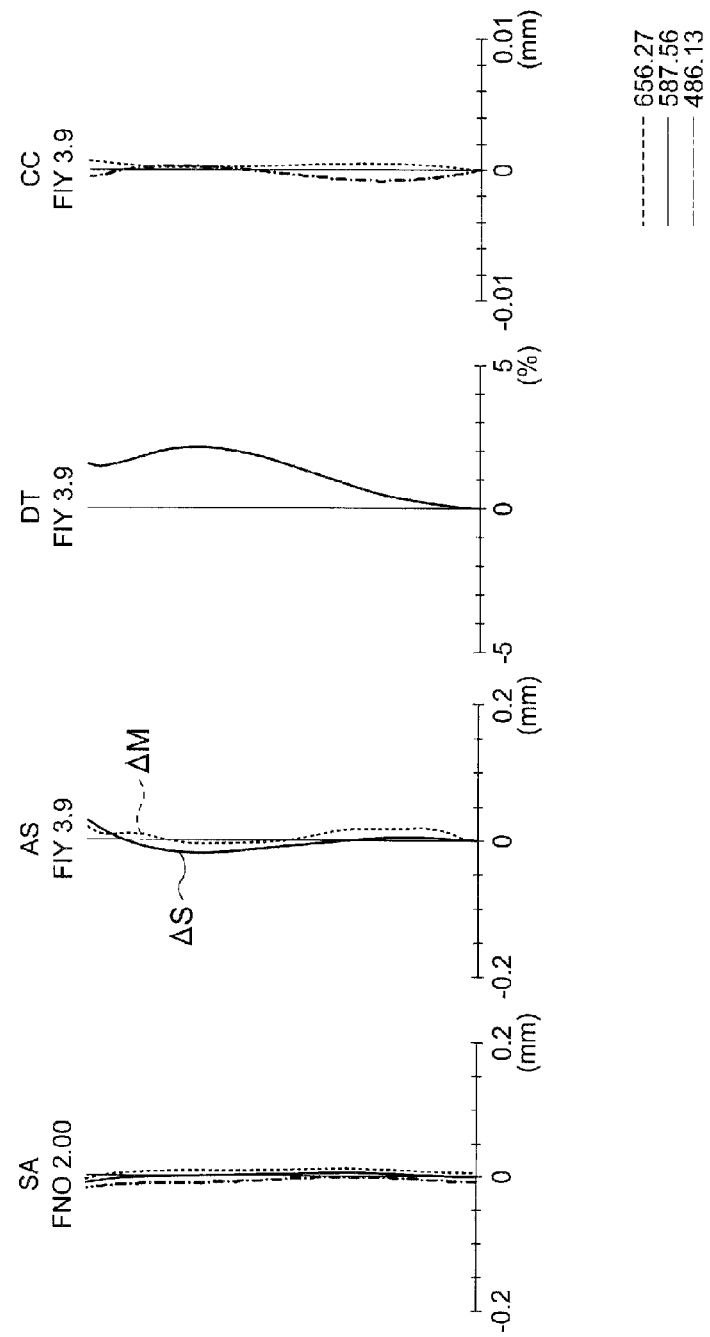
FIG. 6 is a diagram showing a spherical aberration (SA), an astigmatism (AS), a distortion (DT), and a chromatic aberration of magnification (CC), when an object of infinite distance is in focus according to the third example.

FIG. 6 is a diagram showing spherical aberration (SA), astigmatism (AS), distortion (DT), and chromatic aberration of magnification (CC), when an object of infinite distance is in focus according to the third example. The SA, AS, DT and CC plots shown in FIG. 6 are based on an implementation of the third example in accordance with numerical data provided below.

Next, an imaging optical system according to a fourth example will be described with reference to FIGS. 7 and 8.

Figure 7:
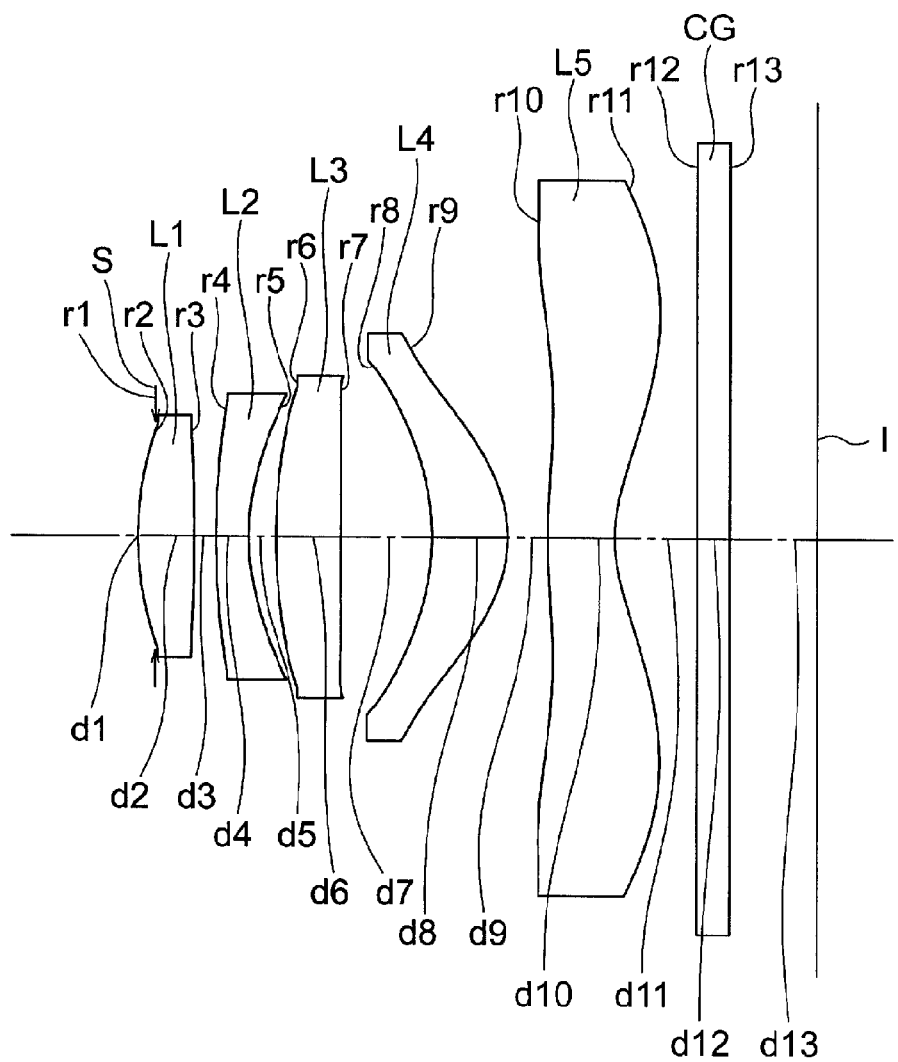
FIG. 7 is a cross-sectional view along an optical axis showing an optical configuration when an object of infinite distance is in focus according to a fourth example of the present invention.

FIG. 7 is a cross-sectional view along an optical axis showing an optical configuration when an object at infinite distance is in focus according to the fourth example of the present invention. As shown in FIG. 7, the imaging optical system of the fourth example comprises, in order from the object side, an aperture stop S, a first lens L1 having a positive refractive power, a second lens L2 having a negative refractive power, a third lens L3 having a positive refractive power, a fourth L4 lens having a positive refractive power and a fifth lens L5 having a negative refractive power.

The first lens L1 is a biconvex positive lens. The second lens L2 is a negative meniscus lens having a convex surface facing the object side. The third lens L3 is a positive meniscus lens having a convex surface facing the object side. The fourth lens L4 is a positive meniscus lens having a convex surface facing the image side. The fifth lens L5 is a negative meniscus lens having a convex surface facing the object side.

An aspheric surface is applied to the both sides of all lenses, from the first lens L1 to the fifth lens L5.

Figure 8:
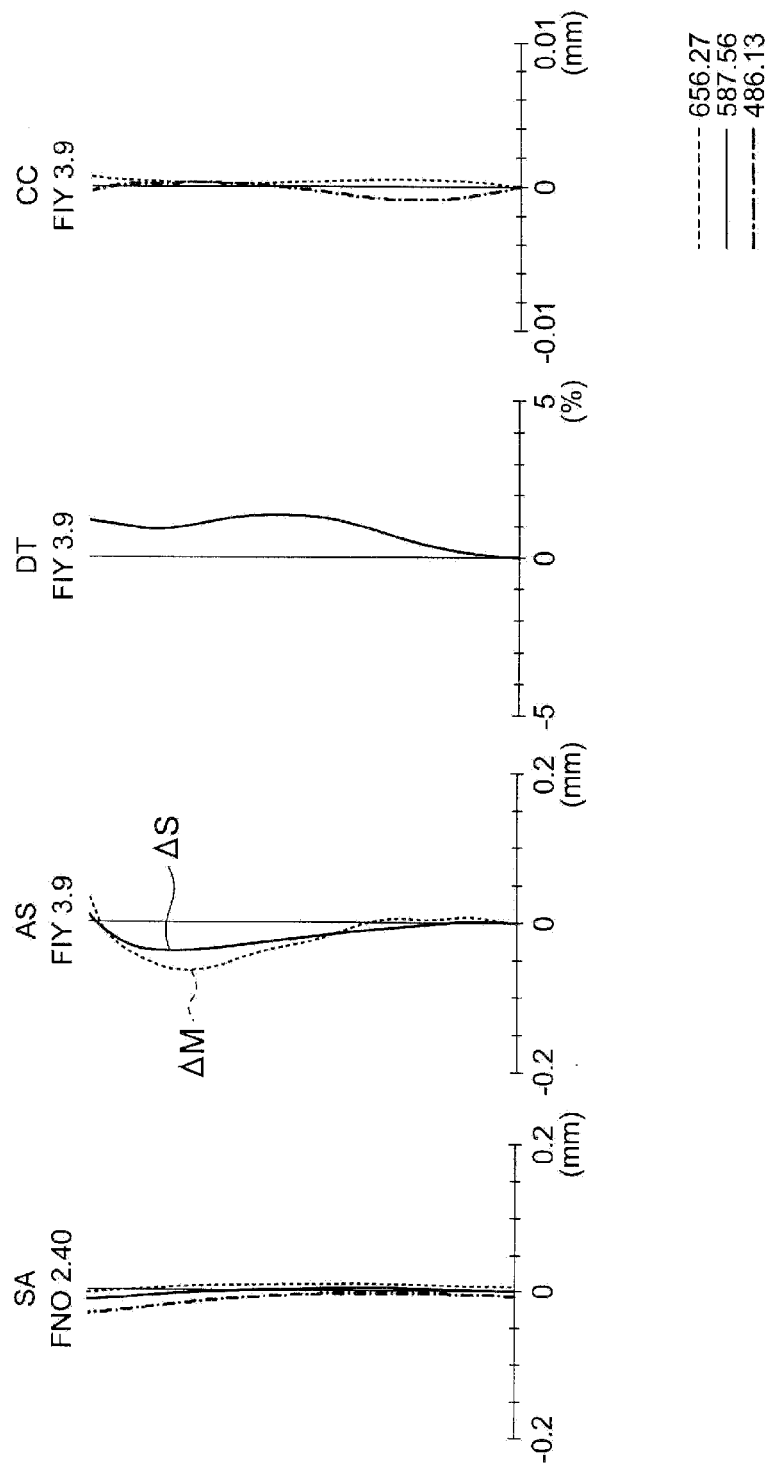
FIG. 8 is a diagram showing a spherical aberration (SA), an astigmatism (AS), a distortion (DT), and a chromatic aberration of magnification (CC), when an object of infinite distance is in focus according to the fourth example.

FIG. 8 is a diagram showing spherical aberration (SA), astigmatism (AS), distortion (DT), and chromatic aberration of magnification (CC), when an object of infinite distance is in focus according to the fourth example. The SA, AS, DT and CC plots shown in FIG. 8 are based on an implementation of the fourth example in accordance with numerical data provided below.

Next, an imaging optical system according to a fifth example will be described with reference to FIGS. 9 and 10.

Figure 9:
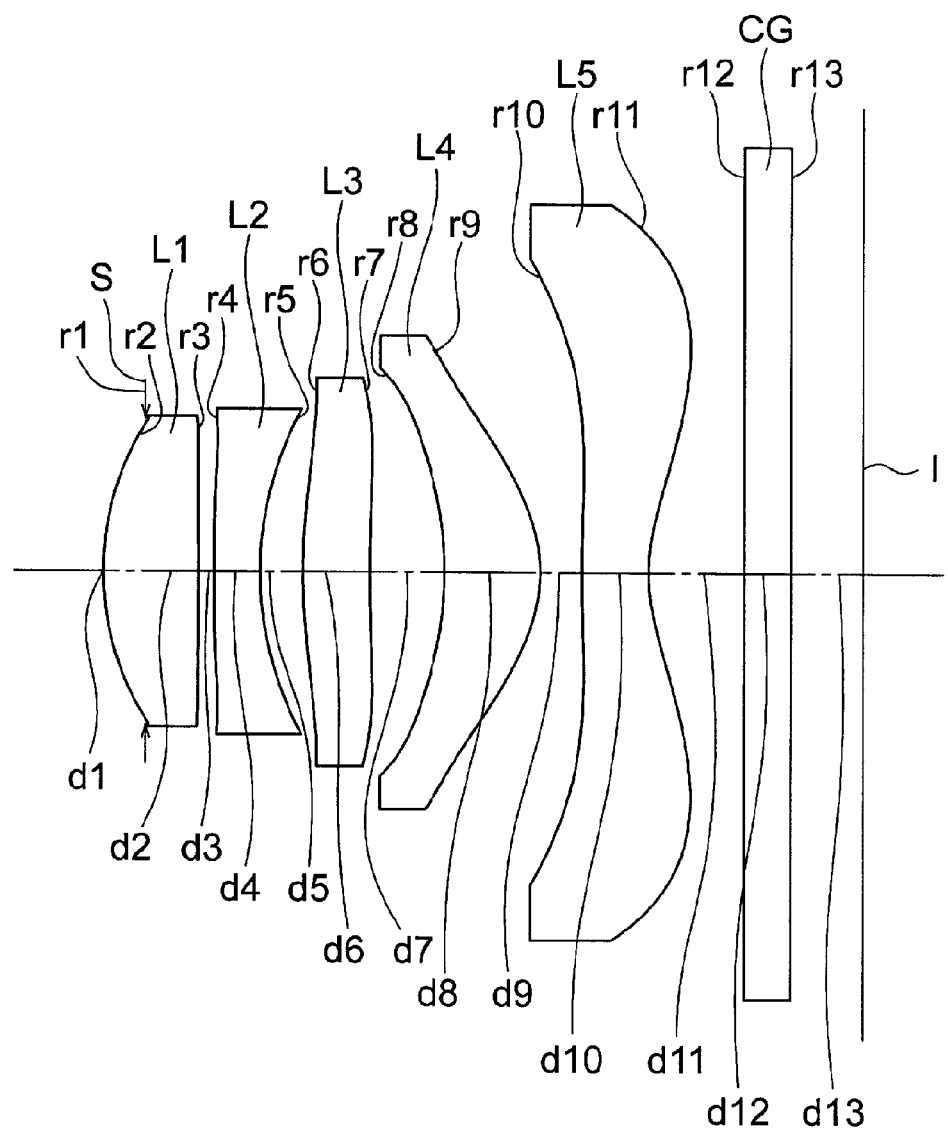
FIG. 9 is a cross-sectional view along an optical axis showing an optical configuration when an object of infinite distance is in focus according to a fifth example of the present invention.

FIG. 9 is a cross-sectional view along an optical axis showing an optical configuration when an object at infinite distance is in focus according to the fifth example of the present invention. As shown in FIG. 9, the imaging optical system of the fifth example comprises, in order from the object side, an aperture stop S, a first lens L1 having a positive refractive power, a second lens L2 having a negative refractive power, a third lens L3 having a positive refractive power, a fourth L4 lens having a positive refractive power and a fifth lens L5 having a negative refractive power.

The first lens L1 is a biconvex positive lens. The second lens L2 is a negative meniscus lens having a convex surface facing the object side. The third lens L3 is a positive meniscus lens having a convex surface facing the object side. The fourth lens L4 is a positive meniscus lens having a convex surface facing the image side. The fifth lens L5 is a negative meniscus lens having a convex surface facing the object side.

An aspheric surface is applied to the both sides of all lenses, from the first lens L1 to the fifth lens L5.

Figure 10:
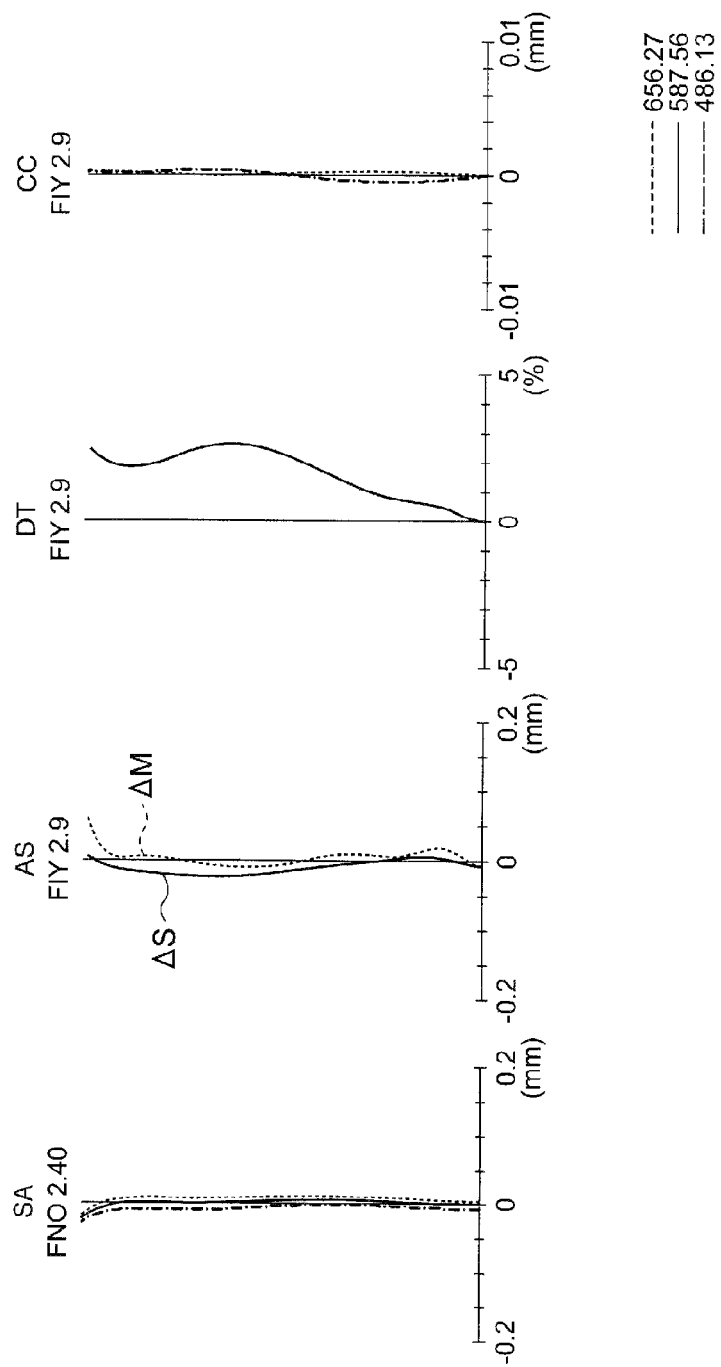
FIG. 10 is a diagram showing a spherical aberration (SA), an astigmatism (AS), a distortion (DT), and a chromatic aberration of magnification (CC), when an object of infinite distance is in focus according to the fifth example.

FIG. 10 is a diagram showing spherical aberration (SA), astigmatism (AS), distortion (DT), and chromatic aberration of magnification (CC), when an object of infinite distance is in focus according to the fifth example. The SA, AS, DT and CC plots shown in FIG. 10 are based on an implementation of the fifth example in accordance with numerical data provided below.

A further exemplary embodiment of an imaging optical system will now be described. The imaging optical system of the present invention comprising, in order from an object side: a first lens having a positive refractive power; a second lens having a negative refractive power; a third lens having a positive refractive power; a fourth lens having a positive refractive power; and a fifth lens having a negative refractive power, wherein an aperture is provided at an endmost position on the object side, and the following conditional expression (132) is satisfied:

$$-1.5 < f2/f < -0.73 \qquad (132),$$

where f2 is a focal length of the second lens, and f is a focal length of the whole optical system.

In the imaging optical system of the present embodiment, an arrangement of refractive powers is, in order from the object side: positive, negative, positive, positive, and negative. By adopting such an arrangement of refractive powers, the position of a principal point of the imaging optical system can be shifted toward the object side. Consequently, because the length of the optical system can be shortened, compared to the focal length of the optical system, a shortening of the overall length of the optical system can be realized.

By adopting such a configuration with five lenses in which the fourth lens has a positive refractive power, the diversion of extra-axial rays can be suppressed with the fourth lens. Therefore, the diameter of the fifth lens can be reduced without sacrificing the telecentricity of the optical system.

In the imaging optical system of the present embodiment, by providing an aperture at an endmost position on the object side, the exit pupil can be kept away from the image plane. This feature promotes the reduction of the whole length of whole optical system and helps to avoid the sensitivity degradation in the peripheral area of the imager without sacrificing the telecentricity of the optical system.

Further, the imaging optical system of the present embodiment satisfies the conditional expression (132). The conditional expression (132) is a favorable conditional expression for correcting chromatic aberration and field curvature. By satisfying the conditional expression (132), chromatic aberration and field curvature can be well corrected.

When the upper limit of the conditional expression (132) is exceeded, the negative refractive power of the second lens becomes so strong that field curvature is overcorrected. When the lower limit of the conditional expression (132) is not reached, the negative refracting power of the second lens becomes so small that the correction of chromatic aberration is difficult.

It is preferable that the following conditional expression (132') be satisfied instead of the conditional expression (132):

$$-1.27 < f2/f < -0.73 \quad (132').$$

It is more preferable that the following conditional expression (132") be satisfied instead of the conditional expression (132):

$$-0.99 < f2/f < -0.73 \quad (132").$$

In the imaging optical system of the present embodiment, it is preferable that the third lens be a glass lens and that the following conditional expression (131) be satisfied:

$$1.7 < nd3 \quad (131),$$

where $nd3$ is a refractive index of the third lens for d-line.

By making the third lens a glass lens, the wavelength dispersion of the third lens and that of the fourth lens can be different. Consequently, the correction of chromatic aberration for paraxial rays and the correction of chromatic aberration of magnification for extra-axial rays can be accomplished at the same time.

By satisfying the conditional expression (131), because materials of high refractive index can be used for the lens, field curvature can be well corrected. Especially when a designer tries to shorten the whole length of the optical system, it often occurs that field curvature bends towards the object side (the field curvature becomes a convex one facing the object side). Satisfying the conditional expression (131) reduces such bending.

In the imaging optical system of the present embodiment, it is preferable that the refractive index of the fourth lens monotonically changes such that the refractive index of a center portion is higher than that of a peripheral portion and that the following expression (133) be satisfied:

$$0.001 < 1/v3 - 1/v4 < 0.01 \quad (133),$$

where $v3$ is an Abbe number of the third lens, and $v4$ is an Abbe number of the fourth lens.

The conditional expression (133) is a favorable conditional expression for well correcting chromatic aberration on the optical axis and well correcting chromatic aberration of magnification in a peripheral area.

When the upper limit of the conditional expression (133) is exceeded, a chromatic aberration of magnification of the fourth lens becomes too large to correct well. When the lower limit of the conditional expression is not reached, it becomes difficult to correct chromatic aberration of magnification in a peripheral area.

It is preferable that the following conditional expression (133') be satisfied instead of the conditional expression (133):

$$0.002 < 1/v3 - 1/v4 < 0.009 \quad (133').$$

It is further more preferable that the following conditional expression (133") be satisfied instead of the conditional expression (133):

$$0.003 < 1/v3 - 1/v4 < 0.008 \quad (133").$$

In the imaging optical system of the present invention, it is preferable that the following conditional expression (134) be satisfied:

$$0.95 < f3/f4 < 6.8 \quad (134),$$

where f3 is a focal length of the third lens and f4 is a focal length of the fourth lens.

The conditional expression (134) is a favorable conditional expression for properly distributing the refractive powers of the third and fourth lens. By satisfying the conditional expression (134), the refractive power of the third lens and that of the fourth lens can be distributed properly. Consequently, aberrations of extra-axial rays can be well corrected and the degradation of decentering sensitivity caused by the shortening of the whole length of the optical system can be eased.

When the upper limit of the conditional expression (134) is exceeded, the refractive power of the fourth lens becomes too large compared to that of the third lens. Consequently, because the balance of the refractive powers shifts towards the fourth lens, the sensitivity to production errors in the fourth lens becomes too large. When the lower limit of the conditional expression (134) is not reached, because the refractive power of the third lens becomes too large, the exit angle of extra-axial rays exiting from the third lens becomes small and the height of rays in the fourth lens cannot be high enough. In such a case, the difference between the height of extra-axial rays in the third lens and that in the fourth lens becomes small. Consequently, the correction of coma aberration and of a high degree of field curvature become difficult.

It is preferable that the following conditional expression (134') be satisfied instead of the conditional expression (134):

$$1.46 < f3/f4 < 4.4 \quad (134').$$

It is further more preferable that the following conditional expression (134") be satisfied instead of the conditional expression (134):

$$1.8 < f3/f4 < 3.4 \quad (134").$$

In the imaging optical system of the present embodiment, it is preferable that the object side surface of the third lens be a convex surface.

By making the surface of the third lens facing the object side convex, a proper distance between the second and third lenses can be kept, even in a peripheral area of the lenses. Consequently, the peripheral area of the second lens does not contact that of the third lens. Further, because the distance on the optical axis between the second and third lenses can be short, various aberrations, especially coma aberration, can be well corrected, and a shortening of the overall length of the optical system can be accomplished.

In the imaging optical system of the present embodiment, it is preferable that the following conditional expression (135) be satisfied:

$$0.25 < r6/f < 14 \quad (135),$$

where r6 is a paraxial curvature radius of the object side surface of the third lens and f is a focal length of the whole optical system.

The conditional expression (135) is a favorable conditional expression for well correcting various aberrations, especially coma aberration, while the whole length of the optical system is kept short. By satisfying the conditional expression (135), various aberrations, especially coma aberration, can be well corrected while the overall length of the optical system is kept short.

When the upper limit of the conditional expression (135) is exceeded, a paraxial curvature radius of the object side surface of the third lens becomes large. In case the image side surface of the second lens is a concave surface, enlarging the paraxial curvature radius of the object side surface of the third lens makes the distance between the second and third lenses in a peripheral area short. Consequently, when a designer tries to shorten the distance between the second and third lenses in order to shorten the overall length of the optical system, because the shape of the image side surface of the second lens and that of the object side surface of the third lens are restricted, the correction of aberrations, especially coma aberration, becomes difficult. When the lower limit of the conditional expression (135) is not reached, a paraxial curvature radius of the object side surface of the third lens becomes small. In this case, because the incident angle of rays on the object side surface of the third lens becomes sharp, coma aberration caused in the third lens becomes large.

It is preferable that the following conditional expression (135') be satisfied instead of the conditional expression (135):

$$0.38 < r6/f < 9.1 \tag{135'}$$

It is further more preferable that the following conditional expression (135") be satisfied instead of the conditional expression (135):

$$0.49 < r6/f < 7 \tag{135"}$$

In the imaging optical system of the present embodiment, it is preferable that the following conditional expression (136) be satisfied:

$$-5.4 < (r6+r7)/(r6-r7) < 1 \tag{136}$$

where r6 is a paraxial curvature of the object side surface of the third lens and r7 is a paraxial curvature of the image side surface of the third lens.

The conditional expression (136) is a favorable expression for well correcting aberration of extra-axial rays. By satisfying the conditional expression (136), aberrations of extra-axial rays can be well corrected.

In case the object side surface of the third lens is a convex surface, when the upper limit of the conditional expression (136) is exceeded, because a paraxial curvature radius of the third lens becomes too small, the refractive power of the third lens becomes too strong. Consequently, the differences between the height of extra-axial rays in the third lens and that in the fourth lens become small, making the corrections of coma aberration and of a high degree of field curvature difficult. When the lower limit of the conditional expression (136) is not reached, the negative refractive power of the image side surface of the third lens becomes large. Consequently, because the incident angle of extra-axial rays on the image side surface of the third lens becomes large, the correction of coma aberration becomes difficult.

It is preferable that the following conditional expression (136') be satisfied instead of the conditional expression (136):

$$-3.5 < (r6+r7)/(6-r7) < 0.6 \tag{136'}$$

It is further more preferable that the following conditional expression (136") be satisfied instead of the conditional expression (6):

$$-2.71 < (r6+r7)/(6-r7) < 0.5 \tag{136"}$$

In the imaging optical system of the present embodiment, it is preferable that the first lens be a biconvex lens. By making the shape of the first lens a biconvex shape, the generation of coma aberration decreases and shortening the whole optical system becomes possible.

In the imaging optical system of the present embodiment, it is preferable that the second lens be a meniscus lens having a convex surface facing the object side. By making the shape of the second lens a meniscus shape having a convex surface facing the object side, chromatic aberration can be well corrected, and extra-axial aberrations such as coma aberration and field curvature can be well corrected.

In the imaging optical system of the present embodiment, it is preferable that the fourth lens be a meniscus lens having a concave surface facing the object side. By making the shape of the fourth lens a meniscus shape having a concave surface facing the object side, the generation of coma aberration can be suppressed.

In the imaging optical system of the present embodiment, it is preferable that the following conditional expression (137) be satisfied:

$$0.14 < (r10+r11)/(r10-r11) < 2.7 \tag{137}$$

where r10 is a paraxial curvature radius of the object side surface of the fifth lens and r11 is a paraxial curvature radius of the image side surface of the fifth lens.

The conditional expression (137) is a favorable conditional expression for maintaining the telecentricity of the optical system and keeping coma aberration well corrected. By satisfying the conditional expression (137), because the distance of the fifth lens to the image plane can be kept long enough, the telecentricity of the optical system can be retained. Further, reducing the effective diameter of the fifth lens and good correction of coma aberration can be accomplished.

When the upper limit of the conditional expression (137) is exceeded, a paraxial curvature radius of the image side surface of the fifth lens becomes small. In this case, because the incident angle of extra-axial rays on the image side surface of the fifth lens becomes large, the correction of coma aberration becomes difficult. When the lower limit of the conditional expression (137) is not reached, because the position of a principal point of the fifth lens shifts towards the object side, the back-focus length shortens. Consequently, it is difficult to reduce the effective diameter of the fifth lens while maintaining the telecentricity of the optical system.

It is preferable that the following conditional expression (137') be satisfied instead of the conditional expression (137):

$$0.21 < (r10+r11)/(r10-r11) < 1.77 \tag{137'}$$

It is further more preferable that the following conditional expression (137") be satisfied instead of the conditional expression (137):

$$0.26 < (r10+r11)/(r10-r11) < 1.37 \tag{137"}$$

In the imaging optical system of the present embodiment, it is preferable that the first, second, fourth, and fifth lenses be formed from resin. By using resin in the first, second, fourth, and fifth lenses, an imaging optical system with a low cost can be provided.

Examples of imaging optical systems will now be described with reference to the accompanying drawings. The present invention is not limited to the examples described below. An aperture (in the examples aperture stop S) is located at an endmost position on the object side of the imaging optical system. In the exemplary embodiments shown, the aperture is located away from the image side surface of the first lens towards the object side. More specifically, the aperture S is located at, or further towards the object side than the fringe position (or perimeter) of the effective object side surface of the first lens L1.

Figure 11:
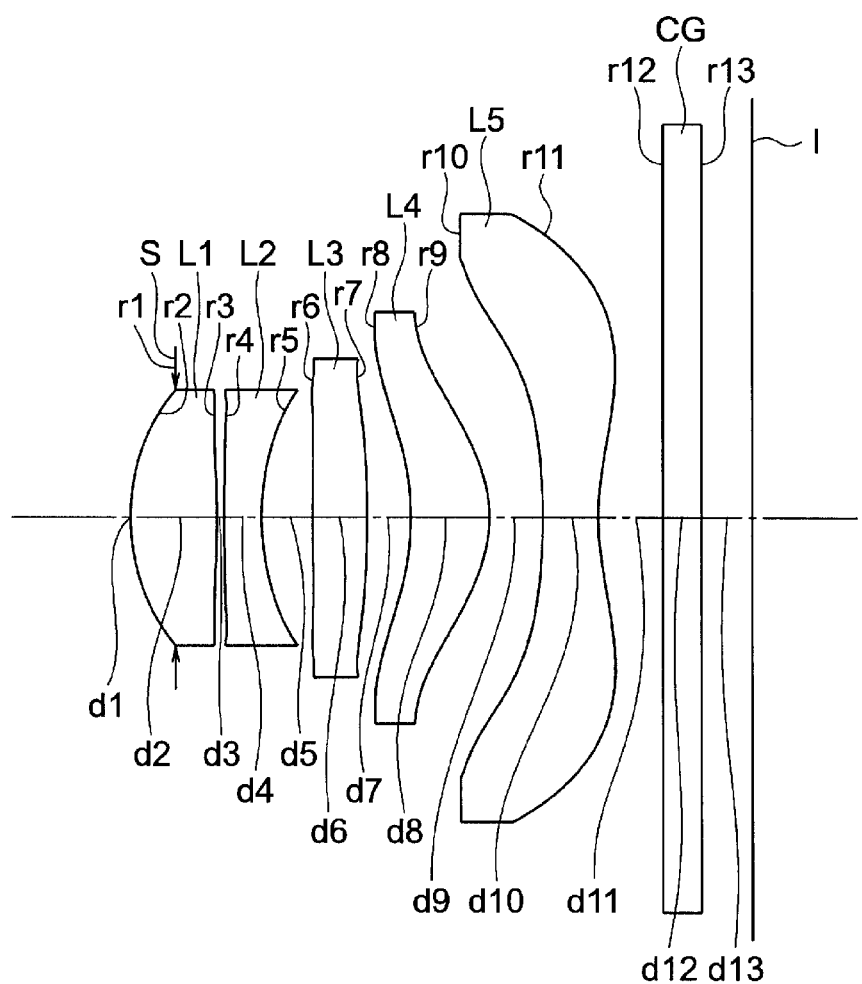
FIG. 11 is a cross-sectional view along an optical axis showing an optical configuration of an imaging optical system of a sixth example of the present invention when an object of infinite distance is in focus.

An imaging optical system according to a sixth example will now be described with reference to FIGS. 11 and 12. FIG. 11 is a cross-sectional view along an optical axis showing an optical configuration when an object at infinite distance is in focus according to the sixth example of the present invention.

As shown in FIG. 11, the imaging optical system of the example comprises, in order from the object side, an aperture stop S, a first lens L1 having a positive refractive power, a second lens L2 having a negative refractive power, a third lens L3 having a positive refractive power, a fourth L4 lens having a positive refractive power and a fifth lens L5 having a negative refractive power.

The first lens L1 is a biconvex positive lens. The second lens L2 is a negative meniscus lens having a convex surface facing the objective side. The third lens L3 is a biconvex positive lens. The fourth lens L4 is a positive meniscus lens having a convex surface facing the image side. The fifth lens L5 is a biconcave negative lens.

An aspheric surface is applied to the both sides of all lenses, from the first lens L1 to the fifth lens L5.

Figure 12:
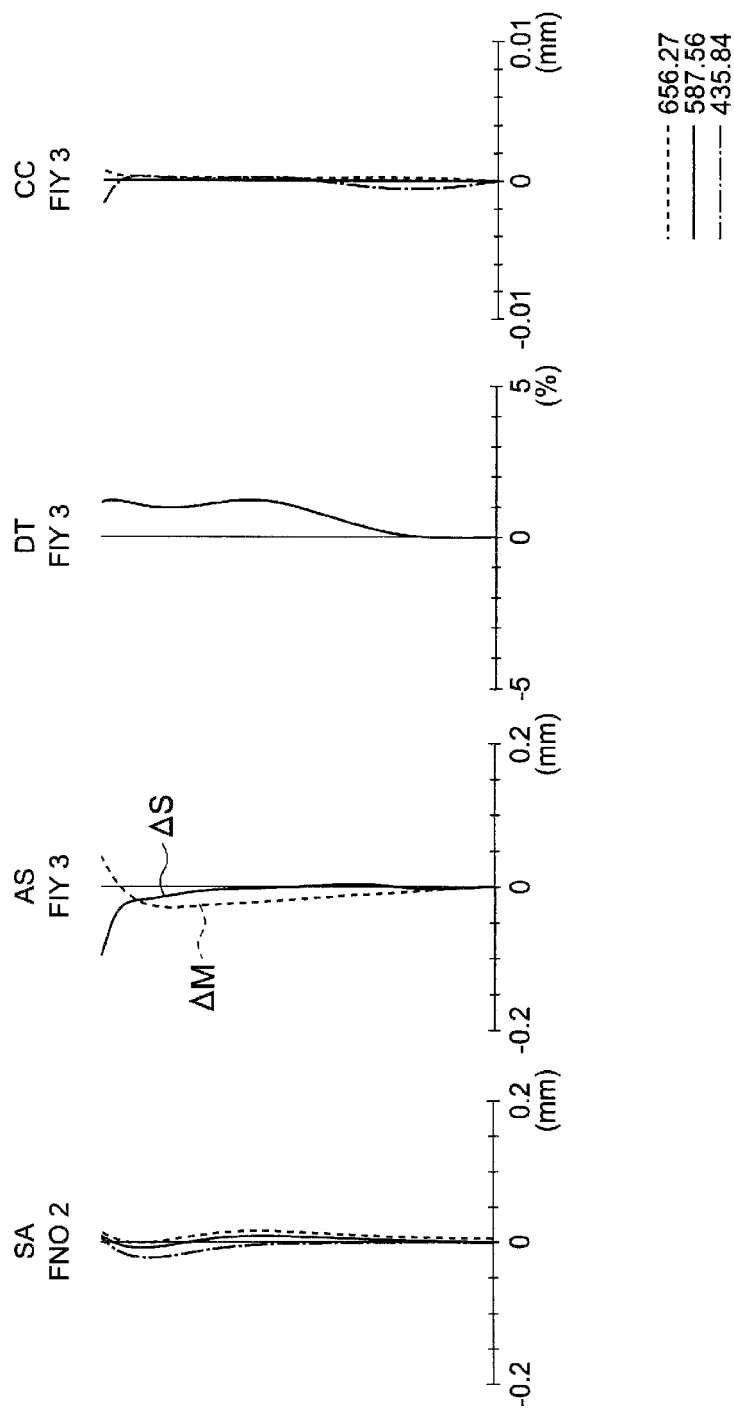
FIG. 12 is a diagram showing a spherical aberration (SA), an astigmatism (AS), a distortion (DT), a chromatic aberration of magnification (CC) of the imaging optical system of the sixth example when an object of infinite distance is in focus.

FIG. 12 is a diagram showing spherical aberration (SA), astigmatism (AS), distortion (DT), and chromatic aberration of magnification (CC), when an object at infinite distance is in focus according to the sixth example. The SA, AS, DT and CC plots shown in FIG. 12 are based on an implementation of the sixth example in accordance with numerical data provided below.

Figure 13:
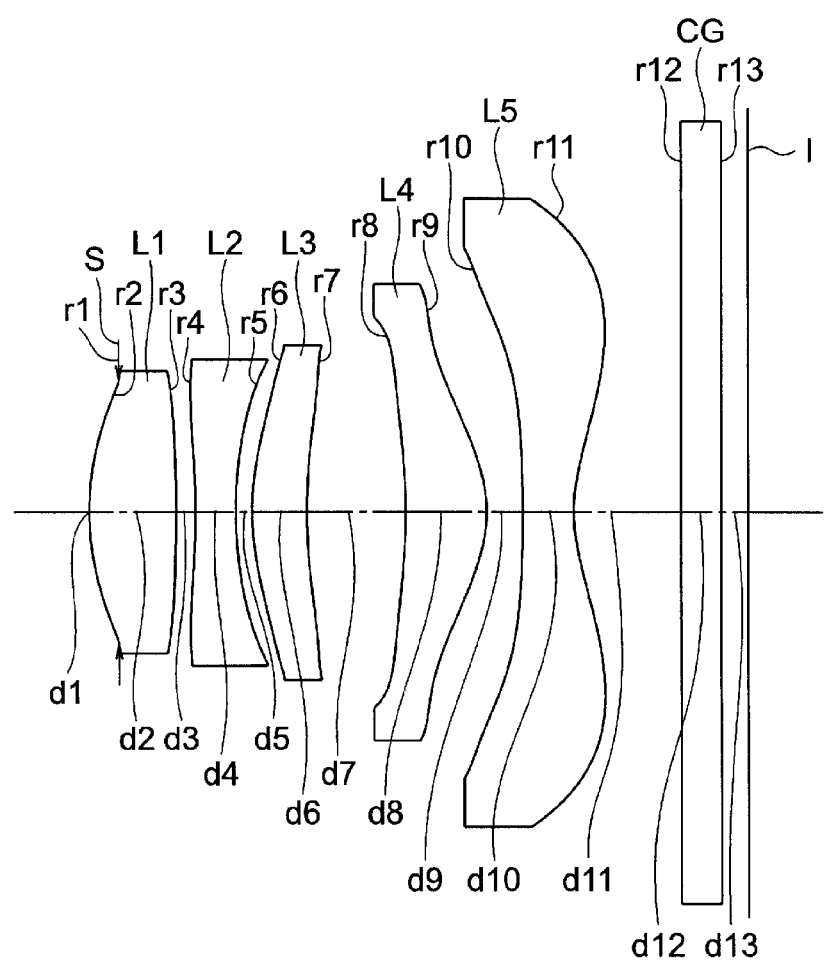
FIG. 13 is a cross-sectional view along an optical axis showing an optical configuration of an imaging optical system of a seventh example of the present invention when an object of infinite distance is in focus.

Next, an imaging optical system according to a seventh example will be described with reference to FIGS. 13 and 14. FIG. 13 is a cross-sectional view along an optical axis showing an optical configuration when an object of infinite distance is in focus according to the seventh example of the present invention.

As shown in FIG. 13, the imaging optical system of the seventh example comprises, in order from the object side, an aperture stop S, a first lens L1 having a positive refractive power, a second lens L2 having a negative refractive power, a third lens L3 having a positive refractive power, a fourth L4 lens having a positive refractive power, and a fifth lens L5 having a negative refractive power.

The first lens L1 is a biconvex positive lens. The second lens L2 is a biconcave negative lens. The third lens L3 is a positive meniscus lens having a convex surface facing the object side. The fourth lens L4 is a positive meniscus lens having a convex surface facing the image side. The fifth lens L5 is a biconcave negative lens.

An aspheric surface is applied to the both sides of all lenses, from the first lens L1 to the fifth lens L5.

Figure 14:
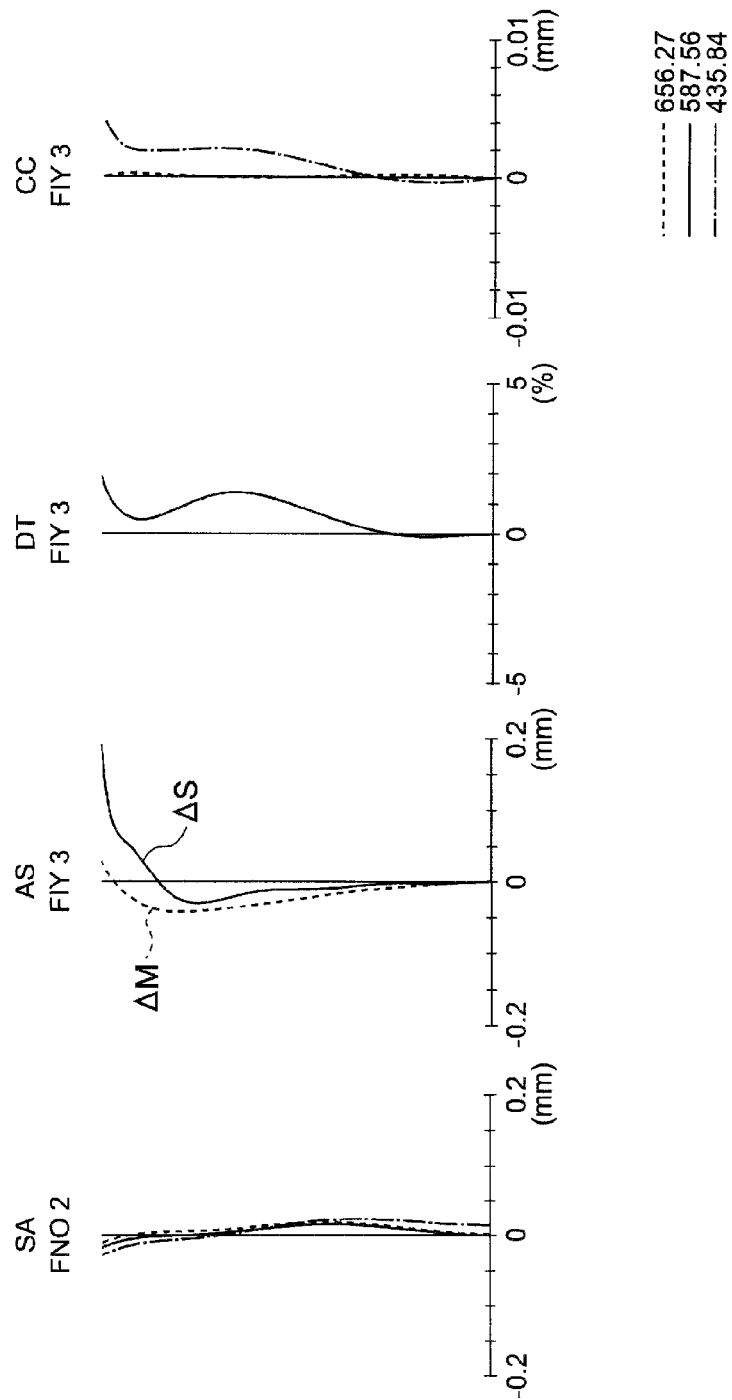
FIG. 14 is a diagram showing a spherical aberration (SA), an astigmatism (AS), a distortion (DT), a chromatic aberration of magnification (CC) of the imaging optical system of the seventh example when an object of infinite distance is in focus.

FIG. 14 is a diagram showing spherical aberration (SA), astigmatism (AS), distortion (DT), and chromatic aberration of magnification (CC), when an object at infinite distance is in focus according to the seventh example. The SA, AS, DT and CC plots shown in FIG. 14 are based on an implementation of the seventh example in accordance with numerical data provided below.

Figure 15:
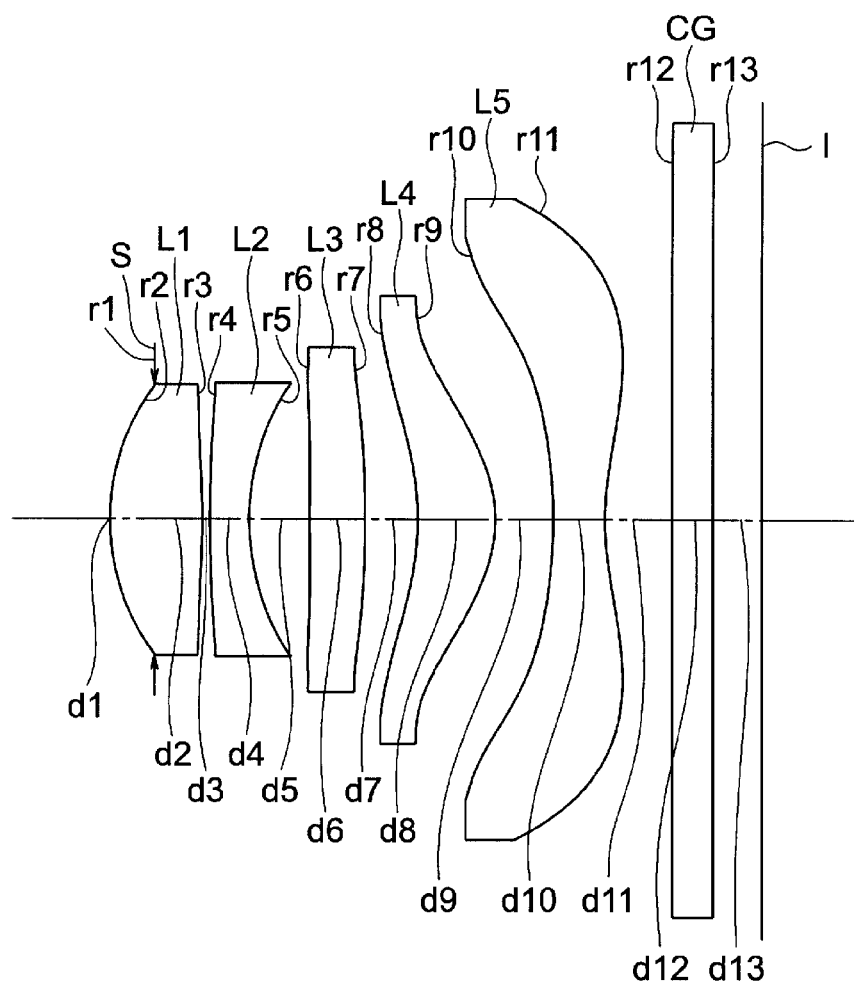
FIG. 15 is a cross-sectional view along an optical axis showing an optical configuration of an imaging optical system of an eighth example of the present invention when an object of infinite distance is in focus.

Next, an imaging optical system according to an eighth example will be described with reference to FIGS. 15 and 16. FIG. 15 is a cross-sectional view along an optical axis showing an optical configuration when an object at infinite distance is in focus according to the eighth example of the present invention.

As shown in FIG. 15, the imaging optical system of the eighth example comprises, in order from the object side, an aperture stop S, a first lens L1 having a positive refractive power, a second lens L2 having a negative refractive power, a third lens L3 having a positive refractive power, a fourth L4 lens having a positive refractive power and a fifth lens L5 having a negative refractive power.

The first lens L1 is a biconvex positive lens. The second lens L2 is a negative meniscus lens having a convex surface facing the objective side. The third lens L3 is a biconvex positive lens. The fourth lens L4 is a positive meniscus lens having a convex surface facing the image side. The fifth lens L5 is a biconcave negative lens.

An aspheric surface is applied to the both sides of all lenses, from the first lens L1 to the fifth lens L5.

Figure 16:
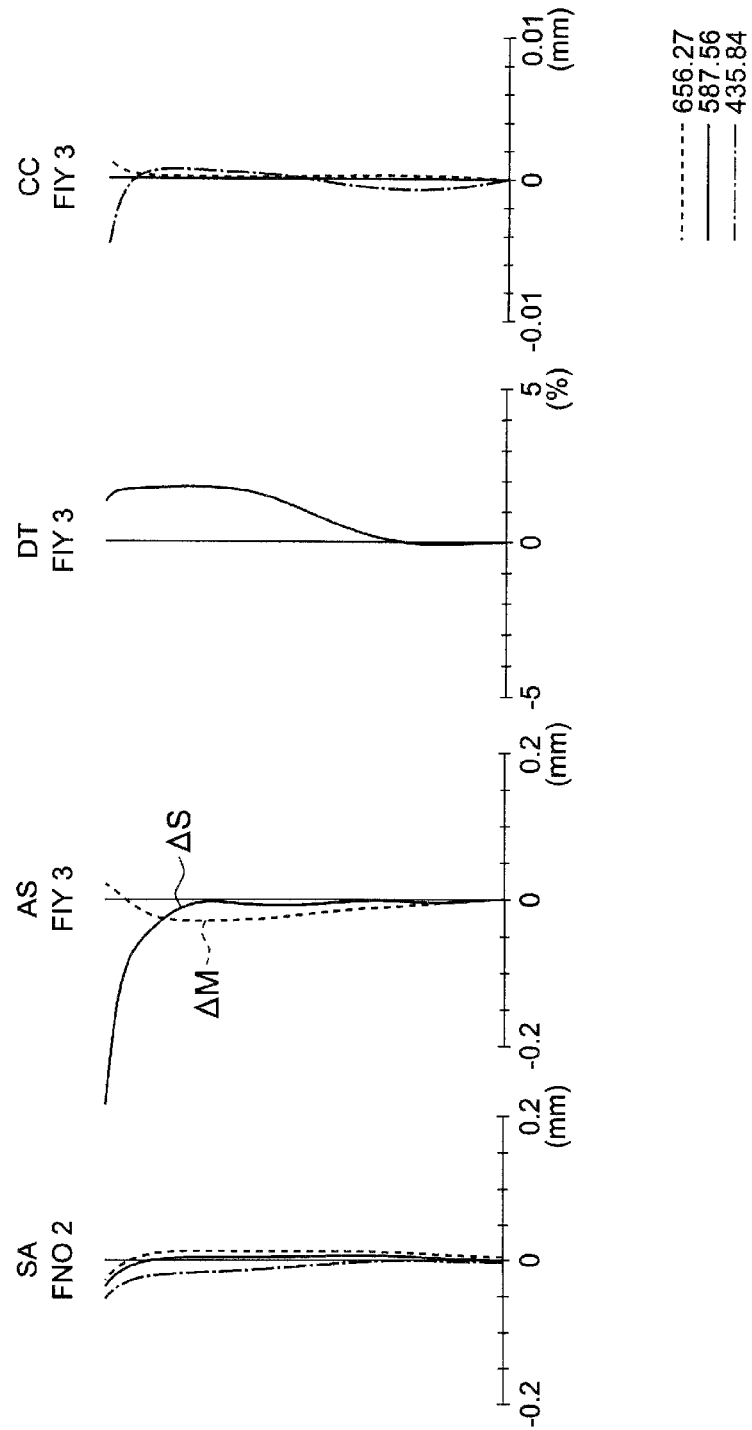
FIG. 16 is a diagram showing a spherical aberration (SA), an astigmatism (AS), a distortion (DT), a chromatic aberration of magnification (CC) of the imaging optical system of the eighth example when an object of infinite distance is in focus.

FIG. 16 is a diagram showing spherical aberration (SA), astigmatism (AS), distortion (DT), and chromatic aberration of magnification (CC), when an object of infinite distance is in focus according to the eighth example. The SA, AS, DT and CC plots shown in FIG. 16 are based on an implementation of the eighth example in accordance with numerical data provided below.

Figure 17:
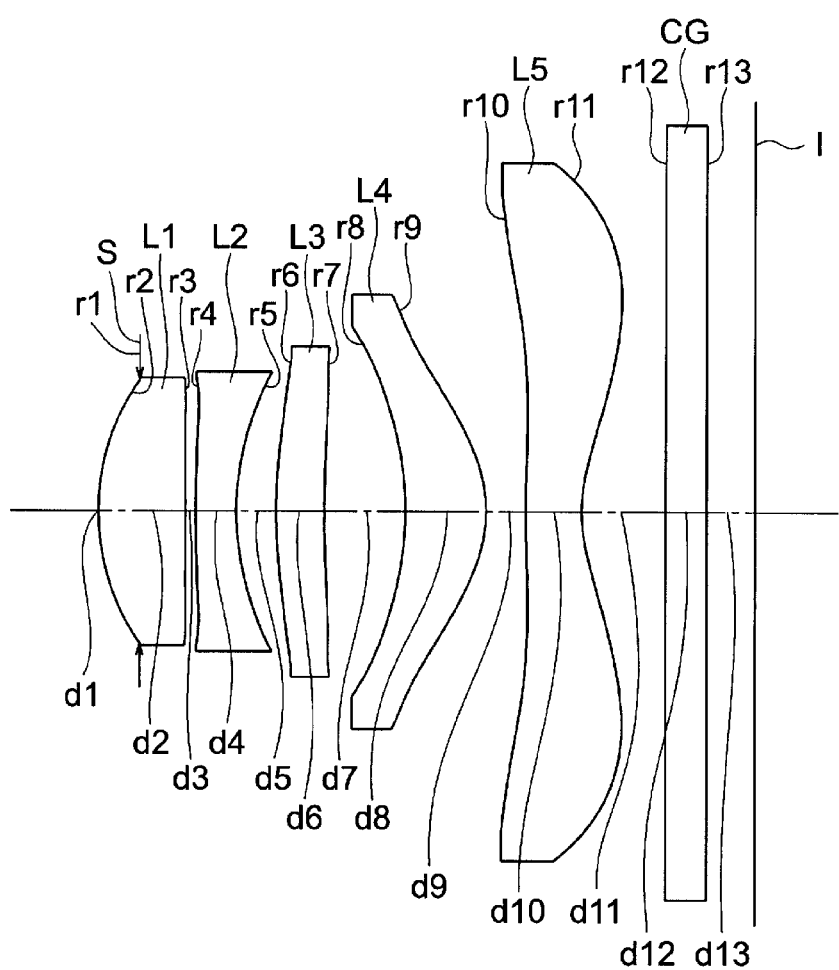
FIG. 17 is a cross-sectional view along an optical axis showing an optical configuration of an imaging optical system of a ninth example of the present invention when an object of infinite distance is in focus.

Next, an imaging optical system according to a ninth example will be described with reference to FIGS. 17 and 18. FIG. 17 is a cross-sectional view along an optical axis showing an optical configuration when an object of infinite distance is in focus according to the ninth example of the present invention.

As shown in FIG. 17, the imaging optical system of the ninth example comprises in order from the object side, an aperture stop S, a first lens L1 having a positive refractive power, a second lens L2 having a negative refractive power, a third lens L3 having a positive refractive power, a fourth L4 lens having a positive refractive power, and a fifth lens L5 having a negative refractive power.

The first lens L1 is a biconvex positive lens. The second lens L2 is a negative meniscus lens having a convex surface facing the object side. The third lens L3 is a positive meniscus lens having a convex surface facing the object side. The fourth lens L4 is a positive meniscus lens having a convex surface facing the image side. The fifth lens L5 is a negative meniscus lens having a convex surface facing the object side.

An aspheric surface is applied to the both sides of all lenses, from the first lens L1 to the fifth lens L5.

Figure 18:
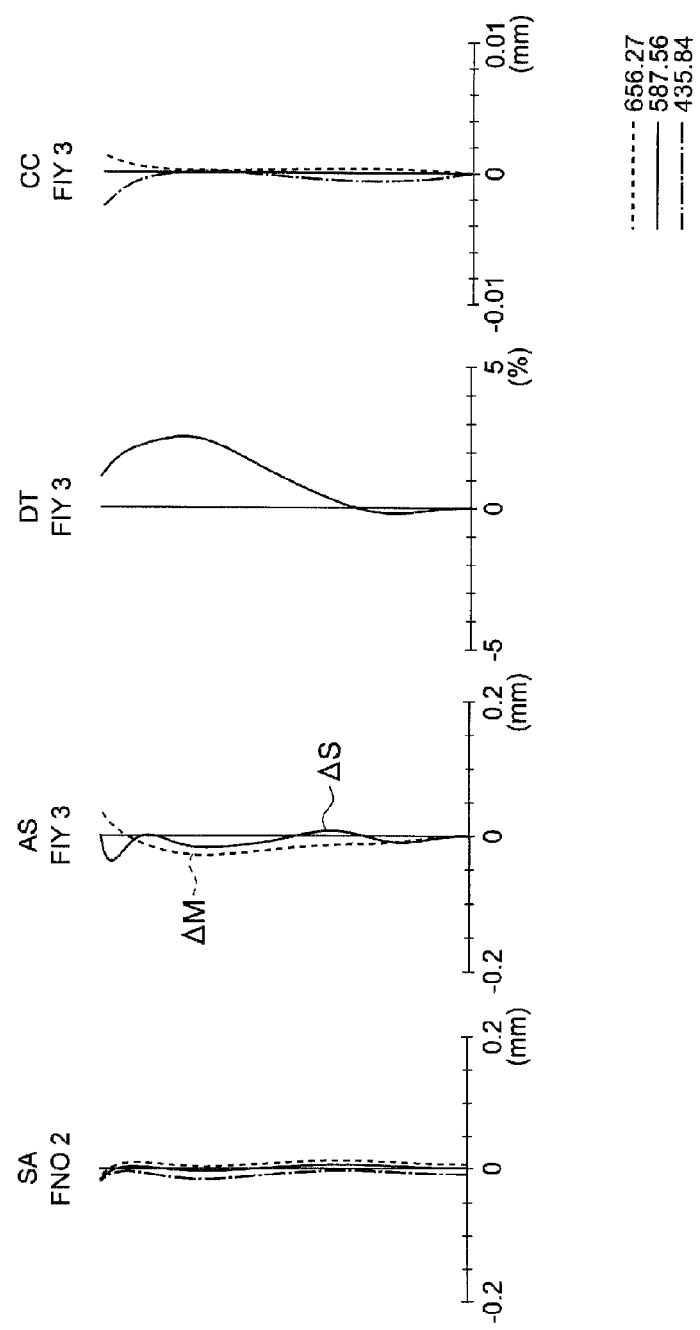
FIG. 18 is a diagram showing a spherical aberration (SA), an astigmatism (AS), a distortion (DT), a chromatic aberration of magnification (CC) of the imaging optical system of the ninth example when an object of infinite distance is in focus.

FIG. 18 is a diagram showing spherical aberration (SA), astigmatism (AS), distortion (DT), and chromatic aberration of magnification (CC), when an object of infinite distance is in focus according to the ninth example. The SA, AS, DT and CC plots shown in FIG. 18 are based on an implementation of the ninth example in accordance with numerical data provided below.

A further exemplary embodiment of an imaging optical system will now be described. The imaging optical system of the present embodiment comprises, a first lens having a positive refractive power, a second lens having a negative refractive power, a third lens having a positive refractive power, a fourth lens having a positive refractive power, and a fifth lens having a negative refractive power. In addition, an aperture stop is provided at the endmost position on the object side and the following conditional expression (141) is satisfied:

$$-11.2 < r3/f1 < -0.9 \qquad (141),$$

where r3 is a paraxial curvature radius of an imaging side surface of the first lens, and f1 is a focal length of the first lens.

In the optical system of the present embodiment, an arrangement of refractive powers is, in order from the object side: positive, negative, positive, positive, and negative. By adopting such an arrangement of refractive powers, the principal point of the imaging optical system can be shifted toward the object side. Consequently, the overall length of the optical system can be shortened compared with the focal length of the whole optical system.

Moreover, by adopting such a configuration with five lenses in which the fourth lens has a positive refractive power, the diversion of extra-axial rays can be suppressed by the fourth lens. Therefore, the diameter of the fifth lens can be diminished without sacrificing the telecentricity of the optical system.

In the optical system of the present embodiment, by providing an aperture stop at an endmost position on the object side, the exit pupil can be kept away from the image plane. This feature promotes a reduction of the overall length of the optical system, and helps to avoid the degradation of sensitivity in the peripheral area of the imager without sacrificing the telecentricity of the optical system.

The imaging optical system of the present embodiment satisfies the conditional expression (141). The conditional expression (141) describes a desirable condition to provide good correction of spherical aberration and coma aberration. By satisfying the condition (141), spherical aberration and coma aberration can be well corrected.

When the upper limit of the conditional expression (141) is exceeded, a paraxial curvature radius of the image side surface of the first lens becomes small, making the correction of spherical aberration difficult. When the lower limit of the conditional expression (141) is not reached, the paraxial curvature radius of the image side surface of the first lens becomes so large that the incident angle of extra-axial light rays on the image side surface of the first lens becomes sharp, making the correction of coma aberration difficult.

It is preferable to satisfy the following conditional expression (141') instead of the conditional expression (141):

$$-8.5 < r3/f1 < -2.1 \qquad (141')$$

It is more preferable to satisfy the following conditional expression (141") instead of the conditional expression (141):

$$-5.4 < r3/f1 < -2.3 \qquad (141'')$$

In the imaging optical system of the present embodiment, it is preferable that the first lens be a glass lens. By using glass of a high refractive index, because the paraxial curvature radii of the first lens can be enlarged on both the image and object side surfaces while retaining the refractive power of the first lens, several aberrations can be easily corrected.

In the imaging optical system of the present embodiment, it is preferable that the following conditional expression (142) be satisfied:

$$1.54 < nd1 \qquad (142),$$

where nd1 is a refractive index of the first lens for d-line.

The conditional expression (142) is a favorable condition for well correcting aberrations such as spherical aberration, and diminishing the variation of distortions caused by production errors.

When the lower limit of the conditional expression (142) is not reached, it becomes difficult to retain the refractive power of the first lens while the paraxial curvatures of the image and object side surfaces of the first lens are kept small.

It is preferable that the following conditional expression (142') be satisfied instead of the conditional expression (142):

$$1.58 < nd1 \qquad (142').$$

It is further more preferable that the following conditional expression (142") be satisfied instead of the conditional expression (142):

$$1.65 < nd1 \qquad (142'').$$

In the imaging optical system of the present embodiment, it is preferable that the following conditional expression (143) be satisfied:

$$0.7 < r2/f1 < 1.2 \qquad (143),$$

where r2 is a paraxial curvature radius of the object side surface of the first lens and f1 is a focal length of the first lens.

The conditional expression (143) indicates favorable conditions for correcting coma aberration caused by shortening the total length of the optical system, and for diminishing the fluctuation of distortions caused by production errors. By satisfying the conditional expression (143), coma aberration and the variation of distortion can be suppressed.

When the upper limit of the conditional expression (143) is exceeded, a paraxial curvature radius of the object side surface of the first lens becomes large, making it difficult to shift the principal point towards the object side. Therefore, the shortening of the overall length of the optical system becomes difficult. When the lower limit of the conditional expression (143) is not reached, the paraxial curvature radius of the object side surface of the first lens becomes small, making correction of coma aberration difficult.

It is preferable that the following conditional expression (143') be satisfied instead of the conditional expression (143):

$$0.8 < r2/f1 < 1.15 \qquad (143').$$

It is further more preferable that the following conditional expression (143") be satisfied instead of the conditional expression (143):

$$0.85 < r2/f1 < 1.1 \qquad (143'').$$

In the imaging optical system of the present embodiment, it is preferable that the following condition (144) be satisfied:

$$0.2 < f3/f4 < 5 \qquad (144),$$

where f3 is a focal length of the third lens and f4 is a focal length of the fourth lens.

The conditional expression (144) is a favorable conditional expression for properly distributing the refractive powers of the third and fourth lenses. By satisfying the conditional expression (144), it becomes possible to distribute the refractive powers of the third lens and the fourth lens in good balance. Consequently, aberrations of extra-axial rays are well corrected and the worsening of the decentering sensitivity caused by the shorting of the optical length is reduced.

When the upper limit of the conditional expression (144) is exceeded, the refractive power of the fourth lens becomes too large compared with that of the third lens. Consequently, the fourth lens has so much refractive power that the sensitivity to production error for the fourth lens increases. When the lower limit of the conditional expression (144) is not reached, the refractive power of the third lens becomes large, so the exit angle of an extra-axial ray exiting from the third lens becomes small. Therefore, a height of a light ray on the fourth lens cannot be sufficiently high, and the difference of height between an extra-axial light ray on the third lens and that on the fourth lens becomes small. This makes the correction of coma aberration and of a high degree of field curvature difficult.

It is preferable to satisfy the following conditional expression (144') instead of the conditional expression (144):

$$0.8 < f3/f4 < 3.8 \qquad (144').$$

It is further more preferable to satisfy the following condition (144") instead of the conditional expression (144):

$$1.4 < f3/f4 < 2.6 \qquad (144'').$$

In the imaging optical system of the present embodiment, it is preferable that the object side surface of the third lens be a convex surface.

By making the object side surface of the third lens a convex surface, the distance between the second lens and the third lens can be kept appropriate even in the peripheral area of the lenses. Therefore, there is no contact between the peripheral region of the second lens and that of the third lens. Further, because the distance between the second and third lenses can be set small on the optical axis, a shortening of the overall length of the optical system can be accomplished, even while various aberrations, especially coma aberration, are well corrected.

In the imaging optical system of the present embodiment, it is preferable that the following conditional expression (145) be satisfied:

$$0.2 < r6/f < 4.2 \quad (145),$$

where r6 is a paraxial curvature radius of the object side surface of the third lens and f is a focal length of the whole imaging optical system.

The conditional expression (145) represents favorable conditions for correcting various aberrations, especially coma aberration, while the overall length of the optical system is kept short. By satisfying the conditional expression (145), various aberrations, especially coma aberration, can be corrected while the overall length of the optical system is shortened.

When the upper limit of the conditional expression (145) is exceeded, a paraxial curvature radius of the third lens becomes large. In cases in which the image side surface of the second lens is a concave surface, if a paraxial curvature radius of the third lens becomes large, the distance between the second lens and the third lens decreases. Therefore, when a designer tries to shorten the distance between the second and third lenses in order to shorten the overall length of the optical system, the shape of the image side surface of the second lens and the shape of the object side surface of the third lens are restricted, thus making the correction of aberrations, especially coma aberration, difficult. When the lower limit of the conditional expression (145) is not reached, the paraxial curvature radius of the image side surface of the third lens becomes small. In this case, because the light incident angle on the image side surface of the third lens becomes sharp, coma aberration caused by the third lens enlarges.

It is preferable that the following conditional expression (145') be satisfied instead of the conditional expression (145):

$$0.4 < r6/f < 3 \quad (145').$$

It is further more preferable that the following conditional expression (145") be satisfied instead of the conditional expression (145):

$$0.6 < r6/f < 1.8 \quad (145").$$

In the imaging optical system of the present embodiment, it is preferable that the following conditional expression (146) be satisfied:

$$-6.4 < (r6+r7)/(r6-r7) < 1 \quad (146),$$

where r6 is a paraxial curvature radius of the object side surface of the third lens and r7 is a paraxial curvature radius of the image side surface of the third lens.

The conditional expression (146) is a favorable conditional expression to correct aberrations of extra-axial light rays. By satisfying the conditional expression (146), aberrations of the extra-axial light rays can be well corrected.

In case the object side surface of the third lens is a convex surface, if the upper limit of the conditional expression (146) is exceeded, because the paraxial curvature radius of the image side surface of the third lens becomes small, the refractive power of the third lens becomes too large. Consequently, because the difference of height between an extra-axial ray on the third lens and that on the fourth lens becomes small, the corrections of coma aberration and of a high degree of field curvature are difficult. When the lower limit of the conditional expression (146) is not reached, the negative refractive power of the image side surface of the third lens becomes large. Consequently, because the incident angle of an extra-axial ray on the imaging side surface becomes large, the correction of coma aberration becomes difficult.

It is preferable that the conditional expression (146') be satisfied instead of the conditional expression (146):

$$-4.2 < (r6+r7)/(r6-r7) < 0.6 \quad (146').$$

It is further more preferable that the conditional expression (146") be satisfied instead of the conditional expression (146):

$$-2 < (r6+r7)/(r6-r7) < 0.2 \quad (146").$$

In the imaging optical system of the present embodiment, it is preferable that the second lens be a meniscus lens having a convex surface facing the object side. By making the shape of the second lens a meniscus having a convex surface facing the object side, chromatic aberration can be well corrected and extra-axial aberrations such as coma aberration and field curvature can be well corrected.

In the imaging optical system of the present embodiment, it is preferable that the fourth lens be a meniscus lens having a concave surface facing the object side. By making the shape of the fourth lens a meniscus having a concave surface facing the object side, the generation of coma aberration can be suppressed.

In the imaging optical system of the present embodiment, it is preferable that the following conditional expression (7) be satisfied:

$$-0.6 < (r10+r11)/(r10-r11) < 2.5 \quad (147),$$

where r10 is a paraxial curvature radius of the object side surface of the fifth lens and r11 is a paraxial curvature radius of the image side surface of the fifth lens.

The conditional expression (147) is a favorable conditional expression to diminish the size of the fifth lens, to keep the telecentricity of the optical system and to correct coma aberration well. By satisfying the conditional expression (147), because the distance between the fifth lens and the image plane can be kept long enough in a peripheral area, the telecentricity of the optical system can be preserved. Further, minimizing the effective diameter of the fifth lens and correcting coma aberration well are possible.

When the upper limit of the conditional expression (147) is exceeded, the paraxial curvature radius of the imaging side surface of the fifth lens becomes small. In this case, because the incident angle of an extra-axial ray on the image side surface of the fifth lens becomes large, the correction of coma aberration is difficult. When the lower limit of the conditional expression (147) is not reached, because the position of the principal point of the fifth lens shifts toward the object side, the length of back-focus becomes short. Consequently, it becomes difficult to minimize the effective diameter of the fifth lens while retaining the telecentricity of the optical system.

It is preferable that the following conditional expression (147') be satisfied instead of the conditional expression (147):

$$-0.1 < (r10+r11)/(r10-r11) < 2.2 \quad (147').$$

It is further more preferable that the following conditional expression (147") be satisfied instead of the conditional expression (147):

$$0.8 < (r10+r11)/(r10-r11) < 1.5 \quad (147").$$

In the optical system of the present embodiment, it is preferable that the second, third, fourth and fifth lenses be formed from resin. By using resin in the second, third, fourth and fifth lenses, an inexpensive imaging optical system can be provided.

Examples of imaging optical systems will now be described with reference to the accompanying drawings. The present invention is not limited to the examples described below. An aperture (in the examples aperture stop S) is located at an endmost position on the object side of the imaging optical system. In the exemplary embodiments shown, the aperture is located away from the image side surface of the first lens towards the object side. More specifically, the aperture S is located at, or further towards the object side than the fringe position (or perimeter) of the effective object side surface of the first lens L1.

Figure 19:
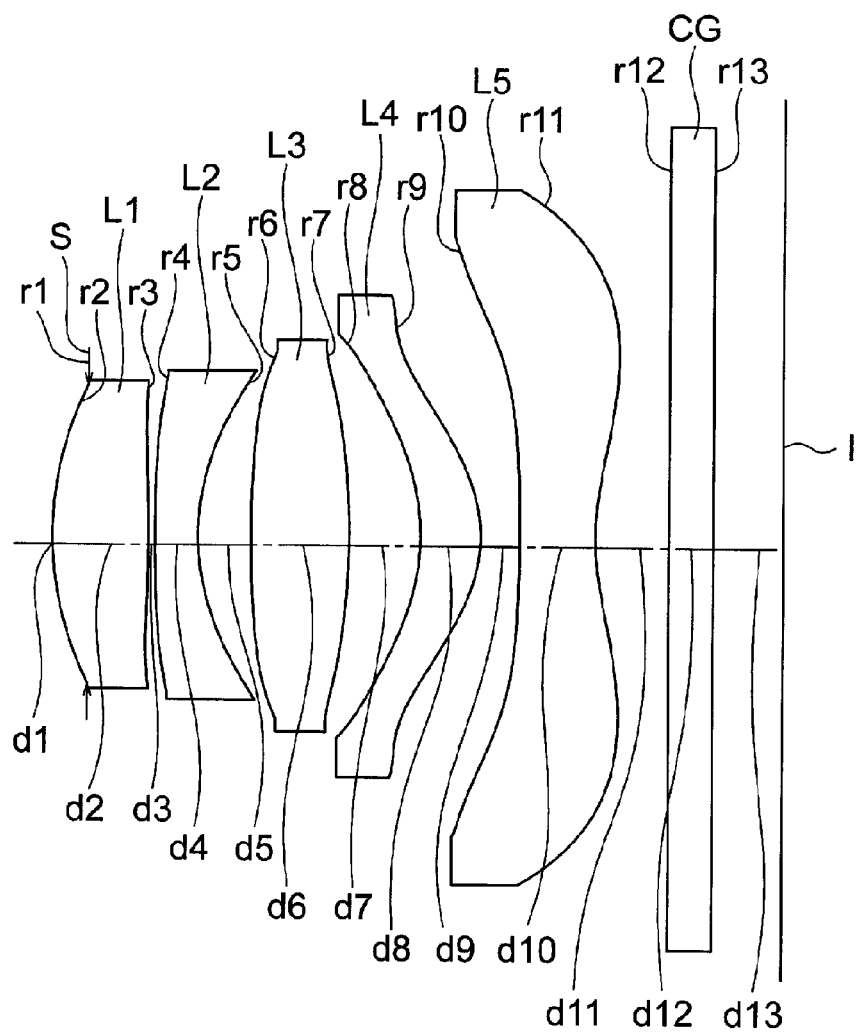
FIG. 19 is a cross-sectional view along an optical axis showing an optical configuration when an object of infinite distance is in focus according to a tenth example of the present invention.

Next, an imaging optical system according to a tenth example will be described with reference to FIGS. 19 and 20. FIG. 19 is a cross-sectional view along an optical axis showing an optical configuration when an object of infinite distance is in focus according to the tenth example of the present invention.

As shown in FIG. 19, the imaging optical system of the example comprises, in order from the object side, an aperture stop S, a first lens L1 having a positive refractive power, a second lens L2 having a negative refractive power, a third lens L3 having a positive refractive power, a fourth lens L4 having a positive refractive power and a fifth lens L5 having a negative refractive power.

The first lens L1 is a biconvex positive lens. The second lens L2 is a negative meniscus lens having a convex surface facing the object side. The third lens L3 is a biconvex positive lens. The fourth lens L4 is a positive meniscus lens having a convex surface facing the image side. The fifth lens L5 is a biconcave negative lens.

An aspheric surface is applied to the both sides of all lenses, from the first lens L1 to the fifth lens L5.

Figure 20:
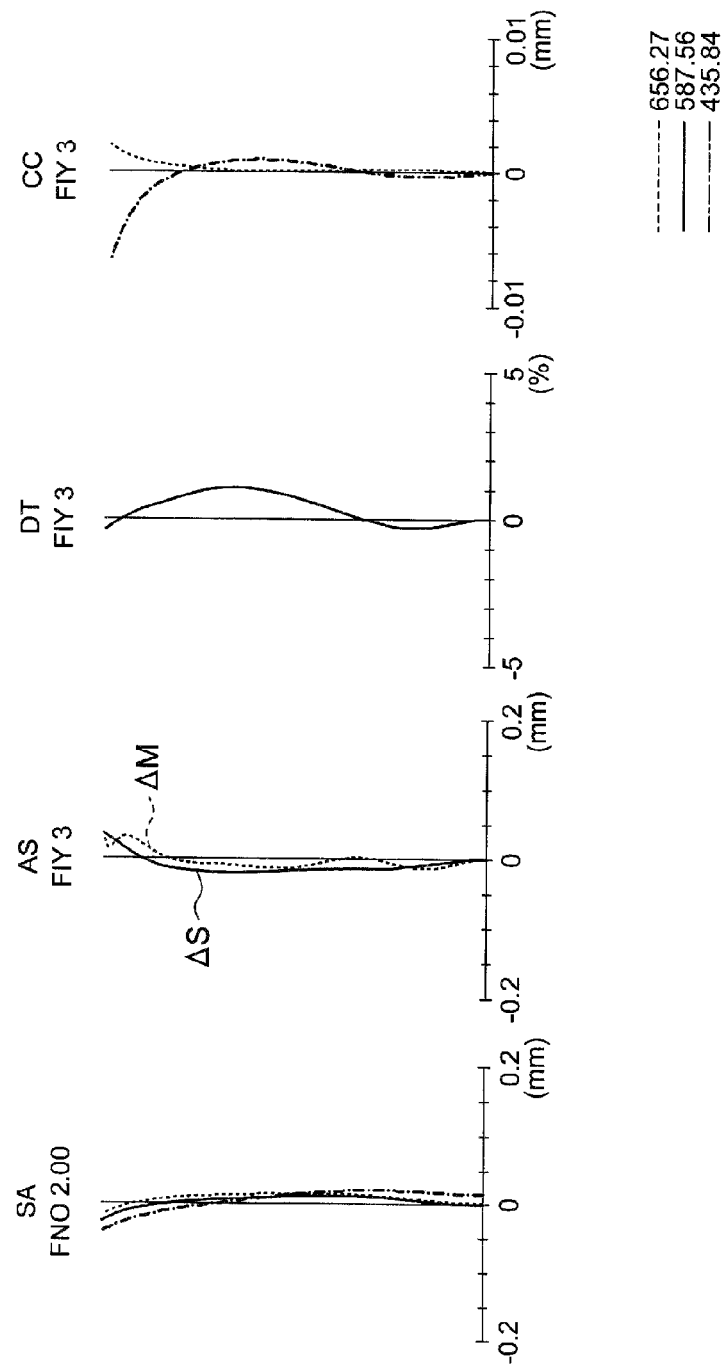
FIG. 20 is a diagram showing a spherical aberration (SA), an astigmatism (AS), a distortion (DT), and a chromatic aberration of magnification (CC), when an object of infinite distance is in focus according to the tenth example.

FIG. 20 is a diagram showing spherical aberration (SA), astigmatism (AS), distortion (DT), and chromatic aberration of magnification (CC), when an object of infinite distance is in focus according to the tenth example. The SA, AS, DT and CC plots shown in FIG. 20 are based on an implementation of the tenth example in accordance with numerical data provided below.

Figure 21:
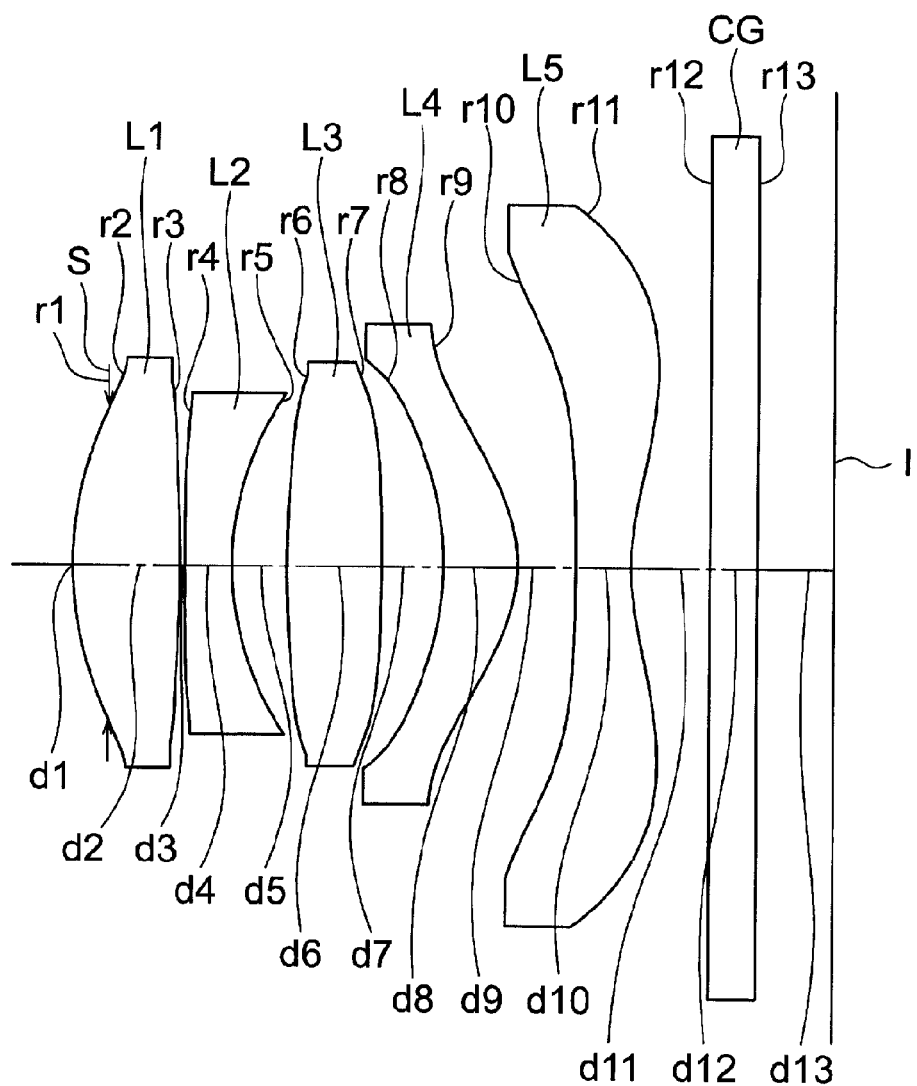
FIG. 21 is a cross-sectional view along an optical axis showing an optical configuration when an object of infinite distance is in focus according to an eleventh example of the present invention.

Next, an imaging optical system according to an eleventh example will be described with reference to FIGS. 21 and 22. FIG. 21 is a cross-sectional view along an optical axis showing an optical configuration when an object at infinite distance is in focus according to the eleventh example of the present invention.

As shown in FIG. 21, the imaging optical system of the eleventh example comprises, in order from the object side, an aperture stop S, a first lens L1 having a positive refractive power, a second lens L2 having a negative refractive power, a third lens L3 having a positive refractive power, a fourth lens L4 lens having a positive refractive power and a fifth lens L5 having a negative refractive power.

The first lens L1 is a biconvex positive lens. The second lens L2 is a negative meniscus lens having a convex surface facing the object side. The third lens L3 is a biconvex positive lens. The fourth lens L4 is a positive meniscus lens having a convex surface facing the image side. The fifth lens L5 is a biconcave negative lens.

An aspheric surface is applied to the both sides of all lenses, from the first lens L1 to the fifth lens L5.

Figure 22:
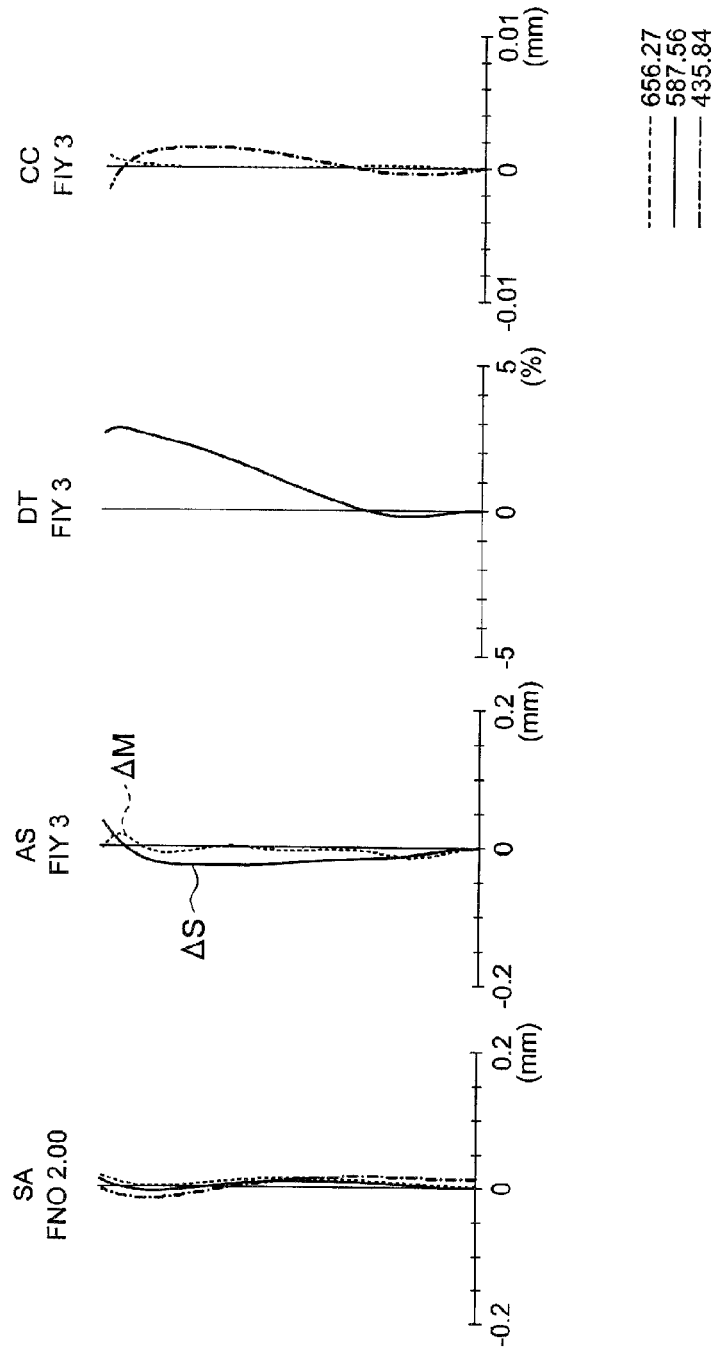
FIG. 22 is a diagram showing a spherical aberration (SA), an astigmatism (AS), a distortion (DT), and a chromatic aberration of magnification (CC), when an object of infinite distance is in focus according to the eleventh example.

FIG. 22 is a diagram showing spherical aberration (SA), astigmatism (AS), distortion (DT), and chromatic aberration of magnification (CC), when an object of infinite distance is in focus according to the eleventh example. The SA, AS, DT and CC plots shown in FIG. 22 are based on an implementation of the eleventh example in accordance with numerical data provided below.

Figure 23:
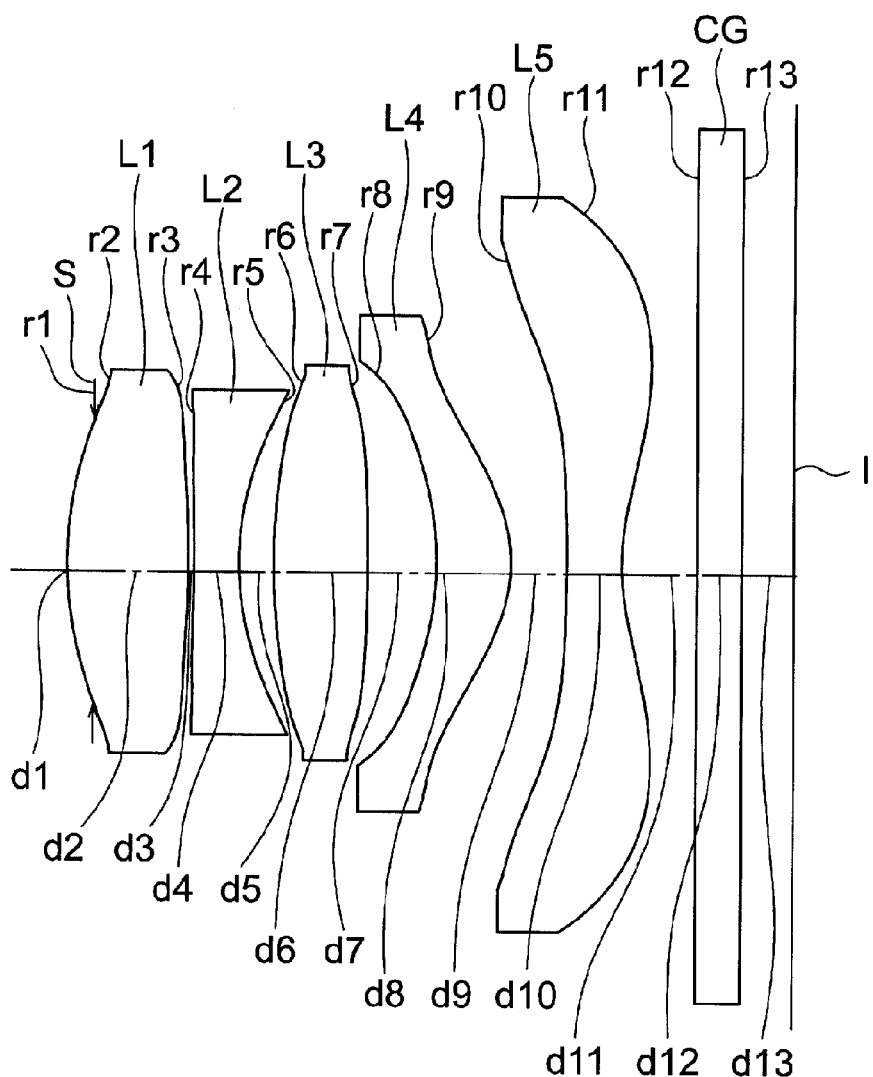
FIG. 23 is a cross-sectional view along an optical axis showing an optical configuration when an object of infinite distance is in focus according to a twelfth example of the present invention.

Next, an imaging optical system according to a twelfth example will be described with reference to FIGS. 23 and 24. FIG. 23 is a cross-sectional view along an optical axis showing an optical configuration when an object of infinite distance is in focus according to the twelfth example of the present invention.

As shown in FIG. 23, the imaging optical system of the twelfth example comprises, in order from the object side, an aperture stop S, a first lens L1 having a positive refractive power, a second lens L2 having a negative refractive power, a third lens L3 having a positive refractive power, a fourth L4 lens having a positive refractive power and a fifth lens L5 having a negative refractive power.

The first lens L1 is a biconvex positive lens. The second lens L2 is a biconcave negative lens. The third lens L3 is a biconvex positive lens. The fourth lens L4 is a positive meniscus lens having a convex surface facing the image side. The fifth lens L5 is a biconcave negative lens.

An aspheric surface is applied to the both sides of all lenses, from the first lens L1 to the fifth lens L5.

Figure 24:
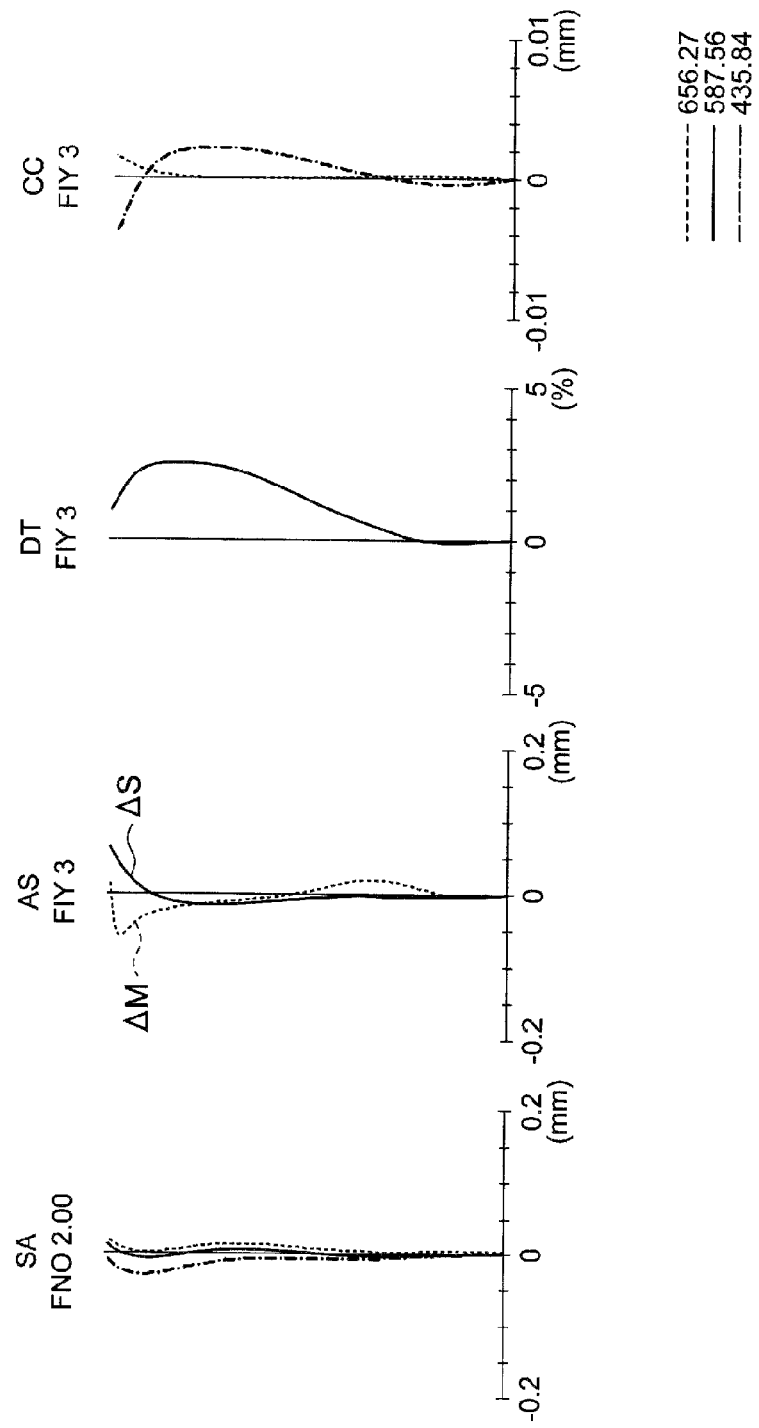
FIG. 24 is a diagram showing a spherical aberration (SA), an astigmatism (AS), a distortion (DT), and a chromatic aberration of magnification (CC), when an object of infinite distance is in focus according to the twelfth example.

FIG. 24 is a diagram showing spherical aberration (SA), astigmatism (AS), distortion (DT), and chromatic aberration of magnification (CC), when an object of infinite distance is in focus according to the twelfth example. The SA, AS, DT and CC plots shown in FIG. 24 are based on an implementation of the twelfth example in accordance with numerical data provided below.

Figure 25:
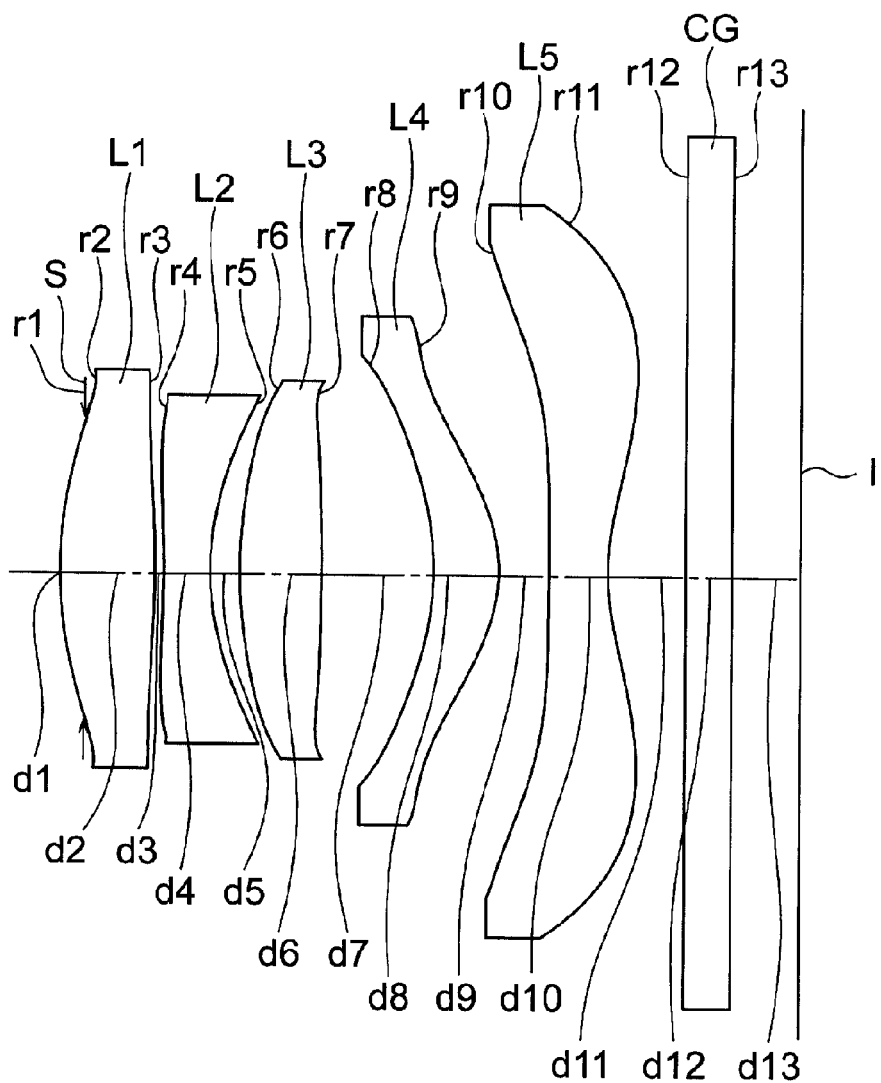
FIG. 25 is a cross-sectional view along an optical axis showing an optical configuration when an object of infinite distance is in focus according to a thirteenth example of the present invention.

Next, an imaging optical system according to a thirteenth example will be described with reference to FIGS. 25 and 26. FIG. 25 is a cross-sectional view along an optical axis showing an optical configuration when an object of infinite distance is in focus according to the thirteenth example of the present invention.

As shown in FIG. 25, the imaging optical system of the thirteenth example comprises, in order from the object side, an aperture stop S, a first lens L1 having a positive refractive power, a second lens L2 having a negative refractive power, a third lens L3 having a positive refractive power, a fourth L4 lens having a positive refractive power, and a fifth lens L5 having a negative refractive power.

The first lens L1 is a biconvex positive lens. The second lens L2 is a biconcave negative lens. The third lens L3 is a positive meniscus lens having a convex surface facing the object side. The fourth lens L4 is a positive meniscus lens having a convex surface facing the image side. The fifth lens L5 is a negative meniscus lens having a convex surface facing the object side.

An aspheric surface is applied to the both sides of all lenses, from the first lens L1 to the fifth lens L5.

Figure 26:
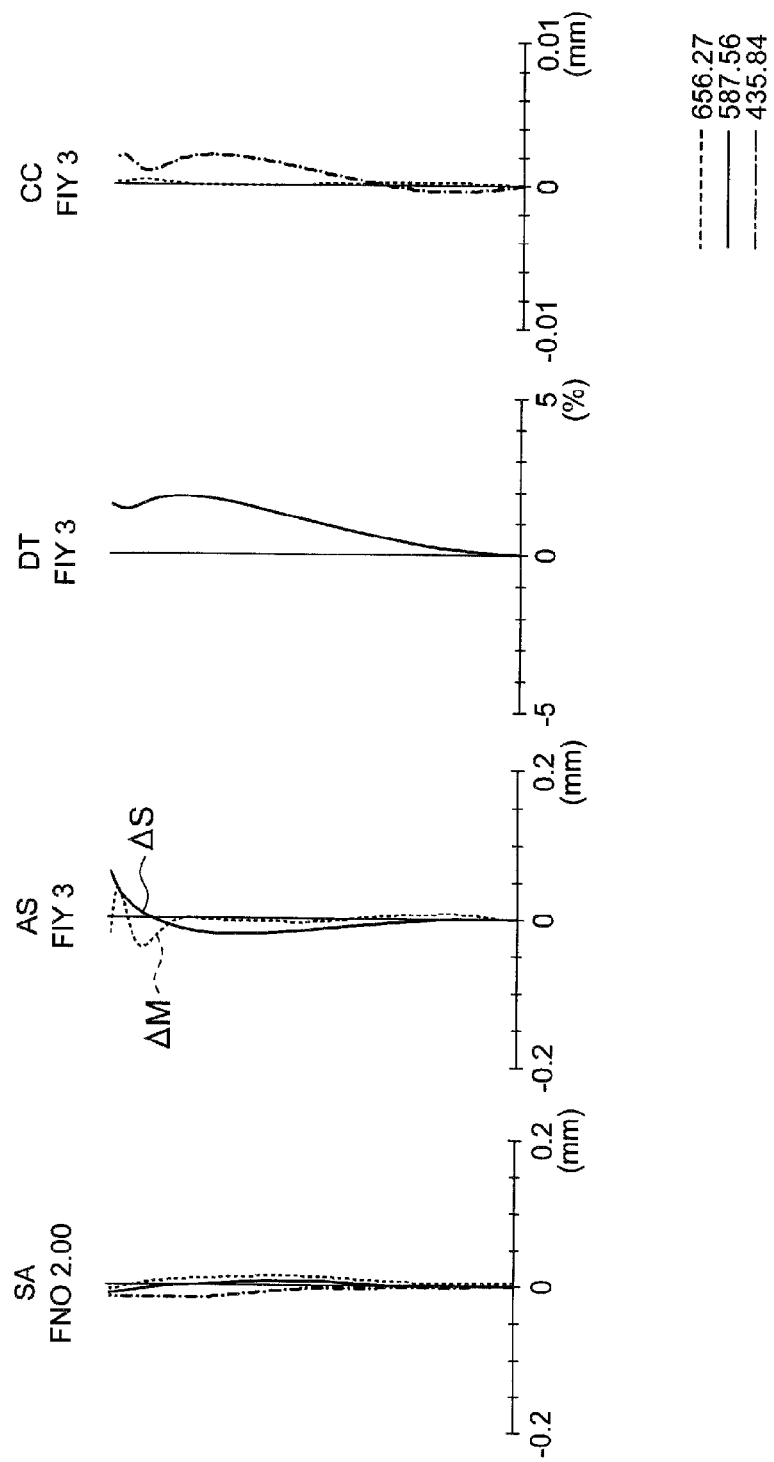
FIG. 26 is a diagram showing a spherical aberration (SA), an astigmatism (AS), a distortion (DT), and a chromatic aberration of magnification (CC), when an object of infinite distance is in focus according to the thirteenth example.

FIG. 26 is a diagram showing spherical aberration (SA), astigmatism (AS), distortion (DT), and chromatic aberration of magnification (CC), when an object of infinite distance is in focus according to the thirteenth example. The SA, AS, DT and CC plots shown in FIG. 26 are based on an implementation of the thirteenth example in accordance with numerical data provided below.

Figure 27:
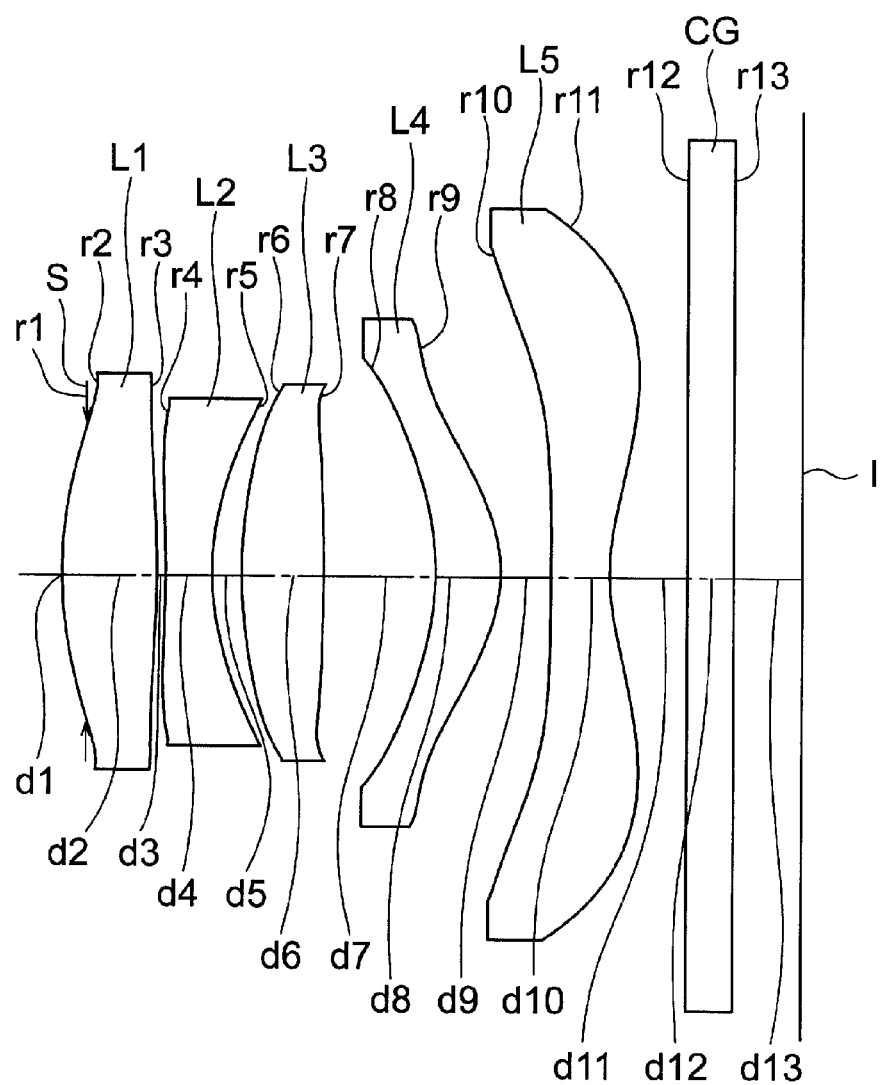
FIG. 27 is a cross-sectional view along an optical axis showing an optical configuration when an object of infinite distance is in focus according to a fourteenth example of the present invention.

Next, an imaging optical system according to a fourteenth example will be described with reference to FIGS. 27 and 28. FIG. 27 is a cross-sectional view along an optical axis showing an optical configuration when an object of infinite distance is in focus according to the fourteenth example of the present invention.

As shown in FIG. 27, the imaging optical system of the fourteenth example comprises, in order from the object side, an aperture stop S, a first lens L1 having a positive refractive power, a second lens L2 having a negative refractive power, a third lens L3 having a positive refractive power, a fourth L4 lens having a positive refractive power, and a fifth lens L5 having a negative refractive power.

The first lens L1 is a biconvex positive lens. The second lens L2 is a biconcave negative lens. The third lens L3 is a biconvex positive lens. The fourth lens L4 is a positive meniscus lens having a convex surface facing the image side. The fifth lens L5 is a negative meniscus lens having a convex surface facing the object side.

An aspheric surface is applied to the both sides of all lenses, from the first lens L1 to the fifth lens L5.

Figure 28:
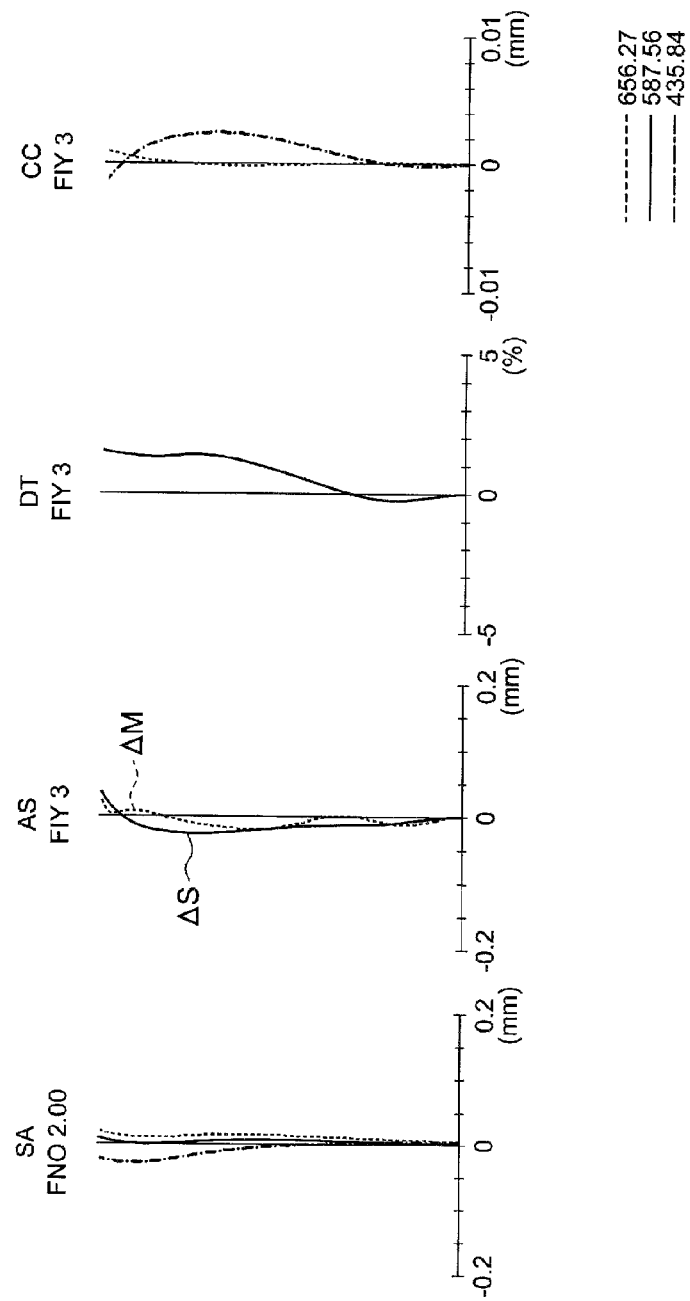
FIG. 28 is a diagram showing a spherical aberration (SA), an astigmatism (AS), a distortion (DT), and a chromatic aberration of magnification (CC), when an object of infinite distance is in focus according to the fourteenth example.

FIG. 28 is a diagram showing spherical aberration (SA), astigmatism (AS), distortion (DT), and chromatic aberration of magnification (CC), when an object of infinite distance is in focus according to the fourteenth example. The SA, AS, DT and CC plots shown in FIG. 28 are based on an implementation of the fourteenth example in accordance with numerical data provided below.

Next, numerical data of optical components of exemplary embodiments of imaging optical systems in accordance with each of the above examples are presented. In the numerical data below, r1, r2, ..., r13 are the curvature radii of the corresponding surfaces, as indicated, for example in FIG. 1; d1, d2, ..., d13 are the thicknesses of lenses L1-L5 and the air distances between adjacent surfaces along the optical axis, as indicated in FIG. 1; the values for nd are the refractive indices for d-line of the optical elements (lenses and cover glass) having the respective surfaces; the values for vd are the Abbe numbers of the optical elements (lenses and cover glass) having the respective surfaces; Fno is F-number; fb is back-focus length; f is the focal length of the total optical system; and "*" indicates an aspheric surface.

The shape of an aspheric surface is defined by the following expression:

$$z=(y^2/r)/(1+(1-(1+K)(y/r)^2)^{1/2})+A4y^4+A6y^6+A8y^8+A10y^{10}+ \qquad (200),$$

where the direction along the optical axis is represented by z, the direction orthogonal to the optical axis is represented by y, the paraxial curvature radius of the surface is r, a conical coefficient is represented by K, and aspheric surface coefficients are represented by A4, A6, A8, A10, .... Further, e indicates powers of ten. These symbols are commonly used in the following numerical data for each example.

Dimensions shown below are in units of millimeters (mm), unless indicated otherwise.

EXAMPLE 1

Surface Data

| Surface No. | r (mm) | d (mm) | nd | vd |
|---|---|---|---|---|
| Object plane | ∞ | ∞ | | |
| 1 (S) | ∞ | 0.00 | | |
| 2* | 1.899 | 0.58 | 1.53463 | 56.22 |
| 3* | −14.108 | 0.11 | | |
| 4* | 5.542 | 0.30 | 1.61417 | 25.64 |
| 5* | 1.608 | 0.26 | | |
| 6* | 3.352 | 0.44 | 1.53463 | 56.22 |
| 7* | 13.743 | 0.52 | | |
| 8* | −2.408 | 0.58 | 1.53463 | 56.22 |
| 9* | −0.976 | 0.28 | | |
| 10* | 7.126 | 0.49 | 1.53463 | 56.22 |
| 11* | 1.124 | 0.64 | | |
| 12 | ∞ | 0.30 | 1.51633 | 64.14 |
| 13 | ∞ | variable | | |
| Image plane (I) | ∞ | 0 | | |

Aspheric surface data

2nd surface

K = −0.881
A4 = 1.12361e−02, A6 = 9.43523e−03, A8 = 1.63446e−03,
A10 = −9.07244e−03

3rd surface

K = −9.467
A4 = −1.80144e−02, A6 = 1.30386e−01, A8 = −1.72430e−01,
A10 = 6.26790e−02

4th surface

K = −111.241
A4 = −9.47939e−02, A6 = 2.85846e−01, A8 = −3.68682e−01,
A10 = 1.54520e−01

5th surface

K = −8.353
A4 = 1.25573e−03, A6 = 1.68775e−01, A8 = −2.03500e−01,
A10 = 7.82501e−02, A12 = 3.79830e−04

6th surface

K = −34.149
A4 = 2.96394e−02, A6 = −7.12671e−02, A8 = 8.63678e−02,
A10 = −2.96344e−02

7th surface

K = −75.222
A4 = −7.45335e−03, A6 = −1.17206e−02, A8 = −1.86648e−02,
A10 = 1.51514e−02

8th surface

K = −0.475
A4 = −8.25793e−03, A6 = 3.60363e−02, A8 = −1.56741e−02,
A10 = −4.83613e−03, A12 = 9.31825e−04

9th surface

K = −2.258
A4 = −1.52094e−02, A6 = −1.06658e−02, A8 = 2.63124e−02,
A10 = −5.33786e−03, A12 = −4.77232e−04

10th surface

K = −578.778
A4 = −4.00372e−02, A6 = 6.31511e−03, A8 = 4.42722e−04,
A10 = −1.48309e−04, A12 = 7.78440e−06, A14 = −1.91115e−09

11th surface

K = −7.065
A4 = −4.94843e−02, A6 = 1.19528e−02, A8 = −2.45907e−03,
A10 = 2.22435e−04, A12 = −5.53516e−06, A14 = −1.13545e−07

| | |
|---|---|
| Image height | 2.9 |
| fb (in air) | 1.21 |
| lens total length (in air) | 4.76 |
| total system focal length f | 3.82 |

EXAMPLE 2

Surface Data

| Surface No. | r (mm) | d (mm) | nd | vd |
|---|---|---|---|---|
| Object plane | ∞ | ∞ | | |
| 1 (S) | ∞ | −0.21 | | |
| 2* | 2.466 | 0.82 | 1.53463 | 56.22 |
| 3* | −17.844 | 0.13 | | |
| 4* | 7.183 | 0.30 | 1.61417 | 25.64 |
| 5* | 2.175 | 0.46 | | |
| 6* | 5.332 | 0.63 | 1.53463 | 56.22 |
| 7* | 28.938 | 0.81 | | |
| 8* | −2.856 | 0.64 | 1.53463 | 56.22 |
| 9* | −1.315 | 0.26 | | |
| 10* | 9.157 | 0.87 | 1.53463 | 56.22 |

-continued

| | | |  | |
|---|---|---|---|---|
| 11* | 1.575 | 0.86 | | |
| 12 | ∞ | 0.30 | 1.51633 | 64.14 |
| 13 | ∞ | 0.47 | | |
| Image plane (I) | ∞ | 0 | | |

Aspheric surface data

2nd surface

K = −0.865
A4 = 4.98470e−03, A6 = 1.70004e−03, A8 = −2.33550e−05,
A10 = −6.65461e−04
3rd surface K = −74.210
A4 = −6.69903e−03, A6 = 2.93033e−02, A8 = −2.36324e−02,
A10 = 4.79004e−03
4th surface K = −121.991
A4 = −3.91275e−02, A6 = 6.97216e−02, A8 = −4.85969e−02,
A10 = 1.08383e−02
5th surface K = −8.352
A4 = 1.42166e−03, A6 = 4.17708e−02, A8 = −2.61007e−02,
A10 = 5.50884e−03
6th surface K = −45.007
A4 = 1.22715e−02, A6 = −1.95254e−02, A8 = 9.76919e−03,
A10 = −1.50533e−03
7th surface K = −620.583
A4 = −4.84435e−03, A6 = −2.75959e−03, A8 = −2.93339e−03,
A10 = 7.95875e−04
8th surface K = 0.084
A4 = −7.53214e−03, A6 = 8.40059e−03, A8 = −1.70900e−03,
A10 = −2.73910e−04,
A12 = −4.70115e−05
9th surface K = −1.888
A4 = −7.41935e−03, A6 = −3.19839e−03, A8 = 3.26570e−03,
A10 = −4.51553e−04,
A12 = −7.44909e−06
10th surface K = −367.084
A4 = −1.66804e−02, A6 = 1.59274e−03, A8 = 4.94652e−05,
A10 = −1.48995e−05,
A12 = −1.28361e−07, A14 = 2.97799e−08
11th surface K = −6.595
A4 = −1.86693e−02, A6 = 2.62509e−03, A8 = −2.99140e−04,
A10 = 1.64284e−05,
A12 = −3.17449e−07, A14 = −7.92194e−09

| | |
|---|---|
| Image height | 3.8 |
| fb (in air) | 1.52 |
| lens total length (in air) | 6.45 |
| total system focal length f | 5.13 |

EXAMPLE 3

Surface Data

| Surface No. | r (mm) | d (mm) | nd | vd |
|---|---|---|---|---|
| Object plane | ∞ | ∞ | | |
| 1 (S) | ∞ | −0.21 | | |

-continued

| | | | | |
|---|---|---|---|---|
| 2* | 2.467 | 0.76 | 1.53463 | 56.22 |
| 3* | −18.189 | 0.14 | | |
| 4* | 7.242 | 0.31 | 1.61417 | 25.64 |
| 5* | 2.179 | 0.47 | | |
| 6* | 5.215 | 0.60 | 1.53463 | 56.22 |
| 7* | 26.025 | 0.82 | | |
| 8* | −2.810 | 0.69 | 1.53463 | 56.22 |
| 9* | −1.305 | 0.24 | | |
| 10* | 7.730 | 0.89 | 1.53463 | 56.22 |
| 11* | 1.519 | 0.86 | | |
| 12 | ∞ | 0.30 | 1.51633 | 64.14 |
| 13 | ∞ | 0.49 | | |
| Image plane (I) | ∞ | 0 | | |

Aspheric surface data

2nd surface

K = −0.815
A4 = 5.45292e−03, A6 = 1.44720e−03, A8 = 6.89583e−05,
A10 = −5.42168e−04
3rd surface K = −93.607
A4 = −6.37568e−03, A6 = 2.95462e−02, A8 = −2.32960e−02,
A10 = 4.92034e−03
4th surface K = −116.116
A4 = −3.87946e−02, A6 = 6.99601e−02, A8 = −4.86438e−02,
A10 = 1.09437e−02
5th surface K = −8.295
A4 = 1.93077e−03, A6 = 4.17066e−02, A8 = −2.63609e−02,
A10 = 5.54659e−03
6th surface K = −45.445
A4 = 1.22938e−02, A6 = −1.94574e−02, A8 = 9.77219e−03,
A10 = −1.49434e−03
7th surface K = −661.852
A4 = −4.70020e−03, A6 = −2.60080e−03, A8 = −2.84935e−03,
A10 = 8.45016e−04
8th surface K = 0.054
A4 = −7.50810e−03, A6 = 8.58817e−03, A8 = −1.65161e−03,
A10 = −2.51153e−04,
A12 = −3.83267e−05
9th surface K = −1.883
A4 = −8.16929e−03, A6 = −3.29436e−03, A8 = 3.27140e−03,
A10 = −4.47868e−04,
A12 = −4.63228e−06
10th surface K = −232.895
A4 = −1.64616e−02, A6 = 1.62192e−03, A8 = 5.08558e−05,
A10 = −1.64509e−05,
A12 = −3.29742e−07, A14 = 6.89537e−08
11th surface K = −6.364
A4 = −1.93238e−02, A6 = 2.69864e−03, A8 = −3.00378e−04,
A10 = 1.63198e−05,
A12 = −3.42117e−07, A14 = −7.20261e−09

| | |
|---|---|
| Image height | 3.9 |
| fb (in air) | 1.55 |
| lens total length (in air) | 6.47 |
| total system focal length f | 5.11 |

EXAMPLE 4

Surface Data

| Surface No. | r (mm) | d (mm) | nd | vd |
|---|---|---|---|---|
| Object plane | ∞ | ∞ | | |
| 1 (S) | ∞ | −0.18 | | |
| 2* | 2.741 | 0.52 | 1.53463 | 56.22 |
| 3* | −14.448 | 0.20 | | |
| 4* | 4.952 | 0.30 | 1.61417 | 25.64 |
| 5* | 1.812 | 0.25 | | |
| 6* | 4.282 | 0.59 | 1.53463 | 56.22 |
| 7* | 500.000 | 0.84 | | |
| 8* | −2.262 | 0.70 | 1.53463 | 56.22 |
| 9* | −1.153 | 0.37 | | |
| 10* | 5.007 | 0.61 | 1.53463 | 56.22 |
| 11* | 1.320 | 0.75 | | |
| 12 | ∞ | 0.30 | 1.51633 | 64.14 |
| 13 | ∞ | 0.80 | | |
| Image plane (I) | ∞ | 0 | | |

Aspheric surface data

2nd surface

K = −1.279
A4 = −1.79037e−03, A6 = −8.03611e−04, A8 = 1.02410e−03

3rd surface

K = −6.609
A4 = −1.57927e−02, A6 = 5.05025e−02, A8 = −4.07441e−02,
A10 = 1.26222e−02

4th surface

K = −64.772
A4 = −6.44405e−02, A6 = 1.49442e−01, A8 = −1.18136e−01,
A10 = 3.30511e−02

5th surface

K = −8.807
A4 = −5.75049e−03, A6 = 7.65993e−02, A8 = −5.89296e−02,
A10 = 1.36525e−02

6th surface

K = −44.123
A4 = 3.34671e−02, A6 = −4.13955e−02, A8 = 3.10495e−02,
A10 = −5.81840e−02, A12 = −6.08447e−04

7th surface

K = −531.932
A4 = 5.34756e−03, A6 = 2.51172e−03, A8 = −1.41412e−02,
A10 = 6.90857e−03, A12 = −3.90127e−04

8th surface

K = −0.220
A4 = −1.30213e−02, A6 = 2.01165e−02, A8 = −3.29704e−03,
A10 = −2.85694e−04, A12 = −3.91144e−04, A14 = 8.96023e−05

9th surface

K = −1.592
A4 = 1.24602e−03, A6 = −1.09644e−02, A8 = 7.49208e−03,
A10 = −1.93250e−04, A12 = −2.67655e−04, A14 = 1.30913e−05

10th surface

K = −103.807
A4 = −2.01088e−02, A6 = 1.88936e−03, A8 = 2.03766e−04,
A10 = −3.98138e−05, A12 = 2.01700e−06, A14 = −2.88183e−08

11th surface

K = −5.909
A4 = −2.77692e−02, A6 = 4.79349e−03, A8 = −6.73609e−04,
A10 = 5.54594e−05, A12 = −2.17374e−06, A14 = 2.81129e−08

| | |
|---|---|
| Image height | 3.9 |
| fb (in air) | 1.75 |
| lens total length(in air) | 6.13 |
| total system focal length f | 4.88 |

EXAMPLE 5

Surface Data

| Surface No. | r (mm) | d (mm) | nd | vd |
|---|---|---|---|---|
| Object plane | ∞ | ∞ | | |
| 1 (S) | ∞ | −0.31 | | |
| 2* | 1.780 | 0.62 | 1.53463 | 56.22 |
| 3* | −19.519 | 0.10 | | |
| 4* | 9.592 | 0.30 | 1.61417 | 25.64 |
| 5* | 1.880 | 0.28 | | |
| 6* | 3.592 | 0.43 | 1.53463 | 56.22 |
| 7* | 10.750 | 0.49 | | |
| 8* | −2.305 | 0.63 | 1.53463 | 56.22 |
| 9* | −0.949 | 0.27 | | |
| 10* | 5.894 | 0.43 | 1.53463 | 56.22 |
| 11* | 1.097 | 0.62 | | |
| 12 | ∞ | 0.30 | 1.51633 | 64.14 |
| 13 | ∞ | 0.47 | | |
| Image plane (I) | ∞ | 0 | | |

Aspheric surface data

2nd surface

K = −0.947
A4 = 1.73926e−02, A6 = 1.73904e−02, A8 = −4.66447e−03

3rd surface

K = 0.076
A4 = −1.11541e−02, A6 = 1.72217e−01, A8 = −2.32228e−01,
A10 = 8.61042e−02

4th surface

K = −34.106
A4 = −1.02241e−01, A6 = 3.53432e−01, A8 = −4.68458e−01,
A10 = 1.88533e−01

5th surface

K = −8.046
A4 = −6.98161e−04, A6 = 2.11680e−01, A8 = −2.73586e−01,
A10 = 1.15204e−01

6th surface

K = −37.662
A4 = 2.04232e−02, A6 = −9.25024e−02, A8 = 8.94440e−02,
A10 = −3.01788e−02

7th surface

K = −94.854
A4 = −8.84589e−03, A6 = −1.83717e−02, A8 = −2.34008e−02,
A10 = 1.35782e−02

8th surface

K = −0.651
A4 = −4.37690e−03, A6 = 3.74029e−02, A8 = −1.63020e−02,
A10 = −9.45924e−03, A12 = 2.37869e−03

9th surface

K = −2.207
A4 = −6.80801e−03, A6 = −2.32755e−02, A8 = 3.07158e−02,
A10 = −7.09722e−03, A12 = −2.22422e−04

10th surface

K = −508.945
A4 = −3.78877e−02, A6 = 1.19698e−03, A8 = 1.02665e−03,
A10 = −1.62292e−04, A12 = 5.03180e−06

11th surface

K = −7.412
A4 = −4.98596e−02, A6 = 1.19625e−02, A8 = −3.04503e−03,
A10 = 3.63173e−04, A12 = −1.93274e−05

| | |
|---|---|
| Image height | 2.9 |
| fb (in air) | 1.28 |
| lens total length (in air) | 4.82 |
| total system focal length f | 3.88 |

EXAMPLE 6

Surface Data

| Surface No. | r (mm) | d (mm) | nd | vd |
|---|---|---|---|---|
| Object plane | ∞ | ∞ | | |
| 1 (S) | ∞ | −0.35 | | |
| 2* | 1.631 | 0.67 | 1.53463 | 56.22 |
| 3* | −6.605 | 0.06 | | |
| 4* | 25.645 | 0.29 | 1.61417 | 25.64 |
| 5* | 1.834 | 0.40 | | |
| 6* | 13.617 | 0.43 | 1.53463 | 56.22 |
| 7* | −10.276 | 0.35 | | |
| 8* | −1.974 | 0.62 | 1.53463 | 56.22 |
| 9* | −1.033 | 0.42 | | |
| 10* | −5.101 | 0.43 | 1.53463 | 56.22 |
| 11* | 1.909 | 0.50 | | |
| 12 | ∞ | 0.30 | 1.51633 | 64.14 |
| 13 | ∞ | 0.39 | | |
| Image plane (I) | ∞ | 0 | | |

Aspheric surface data

2nd surface

K = −0.767
A4 = 2.73408e−02, A6 = 3.17118e−03, A8 = 1.62236e−02,
A10 = −4.02873e−03

3rd surface

K = −157.162
A4 = 4.23049e−02, A6 = 7.55273e−03, A8 = −1.30028e−02,
A10 = −9.37035e−03

4th surface

K = 0.000
A4 = −7.67870e−03, A6 = 6.99572e−02, A8 = −8.38765e−02,
A10 = 9.27845e−03

5th surface

K = −0.044
A4 = −1.16895e−01, A6 = 2.11639e−01, A8 = −1.81420e−01,
A10 = 7.72754e−02

6th surface

K = −309.215
A4 = −5.72621e−02, A6 = 6.14155e−03, A8 = 2.18746e−02,
A10 = −5.04642e−04

7th surface

K = −6.998
A4 = −4.38885e−02, A6 = 2.51532e−02, A8 = −1.14978e−02,
A10 = 9.35729e−03

8th surface

K = −0.144
A4 = 1.17490e−02, A6 = 8.91454e−02, A8 = −4.73209e−02,
A10 = 8.93528e−03, A12 = 1.21242e−04

9th surface

K = −2.258
A4 = 1.36275e−03, A6 = 5.81546e−04, A8 = 1.73764e−02,
A10 = −6.44496e−03, A12 = 6.41059e−04

10th surface

K = −18.005
A4 = −2.50412e−02, A6 = −1.93650e−02, A8 = 4.23102e−03,
A10 = 1.09924e−03, A12 = −2.11787e−04, A14 = −3.95314e−06

11th surface

K = −12.717
A4 = −5.48272e−02, A6 = 1.20130e−02, A8 = −4.47509e−03,
A10 = 1.00948e−03, A12 = −1.18827e−04, A14 = 5.25993e−06

| | |
|---|---|
| Image height | 3.0 |
| fb (in air) | 1.09 |
| lens total length(in air) | 4.74 |
| total system focal length f | 3.98 |

EXAMPLE 7

Surface Data

| Surface No. | r (mm) | d (mm) | nd | vd |
|---|---|---|---|---|
| Object plane | ∞ | ∞ | | |
| 1 (S) | ∞ | −0.22 | | |
| 2* | 2.027 | 0.65 | 1.53463 | 56.22 |
| 3* | −10.624 | 0.15 | | |
| 4* | −4.403 | 0.30 | 1.61417 | 25.64 |
| 5* | 3.009 | 0.12 | | |
| 6* | 1.951 | 0.41 | 1.53463 | 56.22 |
| 7* | 4.249 | 0.75 | | |
| 8* | −4.328 | 0.61 | 1.53463 | 56.22 |
| 9* | −1.011 | 0.27 | | |
| 10* | −11.325 | 0.38 | 1.53463 | 56.22 |
| 11* | 1.227 | 0.80 | | |
| 12 | ∞ | 0.30 | 1.51633 | 64.14 |
| 13 | ∞ | 0.20 | | |
| Image plane (I) | ∞ | 0 | | |

Aspheric surface data

2nd surface

K = −1.187
A4 = 5.42454e−03, A6 = −2.14996e−03, A8 = −1.16441e−02,
A10 = −1.06116e−03

3rd surface

K = 0.000
A4 = 3.82839e−02, A6 = −6.38669e−02, A8 = 1.73415e−02,
A10 = 4.47428e−04

4th surface

K = 0.000
A4 = 1.35352e−01, A6 = −9.80100e−02, A8 = 4.07136e−02,
A10 = −1.58213e−04

5th surface

K = −0.421
A4 = −3.91879e−02, A6 = 7.79347e−02, A8 = −3.77634e−02,
A10 = 6.70122e−03

6th surface

K = −7.770
A4 = −2.99364e−03, A6 = −2.85024e−02, A8 = 1.60391e−02

7th surface

K = 9.207
A4 = −1.49398e−02, A6 = −5.99490e−02, A8 = 1.71521e−02

8th surface

K = 6.848
A4 = 4.91836e−02, A6 = 1.59914e−02, A8 = −1.23325e−02,
A10 = 1.66015e−04

9th surface

K = −3.908
A4 = −1.85326e−02, A6 = 4.14491e−02, A8 = −7.73812e−03,
A10 = −4.76508e−04

10th surface

K = 0.000
A4 = −7.15022e−03, A6 = −3.16014e−02, A8 = 1.35008e−02,
A10 = −1.55271e−03

-continued

11th surface

K = −8.336
A4 = −4.63044e−02, A6 = 6.55429e−03, A8 = −1.04500e−03,
A10 = 4.69649e−05

| | |
|---|---|
| Image height | 3.0 |
| fb (in air) | 1.20 |
| lens total length (in air) | 4.85 |
| total system focal length f | 3.90 |

EXAMPLE 8

Surface Data

| Surface No. | r (mm) | d (mm) | nd | vd |
|---|---|---|---|---|
| Object plane | ∞ | ∞ | | |
| 1 (S) | ∞ | −0.33 | | |
| 2* | 1.691 | 0.69 | 1.53463 | 56.22 |
| 3* | −5.405 | 0.06 | | |
| 4* | 13.989 | 0.29 | 1.61417 | 25.64 |
| 5* | 1.716 | 0.45 | | |
| 6* | 27.018 | 0.41 | 1.53463 | 56.22 |
| 7* | −10.978 | 0.40 | | |
| 8* | −2.177 | 0.59 | 1.53463 | 56.22 |
| 9* | −0.998 | 0.43 | | |
| 10* | −3.536 | 0.38 | 1.53463 | 56.22 |
| 11* | 2.023 | 0.50 | | |
| 12 | ∞ | 0.30 | 1.51633 | 64.14 |
| 13 | ∞ | 0.36 | | |
| Image plane (I) | ∞ | 0 | | |

Aspheric surface data

2nd surface

K = −0.848
A4 = 2.50101e−02, A6 = −2.83768e−03, A8 = 1.50846e−02,
A10 = −5.78608e−03

3rd surface

K = −121.742
A4 = 3.67122e−02, A6 = 6.05295e−03, A8 = −1.40747e−02,
A10 = −5.60185e−03

4th surface

K = −0.124
A4 = −4.16260e−04, A6 = 7.07418e−02, A8 = −8.99842e−02,
A10 = 1.96040e−02

5th surface

K = −0.148
A4 = −1.21548e−01, A6 = 2.16187e−01, A8 = −1.79507e−01,
A10 = 6.45435e−02

6th surface

K = −72.792
A4 = −5.65946e−02, A6 = 5.68192e−03, A8 = 2.59315e−02,
A10 = −7.01031e−03

7th surface

K = −63.273
A4 = −3.98979e−02, A6 = 2.66507e−02, A8 = −1.52333e−02,
A10 = 7.08441e−03

8th surface

K = 0.073
A4 = 8.96604e−03, A6 = 8.70151e−02, A8 = −4.80568e−02,
A10 = 9.78812e−03, A12 = −3.29833e−04

9th surface

K = −2.353
A4 = −5.13076e−03, A6 = −6.47572e−04, A8 = 1.84703e−02,
A10 = −5.93328e−03, A12 = 4.50326e−04

-continued

10th surface

K = −29.425
A4 = −2.46008e−02, A6 = −1.69956e−02, A8 = 3.97234e−03,
A10 = 8.94457e−04, A12 = −2.28326e−04, A14 = 7.76356e−06

11th surface

K = −14.346
A4 = −4.74904e−02, A6 = 1.10072e−02, A8 = −4.61629e−03,
A10 = 1.15563e−03, A12 = −1.55864e−04, A14 = 8.13504e−06

| | |
|---|---|
| Image height | 3.0 |
| fb (in air) | 1.06 |
| lens length (in air) | 4.76 |
| total system focal length f | 4.00 |

EXAMPLE 9

Surface Data

| Surface No. | r (mm) | d (mm) | nd | vd |
|---|---|---|---|---|
| Object plane | ∞ | ∞ | | |
| 1 (S) | ∞ | −0.30 | | |
| 2* | 1.723 | 0.64 | 1.53463 | 56.22 |
| 3* | −34.228 | 0.08 | | |
| 4* | 8.838 | 0.30 | 1.61417 | 25.64 |
| 5* | 1.821 | 0.29 | | |
| 6* | 3.566 | 0.36 | 1.53463 | 56.22 |
| 7* | 7.963 | 0.60 | | |
| 8* | −2.367 | 0.60 | 1.53463 | 56.22 |
| 9* | −0.971 | 0.29 | | |
| 10* | 7.432 | 0.41 | 1.53463 | 56.22 |
| 11* | 1.122 | 0.62 | | |
| 12 | ∞ | 0.30 | 1.51633 | 64.14 |
| 13 | ∞ | 0.35 | | |
| Image plane (I) | ∞ | 0 | | |

Aspheric surface data

2nd surface

K = −0.755
A4 = 1.65915e−02, A6 = 2.07465e−02, A8 = −5.28963e−03

3rd surface

K = 2.850
A4 = −1.33099e−02, A6 = 1.86710e−01, A8 = −2.53545e−01,
A10 = 8.49423e−02

4th surface

K = −98.818
A4 = −1.08103e−01, A6 = 3.54636e−01, A8 = −4.67011e−01,
A10 = 1.77188e−01

5th surface

K = −7.762
A4 = −1.26789e−02, A6 = 2.13131e−01, A8 = −2.65150e−01,
A10 = 1.11966e−01

6th surface

K = −42.633
A4 = 3.80326e−02, A6 = −9.11848e−02, A8 = 7.64864e−02,
A10 = −2.18223e−02

7th surface

K = −27.021
A4 = −1.99478e−02, A6 = −7.19365e−03, A8 = −1.58122e−02,
A10 = 1.40627e−02

8th surface

K = 0.025
A4 = 3.98678e−03, A6 = 2.88084e−02, A8 = −1.08542e−02,
A10 = −8.02358e−03, A12 = 3.53079e−03

-continued

9th surface

K = −2.378
A4 = 1.72228e−03, A6 = −2.14919e−02, A8 = 2.95217e−02,
A10 = −8.17009e−03, A12 = 3.63197e−04
10th surface K = −504.555
A4 = −2.82761e−02, A6 = 2.00380e−03, A8 = 1.11792e−03,
A10 = −2.08898e−04, A12 = 1.01751e−05
11th surface K = −7.383
A4 = −4.76458e−02, A6 = 1.34069e−02, A8 = −3.10079e−03,
A10 = 3.45609e−04, A12 = −1.53589e−05

| Image height | 3.0 |
|---|---|
| fb (in air) | 1.17 |
| lens total length (in air) | 4.75 |
| total system focal length f | 3.86 |

EXAMPLE 10

Surface Data

| Surface No. | r (mm) | d (mm) | nd | vd |
|---|---|---|---|---|
| Object plane | ∞ | ∞ | | |
| 1 (S) | ∞ | −0.24 | | |
| 2* | 2.202 | 0.66 | 1.70904 | 53.00 |
| 3* | −7.303 | 0.04 | | |
| 4* | 9.255 | 0.29 | 1.61417 | 25.64 |
| 5* | 1.447 | 0.36 | | |
| 6* | 7.188 | 0.67 | 1.53463 | 56.22 |
| 7* | −5.339 | 0.49 | | |
| 8* | −1.489 | 0.41 | 1.53463 | 56.22 |
| 9* | −0.929 | 0.26 | | |
| 10* | −18.014 | 0.52 | 1.53463 | 56.22 |
| 11* | 1.609 | 0.50 | | |
| 12 | ∞ | 0.30 | 1.51633 | 64.14 |
| 13 | ∞ | 0.48 | | |
| Image plane (I) | ∞ | 0 | | |

Aspheric surface data

2nd surface

K = −1.082
A4 = 1.07486e−02, A6 = −6.78068e−03, A8 = 6.16980e−03
3rd surface

K = −212.704
A4 = 4.11002e−02, A6 = −1.25773e−02, A8 = 8.42077e−03
4th surface

K = −0.168
A4 = −5.44036e−03, A6 = 7.22382e−02, A8 = −6.70269e−02,
A10 = 1.88383e−02
5th surface K = −0.570
A4 = −1.36668e−01, A6 = 2.02153e−01, A8 = −1.50848e−01,
A10 = 3.78136e−02
6th surface K = −92.007
A4 = 2.17740e−02, A6 = −2.05403e−02, A8 = 4.98953e−02,
A10 = −1.85936e−02
7th surface K = −74.224
A4 = −6.50176e−02, A6 = 5.00292e−02, A8 = −4.20018e−02,
A10 = 1.61884e−02

-continued

8th surface

K = 0.000
A4 = 1.72886e−02, A6 = 8.90787e−02, A8 = −4.88479e−02,
A10 = 1.60684e−02, A12 = −1.86802e−03
9th surface K = −2.143
A4 = −1.34593e−02, A6 = 3.45396e−03, A8 = 2.40948e−02,
A10 = −5.95315e−03, A12 = −2.47719e−04
10th surface K = 0.000
A4 = −3.44973e−02, A6 = −6.29865e−03, A8 = 1.88036e−03,
A10 = 7.39659e−04, A12 = −1.48776e−04
11th surface K = −11.896
A4 = −5.47053e−02, A6 = 1.29918e−02, A8 = −3.58227e−03,
A10 = 5.19652e−04, A12 = −3.30892e−05

| Image height | 3.0 |
|---|---|
| fb (in air) | 1.17 |
| lens total length (in air) | 4.89 |
| total system focal length f | 4.05 |

EXAMPLE 11

Surface Data

| Surface No. | r (mm) | d (mm) | nd | vd |
|---|---|---|---|---|
| Object plane | ∞ | ∞ | | |
| 1 (S) | ∞ | −0.23 | | |
| 2* | 2.140 | 0.69 | 1.70904 | 53.00 |
| 3* | −6.316 | 0.03 | | |
| 4* | 36.306 | 0.30 | 1.61417 | 25.64 |
| 5* | 1.663 | 0.35 | | |
| 6* | 5.402 | 0.61 | 1.53463 | 56.22 |
| 7* | −18.466 | 0.40 | | |
| 8* | −1.879 | 0.47 | 1.53463 | 56.22 |
| 9* | −0.957 | 0.37 | | |
| 10* | −21.513 | 0.35 | 1.53463 | 56.22 |
| 11* | 1.510 | 0.50 | | |
| 12 | ∞ | 0.30 | 1.51633 | 64.14 |
| 13 | ∞ | 0.49 | | |
| Image plane (I) | ∞ | 0 | | |

Aspheric surface data

2nd surface

K = −1.054
A4 = 1.24910e−02, A6 = −1.33402e−02, A8 = 6.42383e−03
3rd surface

K = −134.946
A4 = 3.42981e−02, A6 = −2.42552e−02, A8 = 5.53847e−03
4th surface

K = 0.015
A4 = −1.95617e−03, A6 = 7.95303e−02, A8 = −7.52991e−02,
A10 = 2.00956e−02
5th surface K = −0.395
A4 = −1.35215e−01, A6 = 2.03549e−01, A8 = −1.32067e−01,
A10 = 3.06563e−02
6th surface K = −80.110
A4 = 4.68053e−03, A6 = −4.07049e−02, A8 = 6.09961e−02,
A10 = −1.72455e−02

-continued

7th surface

K = −892.691
A4 = −5.51183e−02, A6 = 3.54713e−02, A8 = −5.80090e−02,
A10 = 2.23414e−02
8th surface K = −0.122
A4 = 6.09431e−03, A6 = 7.19867e−02, A8 = −5.81382e−02,
A10 = 9.93699e−03, A12 = −1.28641e−03
9th surface K = −2.396
A4 = −2.39128e−02, A6 = 4.75343e−03, A8 = 2.03433e−02,
A10 = −8.27335e−03, A12 = 8.37512e−04
10th surface K = −957.535
A4 = −3.53017e−02, A6 = −8.82204e−03, A8 = 2.90692e−03,
A10 = 3.99611e−04, A12 = −1.02948e−04
11th surface K = −10.239
A4 = −5.98281e−02, A6 = 1.50777e−02, A8 = −4.20626e−03,
A10 = 6.45659e−04, A12 = −4.26072e−05

| Image height | 3.0 |
| fb (in air) | 1.19 |
| lens total length (in air) | 4.75 |
| total system focal length f | 3.92 |

EXAMPLE 12

Surface Data

| Surface No. | r (mm) | d (mm) | nd | vd |
| --- | --- | --- | --- | --- |
| Object plane | ∞ | ∞ | | |
| 1 (S) | ∞ | −0.18 | | |
| 2* | 2.439 | 0.81 | 1.74617 | 45.30 |
| 3* | −5.621 | 0.04 | | |
| 4* | −12.530 | 0.30 | 1.61417 | 25.64 |
| 5* | 1.767 | 0.23 | | |
| 6* | 3.735 | 0.64 | 1.53463 | 56.22 |
| 7* | −13.818 | 0.47 | | |
| 8* | −2.040 | 0.50 | 1.53463 | 56.22 |
| 9* | −0.967 | 0.37 | | |
| 10* | −14.358 | 0.37 | 1.53463 | 56.22 |
| 11* | 1.457 | 0.50 | | |
| 12 | ∞ | 0.30 | 1.51633 | 64.14 |
| 13 | ∞ | 0.35 | | |
| Image plane (I) | ∞ | 0 | | |

Aspheric surface data

2nd surface

K = −1.237
A4 = 1.05484e−02, A6 = −2.17607e−02, A8 = 1.62041e−02,
A10 = 4.95316e−05, A12 = −4.72862e−03
3rd surface K = −98.818
A4 = 3.37599e−02, A6 = −2.30946e−02, A8 = 6.82769e−03,
A10 = 4.00313e−04, A12 = −5.60391e−03
4th surface K = −568.257
A4 = 4.74259e−03, A6 = 8.16027e−02, A8 = −8.12718e−02,
A10 = 1.06371e−02
5th surface K = −0.237
A4 = −1.31665e−01, A6 = 2.01478e−01, A8 = −1.51153e−01,
A10 = 3.63871e−02

-continued

6th surface

K = −27.435
A4 = 1.73857e−02, A6 = −3.86212e−02, A8 = 5.89868e−02,
A10 = −1.92251e−02
7th surface K = −977.799
A4 = −3.68218e−02, A6 = 2.84357e−02, A8 = −6.29095e−02,
A10 = 2.72274e−02
8th surface K = −0.361
A4 = 5.50020e−03, A6 = 6.83472e−02, A8 = −5.88042e−02,
A10 = 1.02686e−02, A12 = −9.37373e−04
9th surface K = −2.465
A4 = −8.02901e−03, A6 = 5.67621e−03, A8 = 2.12475e−02,
A10 = −8.44724e−03, A12 = 6.87828e−04
10th surface K = −631.392
A4 = −4.27937e−02, A6 = −3.35402e−03, A8 = 3.61575e−03,
A10 = −2.62999e−04, A12 = −2.38278e−05
11th surface K = −9.130
A4 = −5.81541e−02, A6 = 1.60587e−02, A8 = −4.15231e−03,
A10 = 5.66259e−04, A12 = −3.23690e−05

| Image height | 3.0 |
| fb (in air) | 1.05 |
| lens total length (in air) | 4.78 |
| total system focal length f | 3.76 |

EXAMPLE 13

Surface Data

| Surface No. | r (mm) | d (mm) | nd | vd |
| --- | --- | --- | --- | --- |
| Object plane | ∞ | ∞ | | |
| 1 (S) | ∞ | −0.20 | | |
| 2* | 2.233 | 0.72 | 1.70904 | 53.00 |
| 3* | −14.006 | 0.06 | | |
| 4* | −10.599 | 0.29 | 1.61417 | 25.64 |
| 5* | 1.940 | 0.15 | | |
| 6* | 2.413 | 0.50 | 1.53463 | 56.22 |
| 7* | 7.536 | 0.55 | | |
| 8* | −3.079 | 0.56 | 1.53463 | 56.22 |
| 9* | −1.124 | 0.24 | | |
| 10* | 7.470 | 0.54 | 1.53463 | 56.22 |
| 11* | 1.318 | 0.54 | | |
| 12 | ∞ | 0.30 | 1.51633 | 64.14 |
| 13 | ∞ | 0.40 | | |
| Image plane (I) | ∞ | 0 | | |

Aspheric surface data

2nd surface

K = −1.743
A4 = 9.38680e−03, A6 = 9.23833e−03, A8 = −1.27825e−02
3rd surface

K = −51.318
A4 = 2.75357e−03, A6 = 2.08714e−01, A8 = −4.26376e−01,
A10 = 2.05397e−01
4th surface K = 0.063
A4 = −2.03215e−03, A6 = 3.87175e−01, A8 = −7.37658e−01,
A10 = 3.61778e−01

-continued

5th surface

K = −13.047
A4 = 7.52922e−02, A6 = 1.14096e−01, A8 = −1.97136e−01,
A10 = 8.45512e−02
6th surface K = −18.544
A4 = −1.12895e−04, A6 = −1.65941e−02, A8 = 3.93484e−02,
A10 = −1.23599e−02
7th surface K = −13.380
A4 = −2.61631e−02, A6 = −2.93083e−03, A8 = −4.03526e−02,
A10 = 2.95277e−02
8th surface K = −1.959
A4 = −5.73444e−03, A6 = 3.96452e−02, A8 = −3.17418e−02,
A10 = 3.29663e−03, A12 = −1.33596e−03
9th surface K = −2.206
A4 = 1.24292e−02, A6 = −1.32829e−02, A8 = 4.38576e−02,
A10 = −2.07563e−02, A12 = 2.65970e−03
10th surface K = −392.292
A4 = −6.05452e−02, A6 = 2.58122e−02, A8 = −4.27893e−03,
A10 = 3.23916e−04, A12 = −1.06413e−05
11th surface K = −7.670
A4 = −6.01023e−02, A6 = 1.93515e−02, A8 = −4.59885e−03,
A10 = 5.99111e−04, A12 = −3.18357e−05

| | |
|---|---|
| Image height | 3.0 |
| fb (in air) | 1.14 |
| lens total length (in air) | 4.76 |
| total system focal length f | 3.74 |

EXAMPLE 14

Surface Data

| Surface No. | r (mm) | d (mm) | nd | vd |
|---|---|---|---|---|
| Object plane | ∞ | ∞ | | |
| 1 (S) | ∞ | −0.17 | | |
| 2* | 2.602 | 0.62 | 1.70904 | 53.00 |
| 3* | −5.640 | 0.06 | | |
| 4* | −7.062 | 0.30 | 1.61417 | 25.64 |
| 5* | 1.689 | 0.19 | | |
| 6* | 2.846 | 0.53 | 1.53463 | 56.22 |
| 7* | −15.854 | 0.73 | | |
| 8* | −1.892 | 0.43 | 1.53463 | 56.22 |
| 9* | −0.964 | 0.32 | | |
| 10* | 650.706 | 0.38 | 1.53463 | 56.22 |
| 11* | 1.400 | 0.50 | | |
| 12 | ∞ | 0.30 | 1.51633 | 64.14 |
| 13 | ∞ | 0.44 | | |
| Image plane (I) | ∞ | 0 | | |

Aspheric surface data

2nd surface

K = −1.882
A4 = 6.28826e−03, A6 = −2.40901e−02, A8 = 1.09121e−02,
A10 = 4.58124e−03, A12 = −6.29482e−03
3rd surface K = −126.062
A4 = 2.75842e−02, A6 = −2.54884e−02, A8 = 1.57680e−02,
A10 = 2.33328e−03, A12 = −3.52620e−03

4th surface

K = −228.390
A4 = 1.56330e−02, A6 = 8.49436e−02, A8 = −9.45747e−02,
A10 = 4.03276e−02
5th surface K = −0.400
A4 = −1.37836e−01, A6 = 1.94898e−01, A8 = −1.52101e−01,
A10 = 4.06153e−02
6th surface K = −18.832
A4 = 3.06159e−02, A6 = −3.46724e−02, A8 = 5.47133e−02,
A10 = −1.57718e−02
7th surface K = −721.654
A4 = −2.56718e−02, A6 = 3.05657e−02, A8 = −6.17831e−02,
A10 = 4.12146e−02
8th surface K = −0.432
A4 = 6.13716e−03, A6 = 6.92639e−02, A8 = −5.35503e−02,
A10 = 1.37123e−02, A12 = −1.35198e−03
9th surface K = −2.528
A4 = −2.89909e−03, A6 = 8.15395e−03, A8 = 2.11701e−02,
A10 = −8.82825e−03, A12 = 6.50951e−04
10th surface K = −14.156
A4 = −4.16290e−02, A6 = −2.82176e−03, A8 = 3.39262e−03,
A10 = −3.42604e−04, A12 = −7.65700e−06
11th surface

K = −9.431

A4 = −6.09143e−02, A6 = 1.59904e−02, A8 = −4.10604e−03,
A10 = 5.37262e−04, A12 = −2.98458e−05

| | |
|---|---|
| Image height | 3.0 |
| fb (in air) | 1.14 |
| lens total length (in air) | 4.70 |
| total system focal length f | 3.84 |

FIG. 29 shows a table which provides, for each of the above examples, the values of the various quantities in the conditional expressions set forth above.

It is possible to use embodiments of an imaging optical system of the present invention, such as described above, in an imaging apparatus in which an image of an object is captured with an electronic imaging device such as a CCD or a CMOS image detector. Such an imaging apparatus may be, for example, but is not limited to, a digital camera, a video camera, an information processing apparatus like a personal computer, a telephone, or a portable terminal A cellular phone which is easy to carry is especially suitable. Embodiments thereof are shown below.

An exemplary embodiment of an imaging apparatus of the present invention is preferably equipped with an imaging optical system, such as described above, and an imager. In accordance with the present invention, the exemplary imaging apparatus can be realized with an optical system of short overall length, lenses of small diameters, and well-corrected aberrations, especially field curvature and chromatic aberration, in spite of the relatively small F-number of the optical system.

In an exemplary imaging apparatus, it is preferable that the optical system and imager be integrated as one piece. By using the optical system and the imager, an optical image formed by the optical system can be converted to an electrical signal. It is preferable to integrate the optical system and the imager for ease of assembly. Further, by selecting an electronic imager that is able to reduce the effect of brightness discrepancies between the central and peripheral parts of the image, a small and high-performance imaging apparatus can be provided.

In the imaging apparatus of the present embodiment, it is preferable that the optical system and an auto-focusing mechanism be integrated as one piece. By using the optical system and the auto-focus mechanism, auto-focusing can be possible under any object distance. It is preferable to integrate the optical system and the auto-focus mechanism for ease of assembly.

Figure 30:
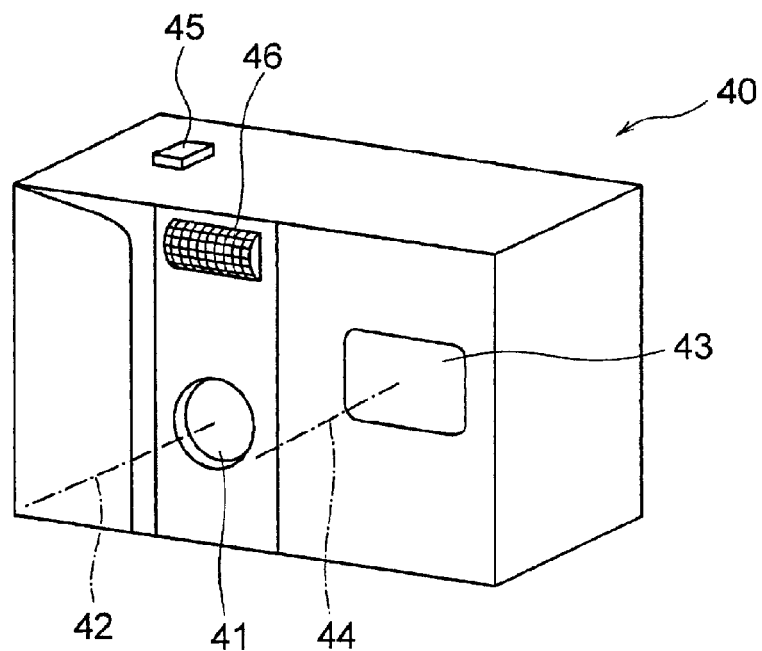
FIG. 30 is a front perspective view showing an appearance of a digital camera 40 incorporating an optical system of the present invention.
Figure 31:
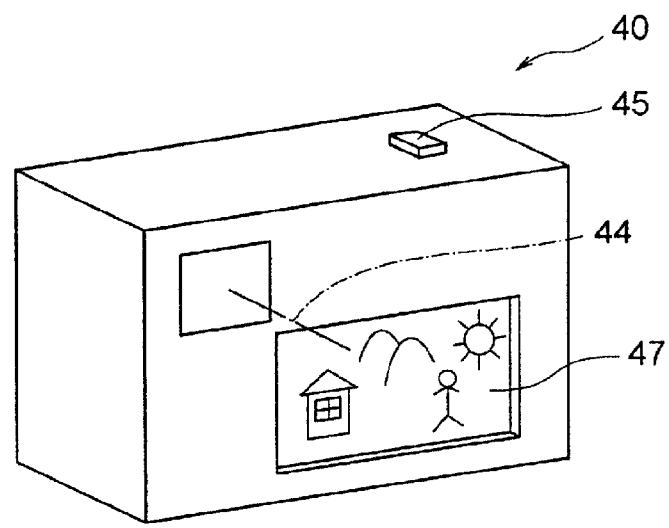
FIG. 31 is a rear perspective view of the digital camera 40.
Figure 32:
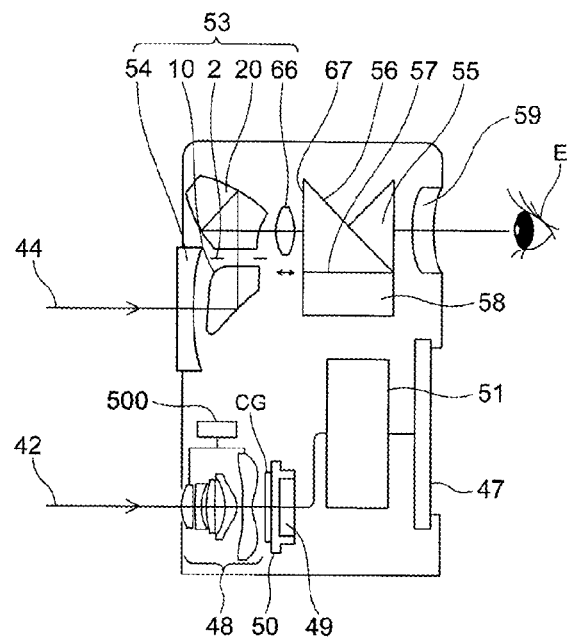
FIG. 32 is a cross-sectional view showing an optical configuration of the digital camera 40.

FIGS. 30-32 show conceptual diagrams where an exemplary embodiment of an imaging optical system in accordance with the present invention is incorporated as an imaging optical system 41 of a digital camera 40. FIG. 30 is a front perspective view showing an appearance of the digital camera 40, FIG. 31 is a rear perspective view showing the same, and FIG. 32 is a cross-sectional view showing an optical configuration of the digital camera 40.

In the present exemplary embodiment, the digital camera 40 includes an imaging optical system 41 having an optical path 42 for image taking, a finder optical system 43 having a finder optical path 44, a shutter 45, a flash 46, a liquid crystal display monitor 47, etc. When a photographer pushes a shutter 45 provided on the top of the camera 40, a photograph is taken through the imaging optical system 41, for example, an imaging optical system 48 implemented in accordance with Example 1 described above.

The imaging optical system 41 forms an object image on the image plane of a CCD 49. The object image captured by the CCD 49 is, through an image processing means 51, displayed on the liquid crystal monitor 47 provided on the rear side of the camera. The image processing means 51 includes a memory or the like to store the captured electrical images. This memory can be provided separate from the image processing means, or can be configured as a flexible disk, a memory card, a magneto-optic disk (MO), etc. in which writing is performed electronically.

Further, an objective optical system for finder 53 is provided on the finder optical path 44. The objective optical system for finder 53 includes a cover lens 54, a first prism 10, an aperture 2, a second prism 20, and lens for focusing 66. The objective optical system for finder 53 forms an object image on an image plane 67. The object image is formed on field frame 57 of a Porro prism 55 which is an image erecting member. On the rear side of the Porro prism 55, an eyepiece optical system 59, which guides an image formed as an erected normal image to an eyeball E of an observer, is provided.

According to the digital camera 40 configured as above, an electronic imaging apparatus having an imaging optical system 41 with a small number of components and reduced size and thickness is realized. Not limited to cameras with retractable lens barrels, embodiments of this invention can be applied to cameras with folded light paths using folding optical systems.

The digital camera 40 is equipped with an auto-focusing mechanism 500 integrated with the imaging optical system 41. This auto-focus mechanism enables focusing to objects of any distance.

It is preferable that the imaging optical system 41 be integrated with an electronic imaging device chip (an electronic imaging device).

By this integration of the electronic imaging device, an optical image formed by the imaging optical system can be converted into an electrical signal. Further, by adopting an electronic imaging device able to reduce the effect of brightness discrepancy appearing between the central part of an image and the peripheral part of the image, an imaging apparatus such as a digital camera having a compact size and high performance can be provided.

Figure 33:
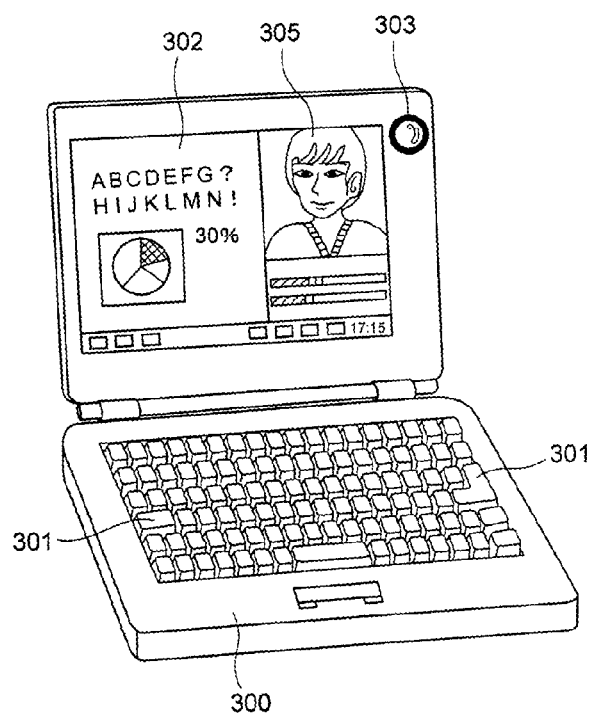
FIG. 33 is a front perspective view of a personal computer 300 with its cover open. The personal computer 300 is presented as an example of an information processing apparatus incorporating an optical system of the present invention.
Figure 34:
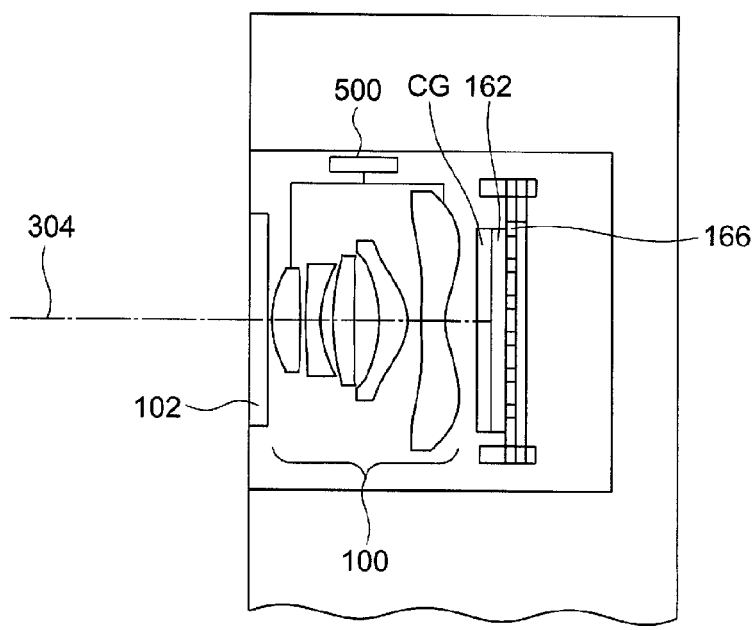
FIG. 34 is a cross-sectional view of the imaging optical system 303 of the personal computer 300.
Figure 35:
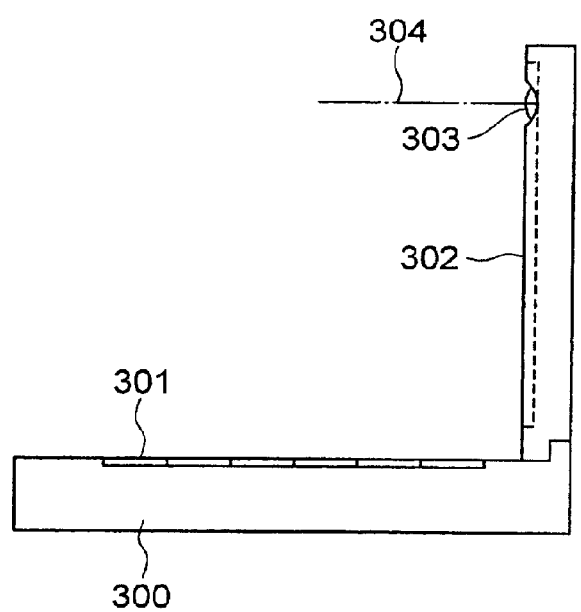
FIG. 35 is a side view of the personal computer 300.

Next, with reference to FIGS. 33-35, a personal computer is described as an example of an information processing apparatus incorporating an imaging optical system of the present invention as an objective optical system. FIG. 33 is a front perspective view showing a personal computer 300 with its cover open. FIG. 34 is a cross-sectional view showing an imaging optical system 303 of the personal computer 300. FIG. 35 is a side view of the computer 300. As shown in FIGS. 33-35, the personal computer 300 comprises a keyboard 301, an information processing means and a memory means, a monitor 302, and an imaging optical system 303.

The keyboard 301 is used by an operator to input information. The information processing means and the memory means are not shown in the figures. The monitor 302 displays information for the operator. The imaging optical system 303 is provided for capturing an image of the operator or a surrounding environment. A liquid crystal display (LCD) device or a CRT display can be adopted as the monitor 302. In the case of a transmissive LCD device, light from a backlight unit (not shown) irradiates the display from behind, whereas with a reflective LCD device, light irradiated from a forward direction is used for display. The imaging optical system 303 is incorporated in the upper right position above the monitor 302. The position of the imaging optical system 303, however, is not limited to that shown, but can be located anywhere on the computer, for example, around the monitor 302 or around the keyboard 301.

The imaging optical system 303 comprises an objective optical system 100 implemented, for example, in accordance with Example 1 described above, and an electronic imaging chip 162 for capturing an image. These components are incorporated in the personal computer 300.

At the distal end of the lens frame, a cover glass 102 for protecting the objective optical system 100 is provided. The object image captured by the electronic imaging device chip 162 is, through terminals 166, input to a processing means incorporated in the personal computer 300. The object image is displayed on the monitor 302 as an electronic image at the last stage. FIG. 33 shows, as one example of such an object image, an image 305 taken by the operator. The image 305 can be displayed on a remote personal computer to which the personal computer 300 is communicating. Such a remote image transfer is accomplished through the internet or a telephone line. The personal computer 300 also incorporates an auto-focus mechanism 500 integrated with the objective optical system 100 (an imaging optical system). This auto-focus mechanism enables focusing to objects of any distance.

It is preferable that the objective optical system 100 (an imaging optical system) and the electronic imaging device chip 162 (an electronic imaging device) be integrated as one piece. By this integration of the electronic imaging device, an optical image formed by the imaging optical system can be converted into an electrical signal. Further, by adopting an electronic imaging device able to reduce the effect of brightness discrepancy appearing between the central part of an image and the peripheral part of the image, an imaging apparatus such as a personal computer having a compact size and high performance can be provided.

Figure 36:
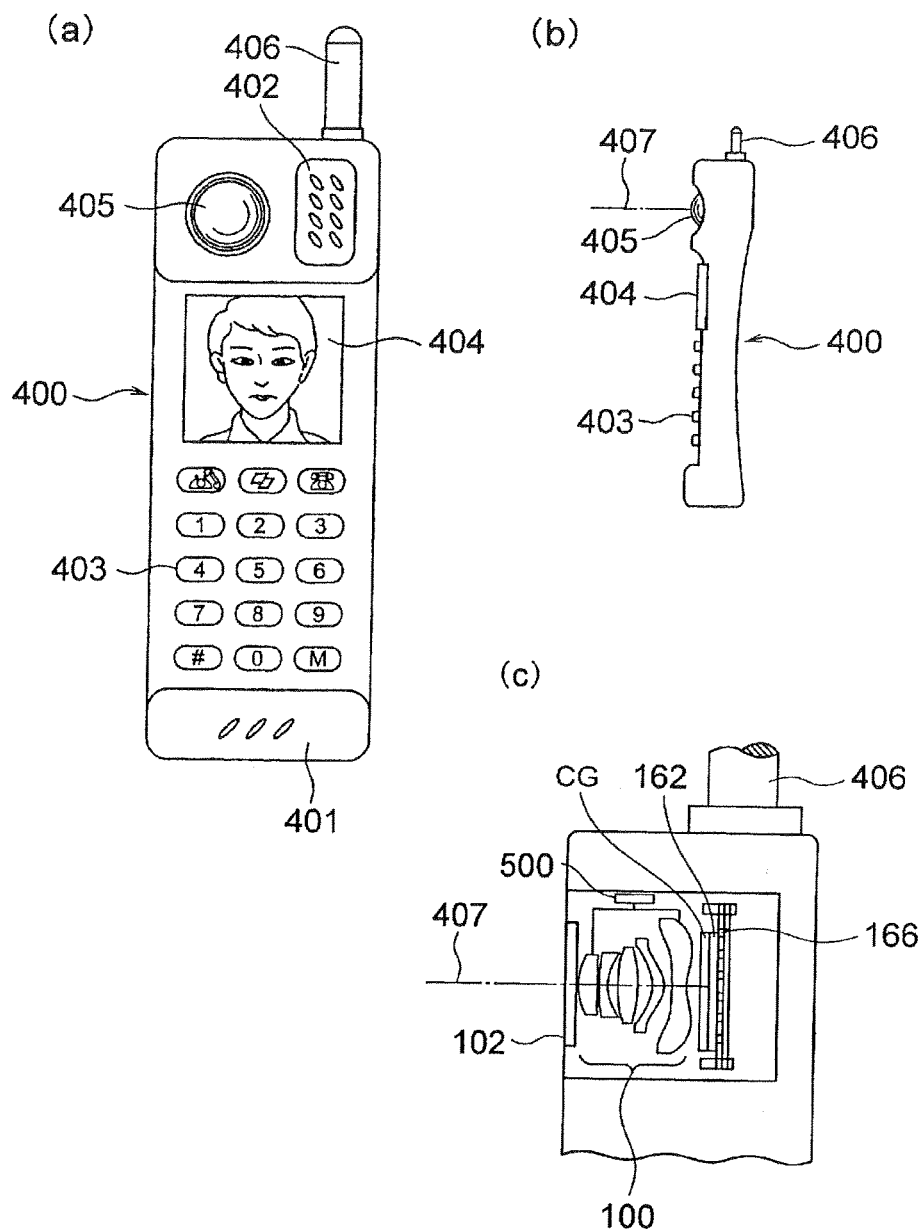
FIGS. 36(*a*), 36(*b*), and 36(*c*) are views showing a cellular phone as an example of an information processing apparatus incorporating an imaging optical system of the present invention.

Next, FIG. 36 shows a telephone, especially a cellular phone which is easy to carry, as an example of an information processing apparatus incorporating an imaging optical system of the present invention. FIG. 36(a) is a front view of a cellular phone 400, FIG. 36(b) is a side view of the same, and FIG. 36(c) is a cross-sectional view of an imaging optical system 405. As shown in FIGS. 36(a)-36(c), the cellular phone 400 comprising a microphone portion 401, a speaker portion 402, input buttons 403, a monitor 404, an imaging optical system 405, an antenna 406 and a processing means.

The microphone portion 401 is used for inputting the voice of an operator. The speaker portion 402 is used for outputting the voice of a person with whom the operator is communicating. The input buttons 403 are used for inputting information by the operator. The monitor 404 is used for displaying an image of the operator, an image of the person with whom the operator is communicating, or information, such as a telephone number. The antenna 406 is used for transmission and reception of communication electronic waves. The processing means (not shown) is used for processing image information, communication information, input signals, etc.

The monitor 404 is an LCD device. The arrangement of components is not limited to that illustrated. The imaging optical system 405 comprises the objective optical system 100, provided on an imaging optical path 407, and an electronic imaging device chip 162 for capturing an object image. As for the imaging optical system, that of Example 1, for example, may be used. These components are incorporated in the cellular phone 400.

At the distal end of a lens frame, a cover glass 102 for protecting the objective optical system 100 is provided. The object image captured by the electronic imaging device chip 162 is, through the terminals 166, input to an image processing means (not shown). The object image may be displayed as an electronic image on the monitor 404, on the monitor of a device in communication with cellular phone 400, or on both. The processing means comprises signal processing functions. When an image is transmitted to a device in communication with cellular phone 400, these functions convert an object image captured by the electronic imaging device chip 162 into transmittable signals.

Further, the cellular phone 400 incorporates an auto-focus mechanism integrated with the objective optical system 100 (an imaging optical system). This auto-focus mechanism enables focusing to objects of any distance.

It is preferable that the objective optical system 100 (an imaging optical system) and the electronic imaging device chip 162 (an electronic imaging device) be integrated as one piece. By this integration of the electronic imaging device, an optical image formed by the imaging optical system can be converted into an electrical signal. Further, by adopting an electronic imaging device able to reduce the effect of brightness discrepancy appearing between the central part of an image and the peripheral part of the image, an imaging apparatus such as a telephone having a compact size and high performance can be provided.

The present invention may have various modified examples which fall in the teachings above.

As described above, the present invention is suited for an imaging optical system in which various aberrations, such as coma aberration, spherical aberration, field curvature and chromatic aberration, are well corrected and an imaging apparatus using the same.

What is claimed is:

1. An imaging optical system comprising in order from an object side:
a first lens having a positive refractive power;
a second lens having a negative refractive power;
a third lens having a positive refractive power;
a fourth lens having a positive refractive power; and
a fifth lens having a negative refractive power,
wherein:
an aperture is provided at an endmost position on the object side,
the first lens is a biconvex lens,
an object side surface of the second lens is a convex surface facing the object side,
an object side surface of the fifth lens is a convex surface facing the object side, and
the following conditional expressions are satisfied:

$$1.0 < f3/f1 < 4.9 \tag{1}$$

$$-5.9 < r9/d9 < -1.6, \text{ and}$$

$$1.3 < r7/f \tag{105}$$

where:
f3 is a focal length of the third lens,
f1 is a focal length of the first lens,
r9 is a paraxial curvature radius of an image side surface of the fourth lens,
d9 is a distance between the fourth lens and the fifth lens on the optical axis,
r7 is a paraxial curvature radius of an image side surface of the third lens, and
f is a focal length of the whole imaging optical system.

2. The imaging optical system according to claim 1, wherein the following conditional expression is satisfied:

$$-4.0 < (r6+r7)/(r6-r7) < -0.51 \tag{101}$$

where:
r6 is a paraxial curvature radius of an object side surface of the third lens, and
r7 is a paraxial curvature radius of an image side surface of the third lens.

3. The imaging optical system according to claim 1, wherein the following conditional expression is satisfied:

$$1.21 < \Phi L5ed\text{max}/\Phi st < 6.52 \tag{102}$$

where:
ΦL5edmax is an effective diameter of the fifth lens, and
Φst is a diameter of the aperture.

4. The imaging optical system according to claim 1, wherein the third lens is a meniscus lens having a convex surface facing the object side.

5. The imaging optical system according to claim 1, wherein the following conditional expression is satisfied:

$$-12.7 < r3/f1 < -1.6 \tag{104}$$

where:
r3 is a paraxial curvature radius of an image side surface of the first lens, and
f1 is a focal length of the first lens.

6. The imaging optical system according to claim 1, wherein the following conditional expression is satisfied:

$$0.4 < r6/f < 2.1 \tag{106}$$

where:
r6 is a paraxial curvature radius of an object side surface of the third lens, and
f is a focal length of the whole imaging optical system.

7. The imaging optical system according to claim 1, wherein the following conditional expression is satisfied:

$$1.1 < f3/f4 < 7.6 \tag{107}$$

where:
f3 is a focal length of the third lens, and
f4 is a focal length of the fourth lens.

8. The imaging optical system according to claim 1, wherein the following conditional expression is satisfied:

$$1.0 < (r10+r11)/(r10-r11) < 3.4 \qquad (108)$$

where:
r10 is a paraxial curvature radius of an object side surface of the fifth lens, and
r11 is a paraxial curvature radius of an image side surface of the fifth lens.

9. The imaging optical system according to claim 1, wherein the following conditional expression is satisfied:

$$0.4 < f1/f < 1.8 \qquad (109)$$

where:
f1 is a focal length of the first lens, and
f is a focal length of the whole imaging optical system.

10. The imaging optical system according to claim 1, wherein the following conditional expression is satisfied:

$$-1.5 < f5/f < -0.3 \qquad (110)$$

where:
f5 is a focal length of the fifth lens, and
f is a focal length of the whole imaging optical system.

11. An imaging apparatus comprising an imaging optical system and an imager, wherein the imaging optical system includes in order from an object side:
a first lens having a positive refractive power,
a second lens having a negative refractive power,
a third lens having a positive refractive power,
a fourth lens having a positive refractive power,
a fifth lens having a negative refractive power,
wherein:
an aperture is provided at an endmost position on the object side,
the first lens is a biconvex lens,
an object side surface of the second lens is a convex surface facing the object side,
an object side surface of the fifth lens is a convex surface facing the object side, and
the following conditional expressions are satisfied:

$$1.0 < f3/f1 < 4.9 \qquad (1),$$

$$-5.9 < r9/d9 < -1.6, \text{ and}$$

$$1.3 < r7/f \qquad (105),$$

where:
f3 is a focal length of the third lens,
f1 is a focal length of the first lens,
r9 is a paraxial curvature radius of an image side surface of the fourth lens,
d9 is a distance between the fourth lens and the fifth lens on the optical axis,
r7 is a paraxial curvature radius of an image side surface of the third lens, and
f is a focal length of the whole imaging optical system.

12. An imaging optical system comprising in order from an object side:
a first lens having a positive refractive power;
a second lens having a negative refractive power;
a third lens having a positive refractive power;
a fourth lens having a positive refractive power; and
a fifth lens having a negative refractive power,
wherein:
an aperture is provided at an endmost position on the object side,
the first lens is a biconvex lens,
an object side surface of the second lens is a convex surface facing the object side,
an object side surface of the fifth lens is a convex surface facing the object side, and
the following conditional expressions are satisfied:

$$1.0 < f3/f1 < 4.9 \qquad (1),$$

$$-5.9 < r9/d9 < -1.6, \text{ and}$$

$$-4.0 < (r6+r7) < -0.51 \qquad (101),$$

where:
f3 is a focal length of the third lens,
f1 is a focal length of the first lens,
r9 is a paraxial curvature radius of an image side surface of the fourth lens,
d9 is a distance between the fourth lens and the fifth lens on the optical axis,
r6 is a paraxial curvature radius of an object side surface of the third lens, and
r7 is a paraxial curvature radius of an image side surface of the third lens.

13. An imaging optical system comprising in order from an object side:
a first lens having a positive refractive power;
a second lens having a negative refractive power;
a third lens having a positive refractive power;
a fourth lens having a positive refractive power; and
a fifth lens having a negative refractive power,
wherein:
an aperture is provided at an endmost position on the object side,
the first lens is a biconvex lens,
an object side surface of the second lens is a convex surface facing the object side,
the third lens is a meniscus lens having a convex surface facing the object side,
an object side surface of the fifth lens is a convex surface facing the object side, and
the following conditional expressions are satisfied:

$$1.0 < f3/f1 < 4.9 \qquad (1), \text{ and}$$

$$-5.9 < r9/d9 < -1.6,$$

where:
f3 is a focal length of the third lens,
f1 is a focal length of the first lens,
r9 is a paraxial curvature radius of an image side surface of the fourth lens, and
d9 is a distance between the fourth lens and the fifth lens on the optical axis.

14. An imaging optical system comprising in order from an object side:
a first lens having a positive refractive power;
a second lens having a negative refractive power;
a third lens having a positive refractive power;
a fourth lens having a positive refractive power; and
a fifth lens having a negative refractive power,
wherein:
an aperture is provided at an endmost position on the object side,
the first lens is a biconvex lens,
an object side surface of the second lens is a convex surface facing the object side,
an object side surface of the fifth lens is a convex surface facing the object side, and the following conditional expressions are satisfied:

$$1.0 < f3/f1 < 4.9 \quad (1),$$

$$-5.9 < r9/d9 < -1.6, \text{ and}$$

$$0.4 < r6/f < 2.1 \quad (106)$$

where:
- f3 is a focal length of the third lens,
- f1 is a focal length of the first lens,
- r9 is a paraxial curvature radius of an image side surface of the fourth lens,
- d9 is a distance between the fourth lens and the fifth lens on the optical axis,
- r6 is a paraxial curvature radius of an object side surface of the third lens, and
- f is a focal length of the whole imaging optical system.

15. An imaging apparatus comprising an imaging optical system and an imager, wherein the imaging optical system includes in order from an object side:
- a first lens having a positive refractive power,
- a second lens having a negative refractive power,
- a third lens having a positive refractive power,
- a fourth lens having a positive refractive power,
- a fifth lens having a negative refractive power, wherein:
- an aperture is provided at an endmost position on the object side,
- the first lens is a biconvex lens,
- an object side surface of the second lens is a convex surface facing the object side,
- an object side surface of the fifth lens is a convex surface facing the object side, and
- the following conditional expressions are satisfied:

$$1.0 < f3/f1 < 4.9 \quad (1),$$

$$-5.9 < r9/d9 < -1.6, \text{ and}$$

$$4.0 < (r6+r7)/(r6-r7) < -0.51 \quad (101)$$

where:
- f3 is a focal length of the third lens,
- f1 is a focal length of the first lens,
- r9 is a paraxial curvature radius of an image side surface of the fourth lens,
- d9 is a distance between the fourth lens and the fifth lens on the optical axis,
- r6 is a paraxial curvature radius of an object side surface of the third lens, and
- r7 is a paraxial curvature radius of an image side surface of the third lens.

16. An imaging apparatus comprising an imaging optical system and an imager, wherein the imaging optical system includes in order from an object side:
- a first lens having a positive refractive power,
- a second lens having a negative refractive power,
- a third lens having a positive refractive power,
- a fourth lens having a positive refractive power,
- a fifth lens having a negative refractive power, wherein:
- an aperture is provided at an endmost position on the object side,
- the first lens is a biconvex lens,
- an object side surface of the second lens is a convex surface facing the object side,
- the third lens is a meniscus lens having a convex surface facing the object side,
- an object side surface of the fifth lens is a convex surface facing the object side, and
- the following conditional expressions are satisfied:

$$1.0 < f3/f1 < 4.9 \quad (1), \text{ and}$$

$$-5.9 < r9/d9 < -1.6,$$

where:
- f3 is a focal length of the third lens,
- f1 is a focal length of the first lens,
- r9 is a paraxial curvature radius of an image side surface of the fourth lens, and
- d9 is a distance between the fourth lens and the fifth lens on the optical axis.

17. An imaging apparatus comprising an imaging optical system and an imager, wherein the imaging optical system includes in order from an object side:
- a first lens having a positive refractive power,
- a second lens having a negative refractive power,
- a third lens having a positive refractive power,
- a fourth lens having a positive refractive power,
- a fifth lens having a negative refractive power, wherein:
- an aperture is provided at an endmost position on the object side,
- the first lens is a biconvex lens,
- an object side surface of the second lens is a convex surface facing the object side,
- an object side surface of the fifth lens is a convex surface facing the object side, and
- the following conditional expressions are satisfied:

$$1.0 < f3/f1 < 4.9 \quad (1),$$

$$-5.9 < r9/d9 < -1.6, \text{ and}$$

$$0.4 < r6/f < 2.1 \quad (106)$$

where:
- f3 is a focal length of the third lens,
- f1 is a focal length of the first lens,
- r9 is a paraxial curvature radius of an image side surface of the fourth lens,
- d9 is a distance between the fourth lens and the fifth lens on the optical axis,
- r6 is a paraxial curvature radius of an object side surface of the third lens, and
- f is a focal length of the whole imaging optical system.

* * * * *

UNITED STATES PATENT AND TRADEMARK OFFICE
CERTIFICATE OF CORRECTION

PATENT NO. : 8,976,466 B2
APPLICATION NO. : 13/356896
DATED : March 10, 2015
INVENTOR(S) : Takuya Otsu et al.

It is certified that error appears in the above-identified patent and that said Letters Patent is hereby corrected as shown below:

In the Specification

At column 31, line 36, after "+", add "...".

In the Claims

At column 52, in claim 12, line 11, change "$-4.0<(r6+r7)<-0.51$" to "$-4.0<(r6+r7)/(r6-r7)<-0.51$".

Signed and Sealed this
Seventh Day of July, 2015

Michelle K. Lee
*Director of the United States Patent and Trademark Office*